US012638673B2

(12) United States Patent
Hatton et al.

(10) Patent No.: US 12,638,673 B2
(45) Date of Patent: May 26, 2026

(54) SYSTEM FOR CONTROL OF OPTICAL PROPERTIES OF LIGHT

(71) Applicant: THE GOVERNING COUNCIL OF THE UNIVERSITY OF TORONTO, Toronto (CA)

(72) Inventors: Benjamin Hatton, Toronto (CA); Raphael Kay, Toronto (CA); Charles Katrycz, Toronto (CA); Kevin Nitièma, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 649 days.

(21) Appl. No.: 18/071,496

(22) Filed: Nov. 29, 2022

(65) Prior Publication Data

US 2023/0228988 A1 Jul. 20, 2023

Related U.S. Application Data

(60) Provisional application No. 63/283,691, filed on Nov. 29, 2021.

(51) Int. Cl.
*G02B 27/00* (2006.01)
*E06B 3/67* (2006.01)
(Continued)

(52) U.S. Cl.
CPC ........ *G02B 27/0012* (2013.01); *E06B 3/6722* (2013.01); *E06B 9/24* (2013.01);
(Continued)

(58) Field of Classification Search
CPC .... G02B 26/02; G02B 26/023; G02B 26/004; G02B 26/005
See application file for complete search history.

(56) References Cited

U.S. PATENT DOCUMENTS 3,724,929 A * 4/1973 Lacy .......................... B60J 3/04
137/563
4,236,360 A * 12/1980 Parrier .................. E06B 3/6722
359/228
(Continued)

FOREIGN PATENT DOCUMENTS

CA 2005930 A1 * 6/1990 ........... E06B 3/6722
CN 2526476 Y * 12/2002
(Continued)

OTHER PUBLICATIONS

Pihler-Puzović, Draga, et al. "Viscous fingering in a radial elastic-walled Hele-Shaw cell." Journal of Fluid Mechanics 849 (2018): 163-191. (Year: 2018).*
(Continued)

*Primary Examiner* — Christopher Stanford
(74) *Attorney, Agent, or Firm* — Jenna L. Wilson; Wilson Lue LLP (Firm)

(57) ABSTRACT

A system for control of optical properties of light comprises a cell comprising a first optically transparent member and a second optically transparent member. The members are disposed in a vertical direction, parallel to each other and at a distance from each other with closed edges, thereby defining a space therebetween. A first fluid is configured to be received within the space. A second fluid, different from the first fluid, is configured to be received into the space, while at least a portion of the first fluid is disposed in the space, causing the first fluid to be displaced. The first and second fluid interface with each other, while remaining separate. The second fluid is configured to be withdrawn from the space leaving the first fluid in the space.

13 Claims, 63 Drawing Sheets

(51) Int. Cl.

| | | |
|---|---|---|
| *E06B 9/24* | (2006.01) | |
| *G02F 1/01* | (2006.01) | |
| *G02F 1/16753* | (2019.01) | |
| *G02F 1/1679* | (2019.01) | |

(52) U.S. Cl.
CPC ........ *G02F 1/0102* (2013.01); *G02F 1/16753* (2019.01); *G02F 1/1679* (2019.01); *B29K 2995/0046* (2013.01); *E06B 2009/2411* (2013.01)

(56) References Cited

U.S. PATENT DOCUMENTS

| | | | | |
|---|---|---|---|---|
| 5,608,995 | A * | 3/1997 | Borden | E06B 9/24 |
| | | | | 428/34 |
| 7,301,708 | B2 * | 11/2007 | Kuiper | G02B 26/005 |
| | | | | 359/666 |
| 9,567,995 | B2 * | 2/2017 | Briggs | E06B 7/28 |
| 2014/0123578 | A1 | 5/2014 | Ingber et al. | |
| 2015/0285454 | A1 | 10/2015 | Aizenberg et al. | |
| 2016/0243738 | A1 | 8/2016 | Katrycz | |
| 2020/0256120 | A1 | 8/2020 | Wondraczek | |

FOREIGN PATENT DOCUMENTS

| | | | | | |
|---|---|---|---|---|---|
| CN | 101241240 | A | * | 8/2008 | |
| CN | 202073446 | U | * | 12/2011 | |
| CN | 103197438 | A | * | 7/2013 | |
| CN | 105863456 | B | * | 5/2019 | |
| DE | 19705079 | A1 | * | 8/1998 | E06B 3/6722 |
| KR | 20150095460 | A | * | 8/2015 | E06B 3/677 |

OTHER PUBLICATIONS

B. D. Hatton et al., An artificial vasculature for adaptive thermal control of windows. Solar Energy Materials and Solar Cells 117, 429-436 (2013). 2013.

H. Mor et al., Venous Materials: Towards Interactive Fluidic Mechanisms; paper presented at the Proceedings of the 2020 CHI Conference on Human Factors in Computing Systems, Honolulu, HI, USA, pp. 1-14, 2020. 2020.

Heiz, B. P. V. et al. Ultrathin Fluidic Laminates for Large-Area Facade Integration and Smart Windows. Advanced Science 4, 1600362, pp. 1-9, (2017). 2017.

Heiz, B. P. V., Pan, Z., Su, L., Le, S. T. & Wondraczek, L. A Large-Area Smart Window with Tunable Shading and Solar-Thermal Harvesting Ability Based on Remote Switching of a Magneto-Active Liquid. Advanced Sustainable Systems 2, 1700140, pp. 1-10, (2018). 2018.

Cecchi, M., Naticchia, B. & Carbonari, A. Development of a First Prototype of a Liquid-shaded Dynamic Glazed Facade for Buildings. Procedia Engineering 85, 94-103, (2014). 2014.

Fazel, A., Izadi, A. & Azizi, M. Low-cost solar thermal based adaptive window: combination of energy-saving and self-adjustment in buildings. Solar Energy 133, 274-282 (2016). 2016.

Morin, S. A. et al. Camouflage and Display for Soft Machines. Science 337, 828-832, doi:10.1126/science.1222149 (2012). 2012.

Kim, Su., Lee, YJ., Liu, J. et al. Broadband and pixelated camouflage in inflating chiral nematic liquid crystalline elastomers. Nat. Mater. 21, 41-46 (2022). 2022.

Lara Tomholt, Olga Geletina, Jack Alvarenga, Anna V. Shneidman, James C. Weaver, Matheus C. Fernandes, Santiago A. Mota, Martin Bechthold, Joanna Aizenberg, Tunable infrared transmission for energy-efficient pneumatic building façades, Energy and Buildings, 226, 2020, https://doi.org/10.1016/j.enbuild.2020.110377, pp. 1-55. 2020.

Zarzar, L., Sresht, V., Sletten, E. et al. Dynamically reconfigurable complex emulsions via tunable interfacial tensions. Nature 518, 520-524 (2015). 2015.

Nagelberg, S., Zarzar, L., Nicolas, N. et al. Reconfigurable and responsive droplet-based compound micro-lenses. Nat Commun 8, 14673, pp. 1-9, (2017). 2017.

Yeo, J.-S., Emery, T., Combs, G., Korthuis, V., Mabeck, J., Hoffman, R., Koch, T., Zhou, Z.-L. and Henze, D. (2010), 69.4: Novel Flexible Reflective Color Media Integrated with Transparent Oxide TFT Backplane. SID Symposium Digest of Technical Papers, 41: 1041-1044. https://doi-org.ezp-prod1.hul.harvard.edu/10.1889/1.3499827 2010.

Heikenfeld, J., Zhou, K., Kreit, E. et al. Electrofluidic displays using Young-Laplace transposition of brilliant pigment dispersions. Nature Photon 3, 292-296 (2009). 2009.

Bartels, F. (2015). Droplet-Driven Electrowetting Displays. In: Chen, J., Cranton, W., Fihn, M. (eds) Handbook of Visual Display Technology. Springer, Berlin, Heidelberg, pp. 1-11 . . . 2015.

M. Konstantoglou, A. Tsangrassoulis, Dynamic operation of daylighting and shading systems: A literature review. Renewable and Sustainable Energy Reviews 60, 268-283 (2016). 2016.

Z. Drozdowski, S. Gupta, Adaptive Fritting as Case Exploration for Adaptivity in Architecture; in Proceedings of the 29th Annual Conference of the Association for Computer Aided Design in Architecture. (Chicago, Illinois, 2009), pp. 105-109. 2009.

J. Lienhard et al., Flectofin: a hingeless flapping mechanism inspired by nature. Bioinspiration & Biomimetics 6, 045001 (2011), 9 pgs. 2011.

D. Park et al., Dynamic daylight control system implementing thin cast arrays of polydimethylsiloxane-based millimeter-scale transparent louvers. Building and Environment 82, 87-96 (2014). 2014.

C. M. Lampert, Chromogenic smart materials. Materials Today 7, 28-35 (2004). 2004.

P. G. Saffman, G. I. Taylor, The penetration of a fluid into a porous medium or Hele-Shaw cell containing a more viscous liquid. Proceedings of the Royal Society of London. Series A., pp. 312-329, 1958. 1958.

* cited by examiner

Section A-A

Section B-B

218

102

206

204

210

202

212

208

218

102

206

204

210

202

212

220

302    304    102

T = 0 seconds        Time        T = 600 seconds

110

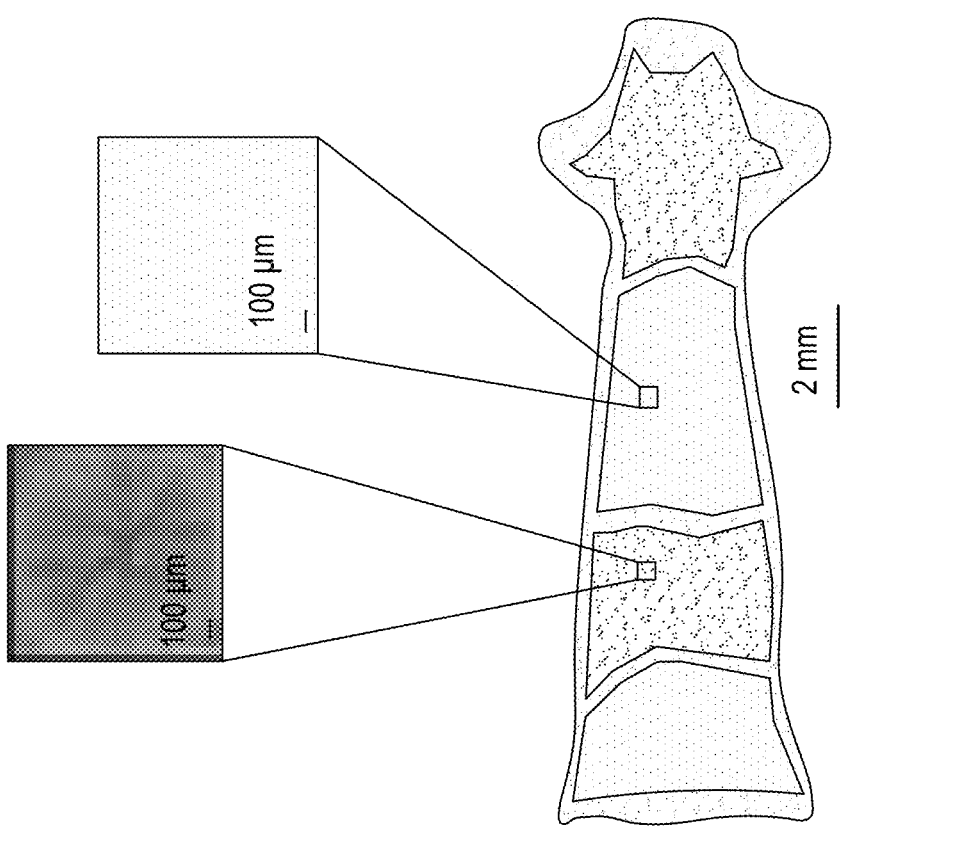
FIG. 8C
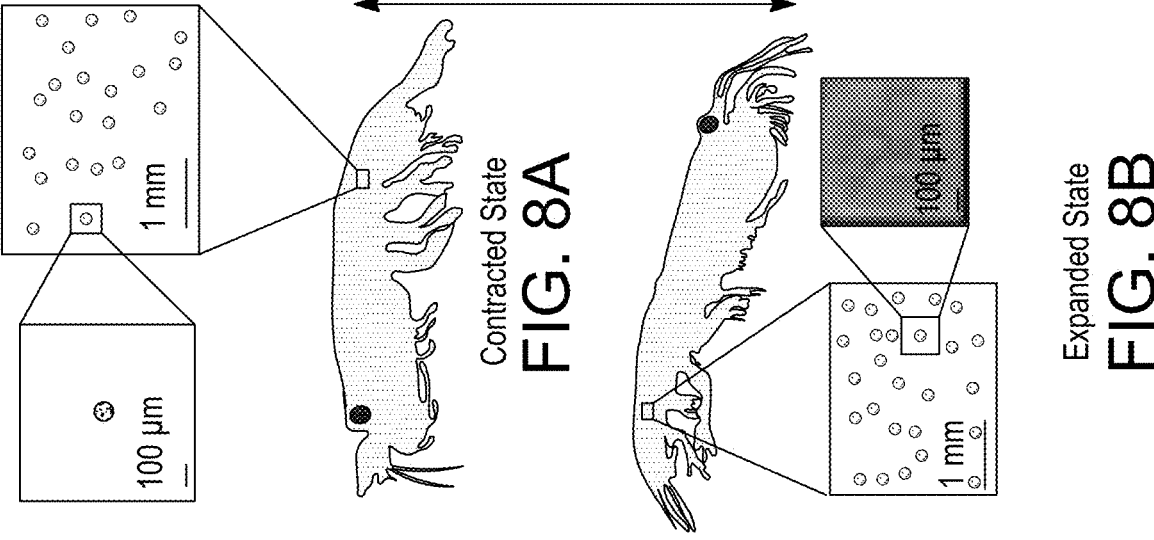
FIG. 8A
Contracted State
FIG. 8B
Expanded State

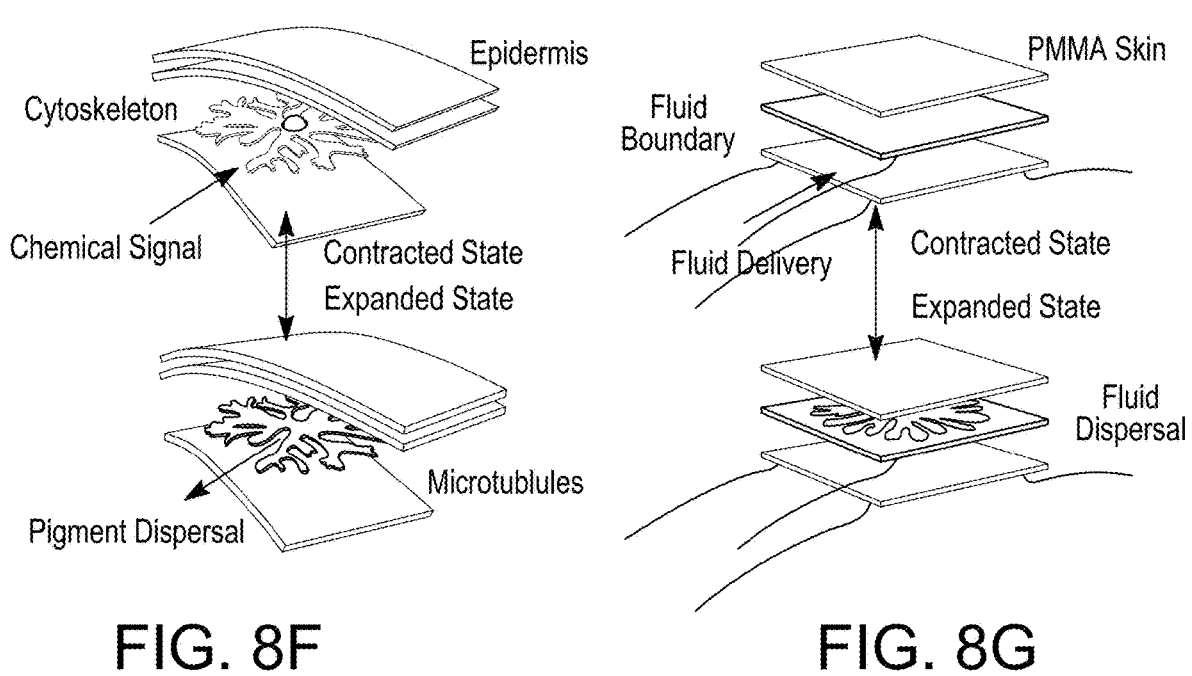
FIG. 8F
FIG. 8G
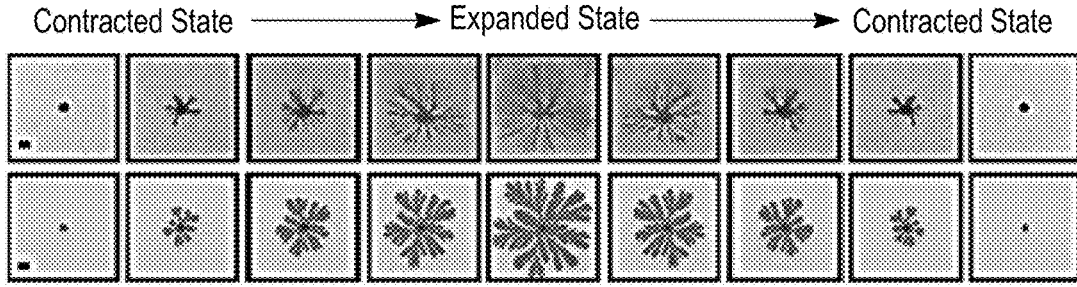
FIG. 8H
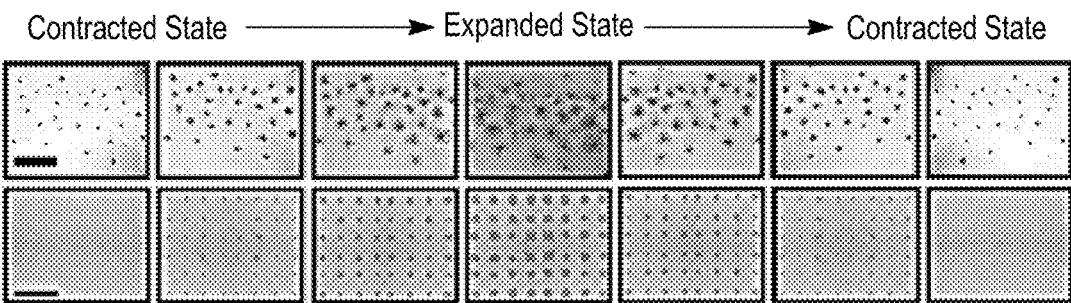
FIG. 8I

Variable
Activation Level
of Pigment Cell
Clusters (iv)
Hyper-Local Control

No Fluid Coverage
FIG. 9A
Unbranched Coverage
FIG. 9B
Branched Coverage
FIG. 9C
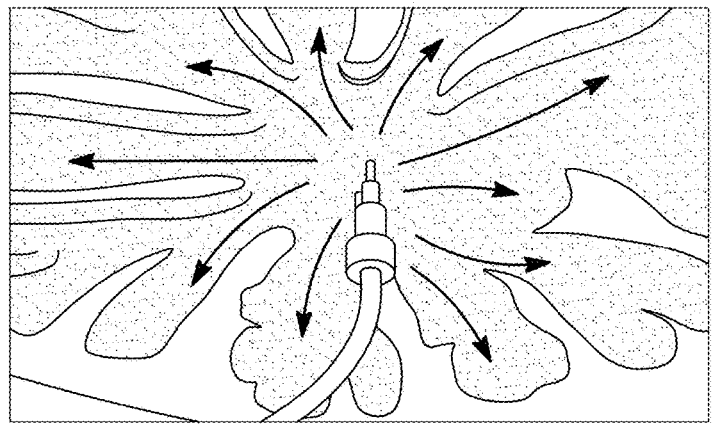
FIG. 9D
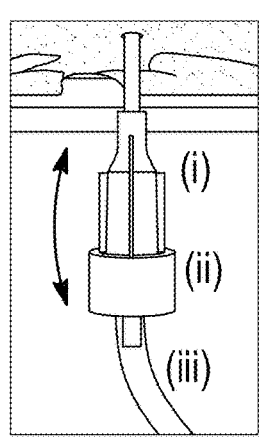
FIG. 9E

Q = 0.50 mL/min          Q = 1.00 mL/min          Q = 10.00 mL/min

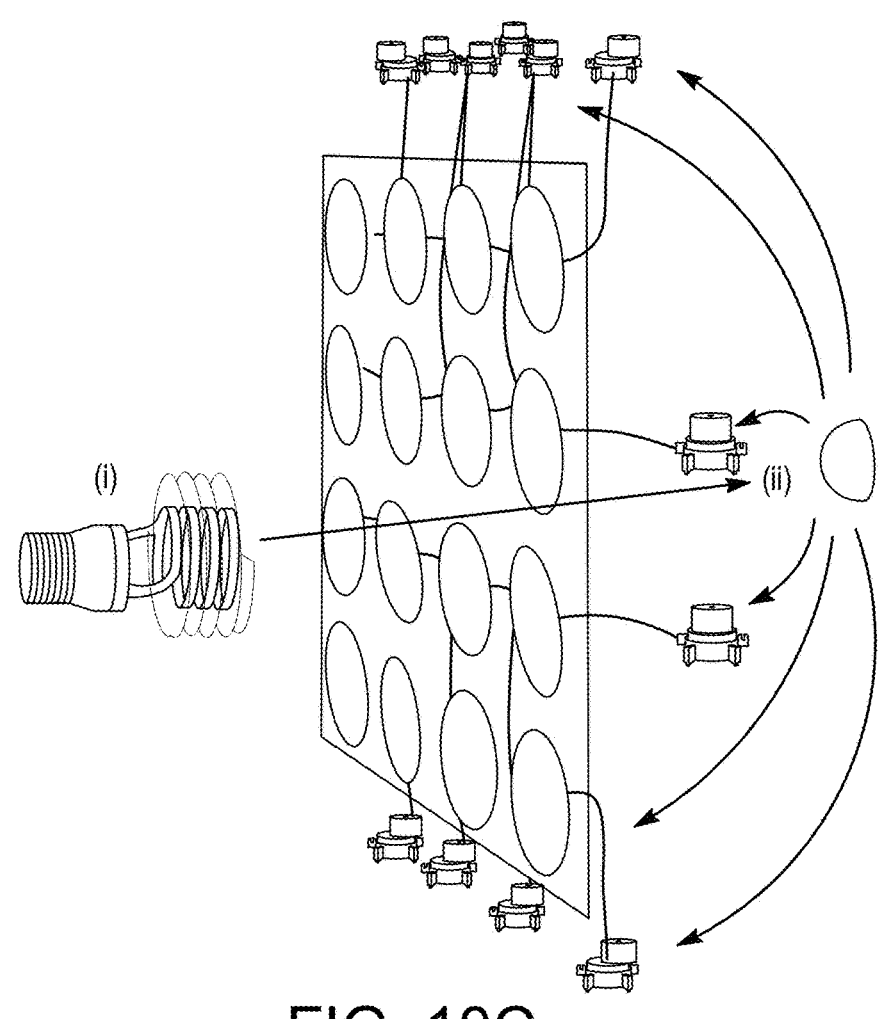
FIG. 10C
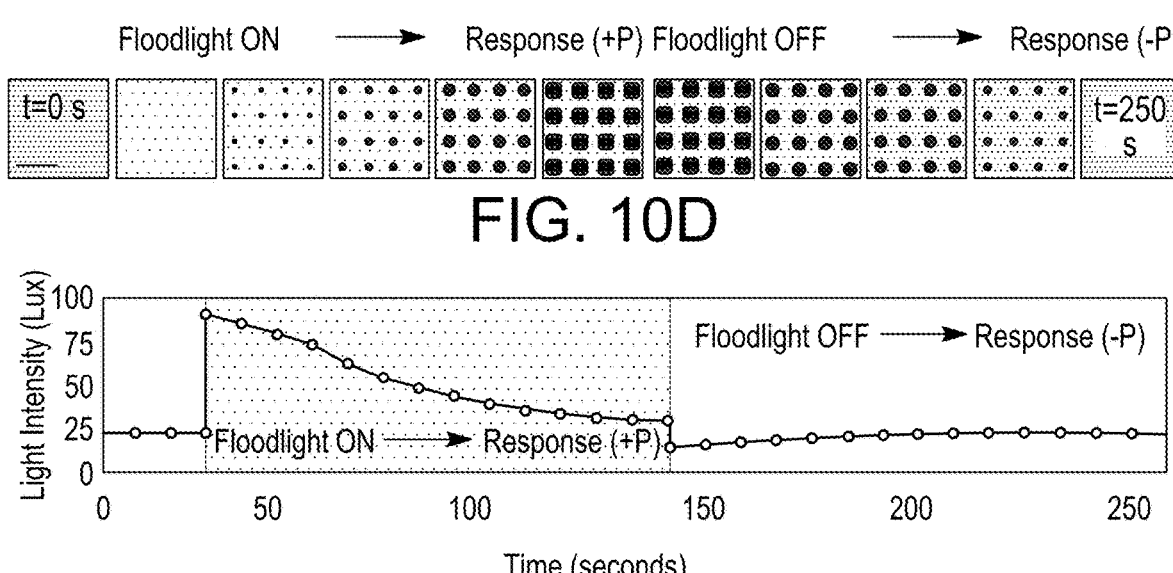
FIG. 10D
FIG. 10E (i)

(ii)

(iii)

(v)

(iv)

| Heat Source ON ──────────────► | | | | | Response (+P) ──────────────► | | | | |
|---|---|---|---|---|---|---|---|---|---|---|
| t=0 m | | | | | | | | | | |

Gradient ⟶ Response t=0     t=30 s t=0     t=30 s t=0     t=30 s t=0     t=30 s t=0     t=30 s Gradient t=0 s t=5 s t=10 s t=15 s t=20 s Response Light Gradient
Projected on Sample Differential
Local Response Sensor Fluid Fine
Tubing Peristaltic Pump

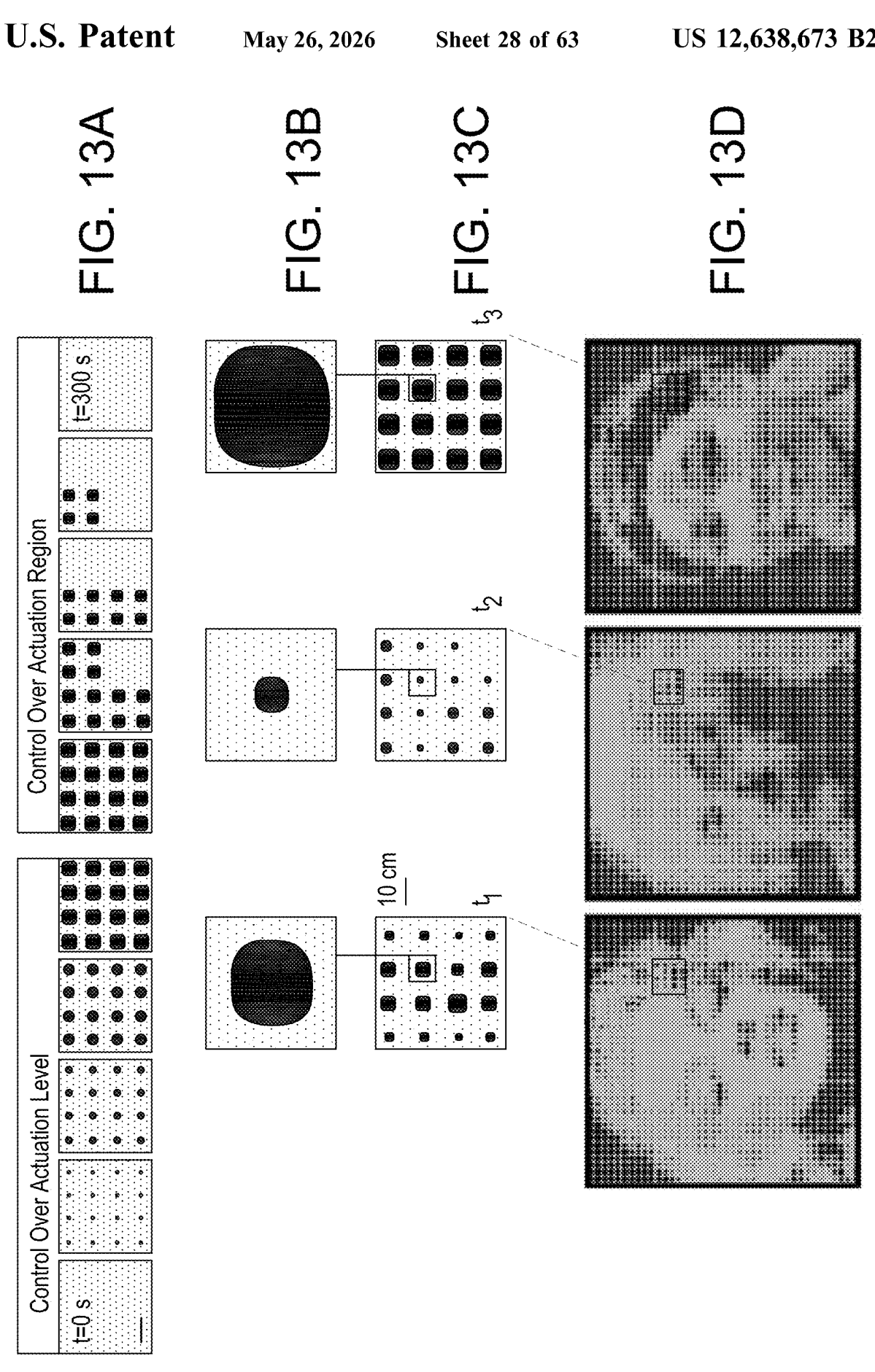

$n_g / n_h = 1.000$

- - - - - - -

———— 10 cm

Q = 0.50 mL/min

Q = 1.00 mL/min

Q = 10.00 mL/min

- - - - 10 cm

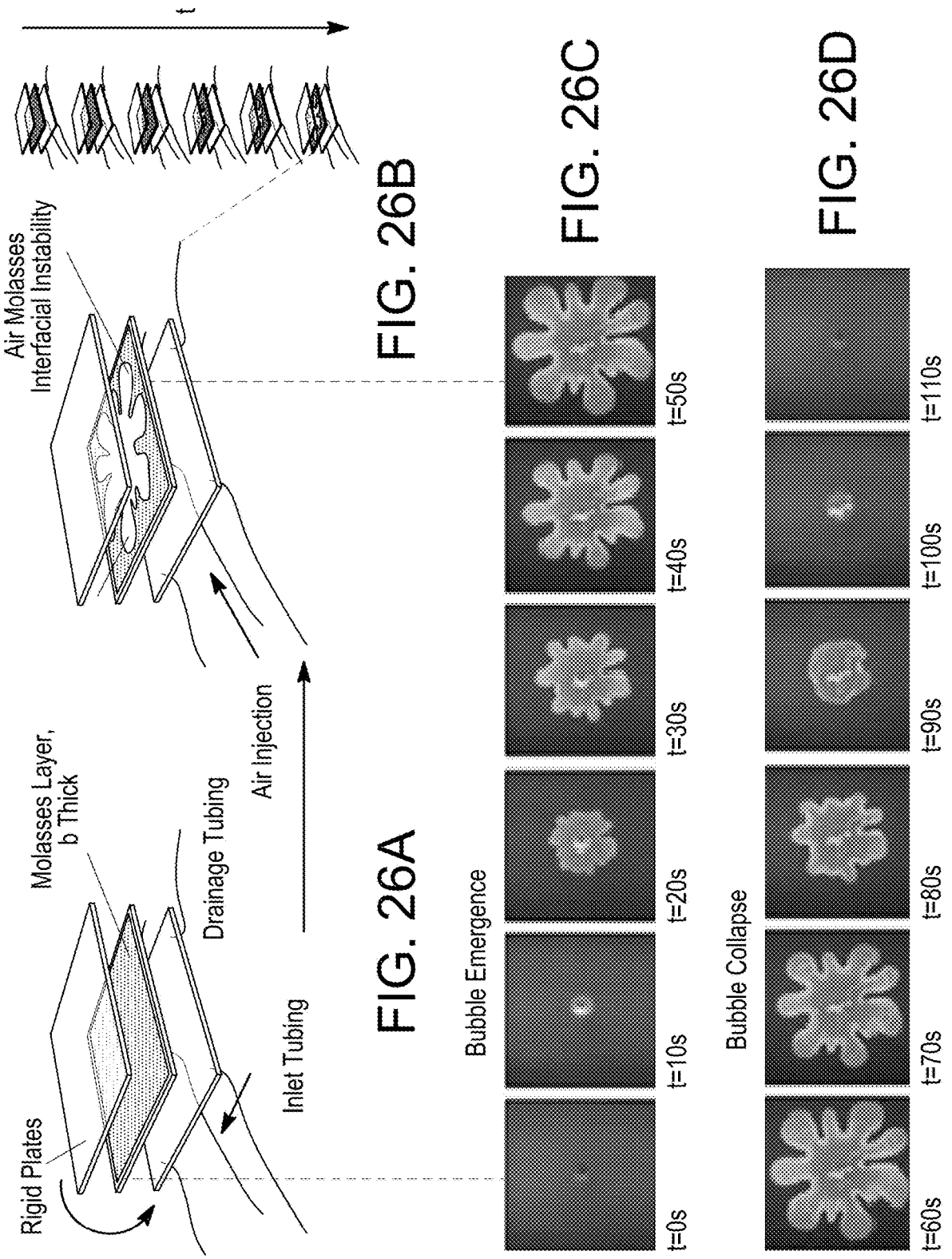

Effect of Fluid Cell Opening on Internal Light Intensity
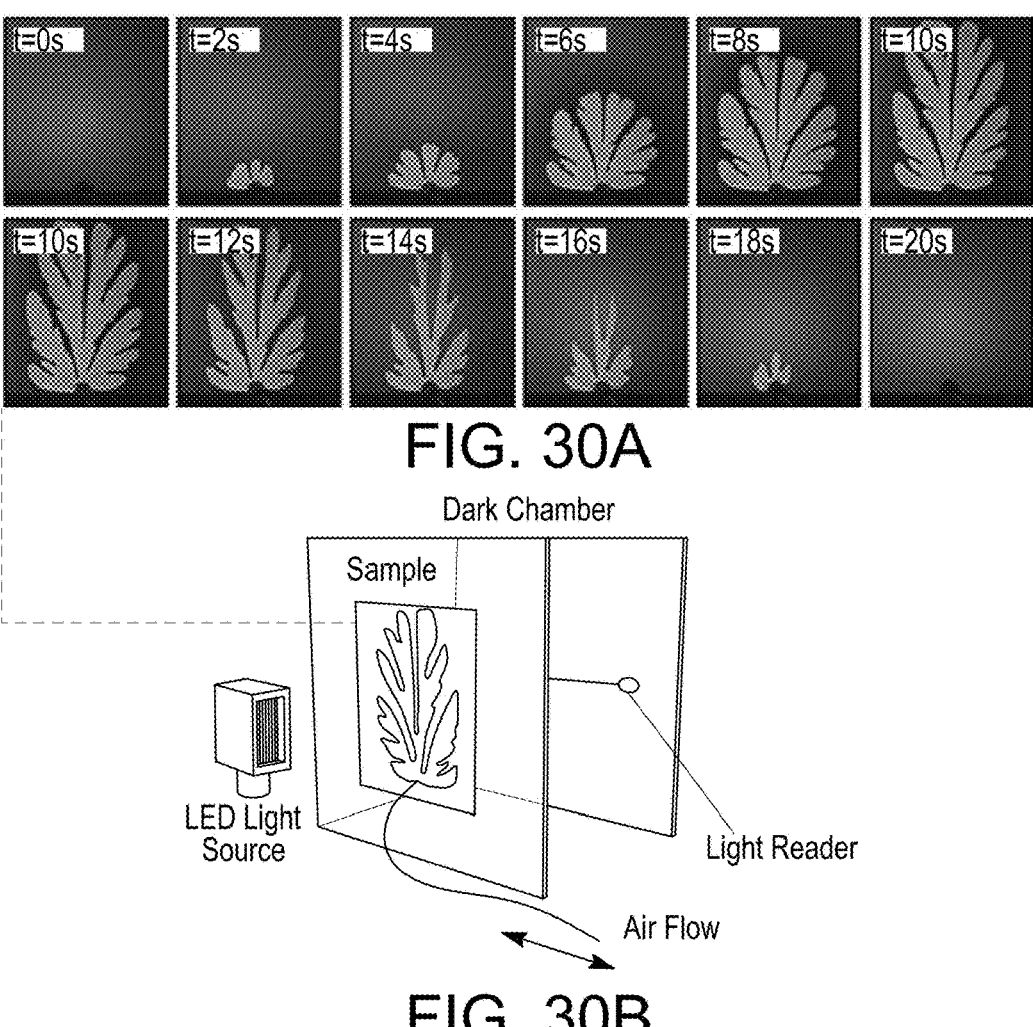
FIG. 30A
FIG. 30B
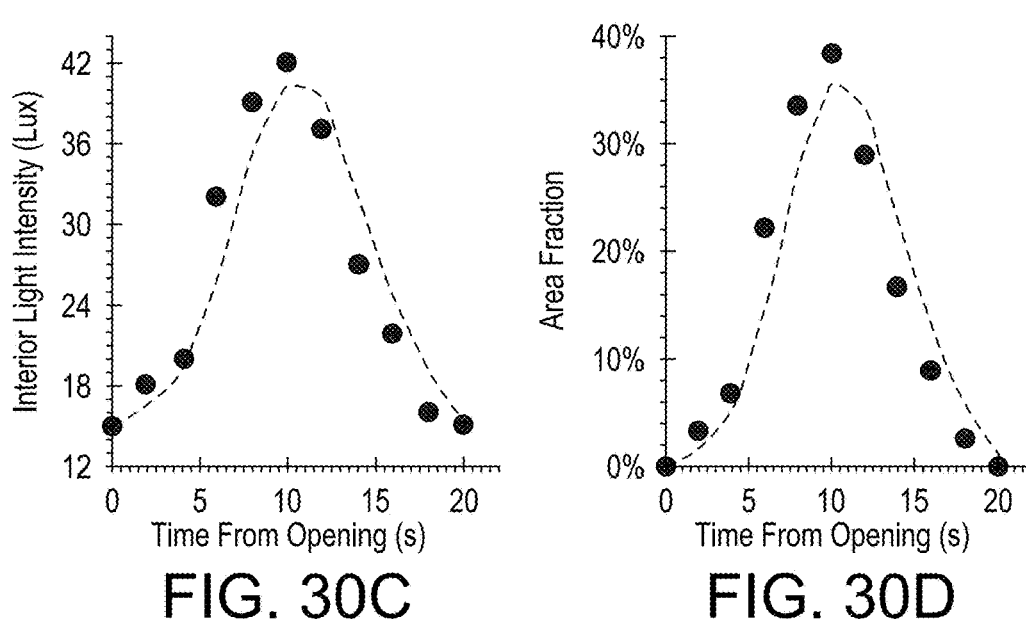
FIG. 30C                    FIG. 30D Effect of Fluid Cell Opening on Internal Temperature Motion-Driven Digital Bubble Growth 10 cm t=0.00s    t=0.23s    t=0.49s    t=1.18s    t=1.33s    t=2.27s    t=3.09s Motion-Driven Digital Bubble Collapse t=7.20s    t=7.55s    t=8.28s    t=9.07s    t=9.41s    t=10.12s    t=11.89s Office Zone Model                Toronto, Canada 8.2 m 3.6 m 88% Glazing on
South Face

N

Control Algorithm
Switch Between States to Minimize Energy

Average Panel Transmission For Various Area Fractions

Modelled Energy Results
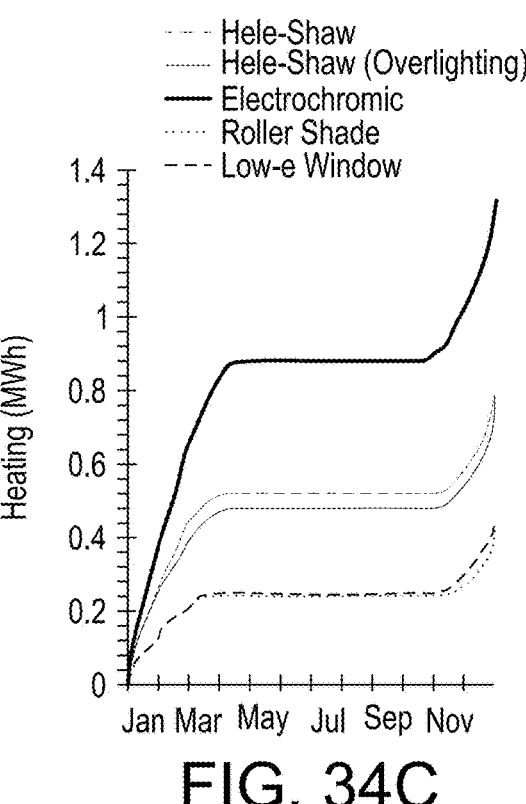
FIG. 34C
FIG. 34D
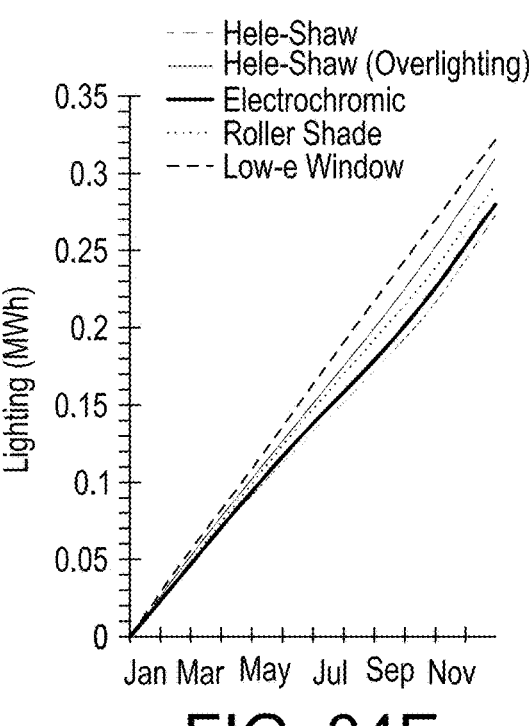
FIG. 34E
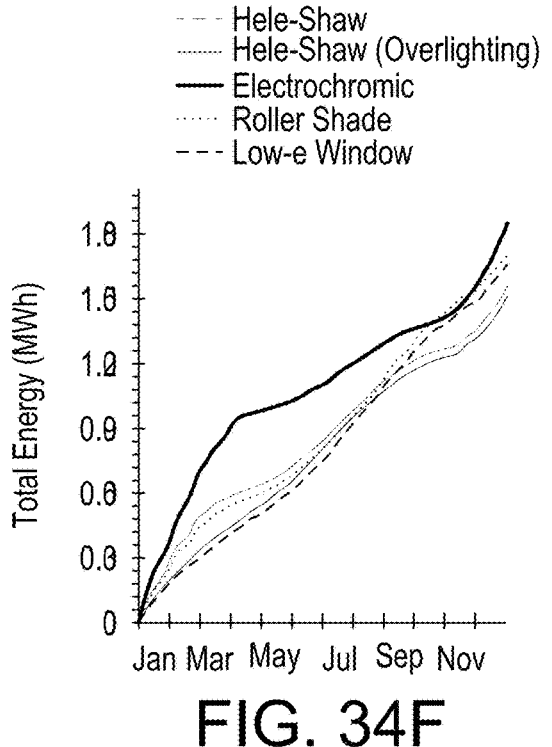
FIG. 34F q = 0.05 mL/min q = 0.50 mL/min q = 1.00 mL/min q = 5.00 mL/min q = 15.00 mL/min Time 10 cm Finger Growth Begins At Maximum Max. Pressure

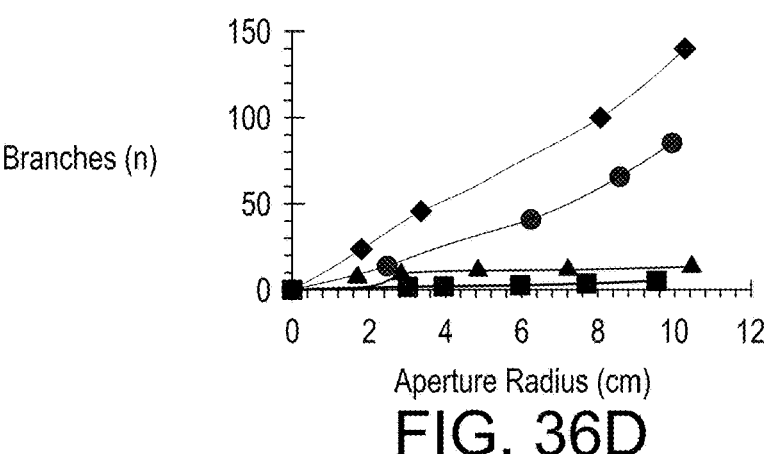
FIG. 36D
FIG. 36E
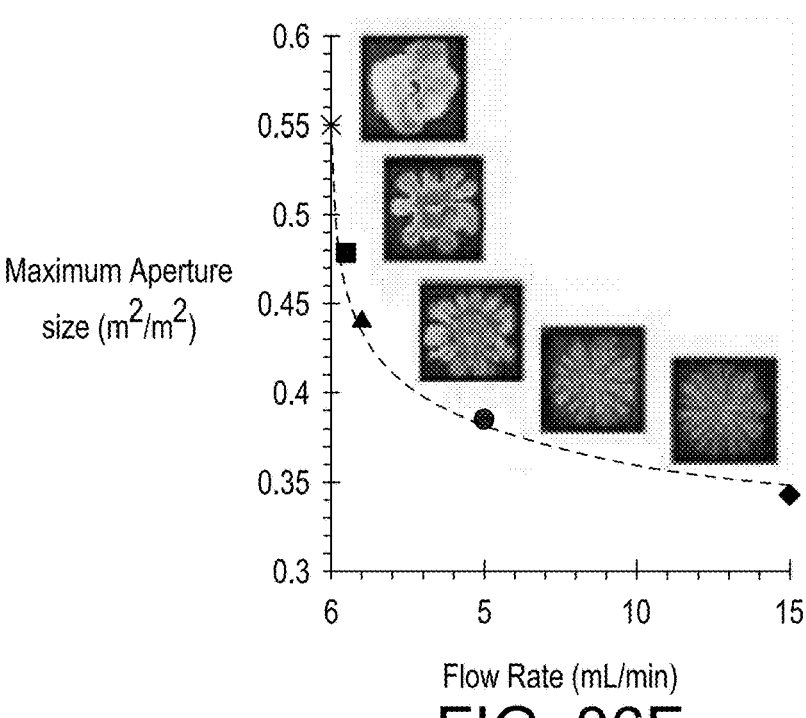
FIG. 36F

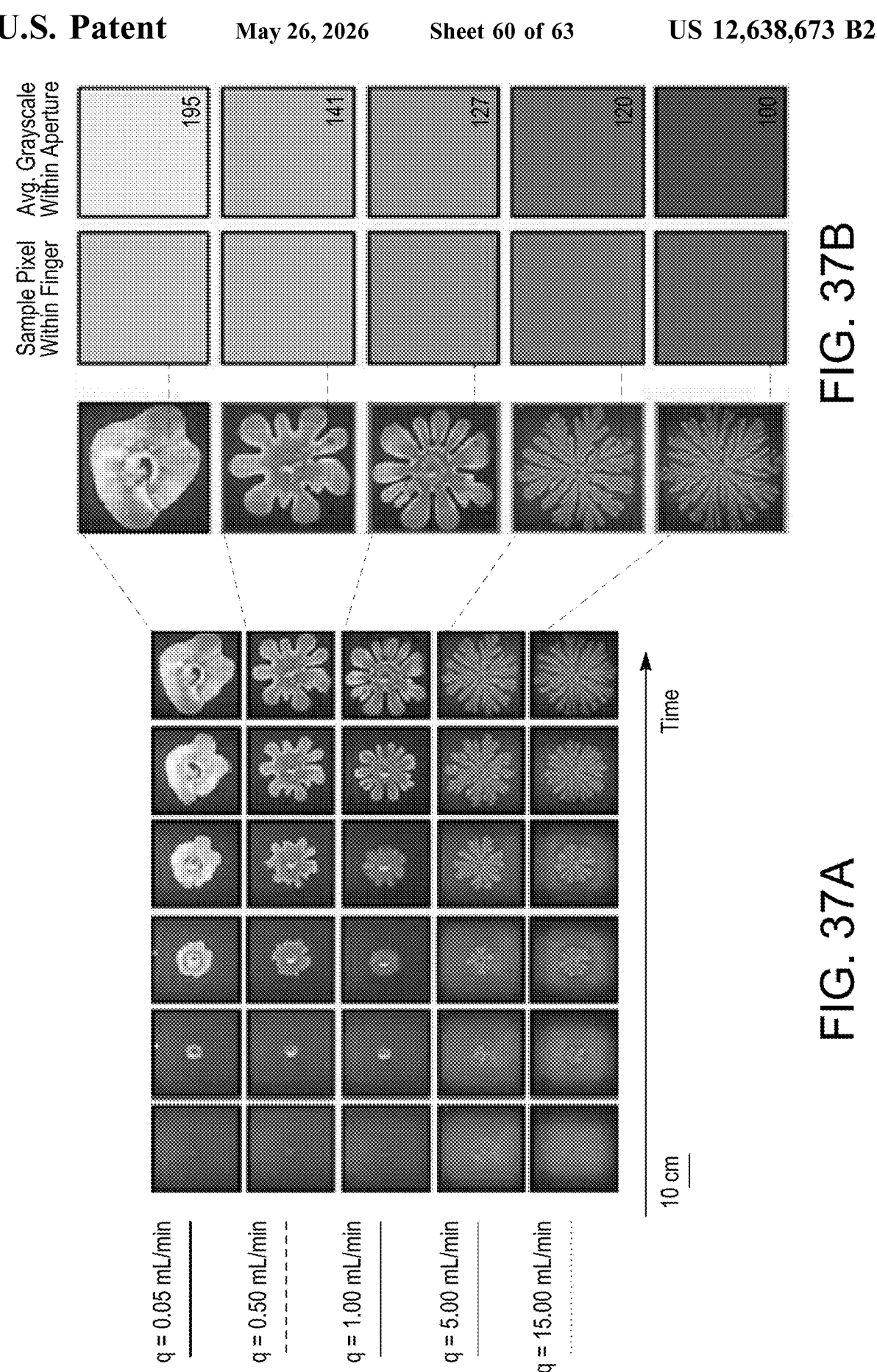

(1) Flow Rate Changes Aperture Morphology (2) Flow Rate Changes Aperture Wetting

SYSTEM FOR CONTROL OF OPTICAL PROPERTIES OF LIGHT

BACKGROUND

Field

The disclosed subject matter relates to the field of building facades. More particularly, but not exclusively, the subject matter relates to dynamically regulating sunlight passing through building facades.

Discussion of Related Art

Fundamentally, building facades represent the interface between the indoor and outdoor environment of a building. Building facades have several functions. Among these functions, building facades are designed for regulating transmission of visible light to illuminate the building interior, scattering of visible light to provide even daylighting across a space, and transmission of infrared light to maintain a comfortable indoor thermal condition. Convectional building facades and shading mechanisms, however, are either static or minimally controllable. Many of these conventional minimally controllable mechanisms are expensive or energy-intensive to manufacture, may include toxic materials, may require large energy costs to operate, or may not be amenable to user and digital configurability.

In view of the foregoing, there is a need in the art for improved techniques that require low operational energy, are relatively low cost, are easily and cleanly producible, while being capable of dynamically controlling light transmission.

SUMMARY

In an aspect a system is provided for control of optical properties of light. The system comprises a cell comprising a first optically transparent member and a second optically transparent member. The members are disposed in a vertical direction, parallel to each other and at a distance from each other with closed edges, thereby defining a space between the members. At least two fluids, a first fluid and a second fluid, are provided. Each fluid has at least one optical property different from the other. The first fluid is configured to be received within the space. The second fluid is configured to be received into the space, while at least a portion of the first fluid is disposed in the space. The reception of the second fluid into the space displaces the first fluid. The first fluid and the second fluid interface with each other in the space, while remaining separate. The second fluid is configured to be withdrawn from the space leaving the first fluid in the space.

BRIEF DESCRIPTION OF THE DRAWINGS

FIGS. 8A-8B depicts reversible chromatophore activation in male Antarctic Krill when unexposed;

FIG. 8C depicts localized control over chromatophore coverage of the abdominal segments in Krill;

FIGS. 8F-8G depicts exploded perspectival cross-section showing both the contracted (top) and expanded (bottom) state of a single chromatophore in both Krill and synthetic device;

FIG. 8H depicts images comparing complete chromatophore expansion and contraction sequence in both Krill (top) and synthetic device (bottom);

FIG. 8I depicts images comparing complete expansion and contraction sequence for a cluster of chromatophores in both Krill (top) and synthetic device (bottom);

FIGS. 9A-9C depicts schematic of a single fluidic cell, with no pigment fluid coverage, unbranched pigment fluid coverage, and branched pigment fluid coverage;

FIG. 9D demonstrates the branching of pigment fluid when introduced at higher speed;

FIG. 9E depicts inlet design with needle, luer connector and hose connector;

FIGS. 13A-13E depicts the envisioned large-area fluidic configurations to display halftone imagery;

FIG. 26A depicts Hele-Shaw cell filled with viscous molasses;

FIG. 26B depicts Hele-Shaw cell with radial bubble following pressurized air injection over time;

FIG. 26C depicts Images of radial bubble emergence;

FIG. 26D depicts collapse sequence over time within Hele-Shaw cell;

FIGS. 27A-27C depicts programmable bubble morphology with injection flow rate;

FIGS. 30A-30G depicts modulation of visible light transmission in a Hele-Shaw cell;

FIGS. 34A-34F depicts comparative energy performance of active Hele-Shaw cell;

FIGS. 36A-36F depicts that an aperture morphology can be programmed with flow rate;

FIGS. 37A-37D depicts that an aperture wetting and transmissivity can be programmed with flow rate.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figures 1, 2A:
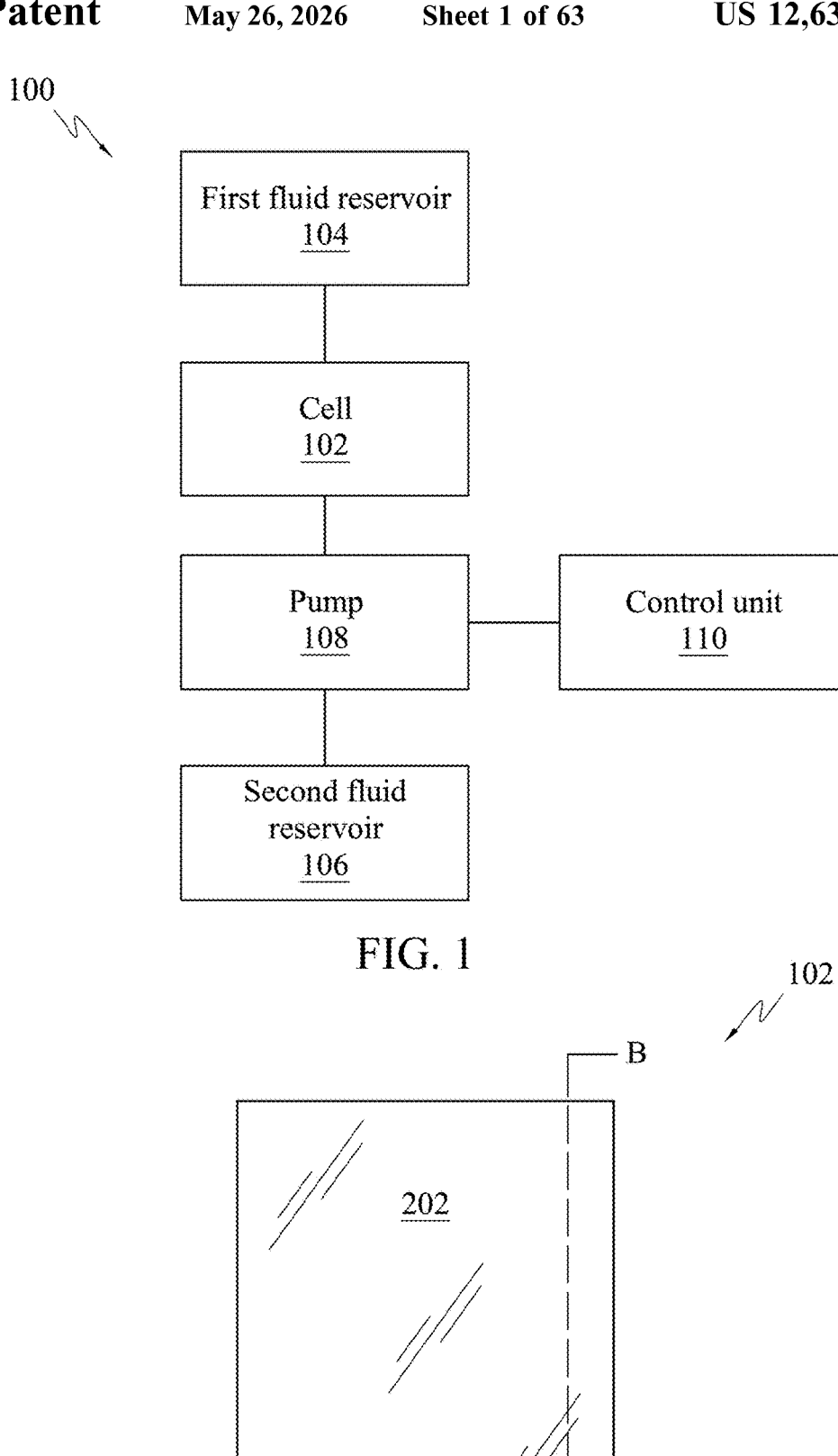
FIG. 1 is a schematic representation of system 100 is provided for control of optical properties of light, in accordance with an embodiment.
FIG. 2A is a top view of a cell 102 of the system 100, in accordance with an embodiment.

Referring to FIG. 1, a system 100 is provided for control of optical properties of light. The system 100 may include a cell 102 defining a space, a first fluid reservoir 104, a second fluid reservoir 106, a pump 108 and a control unit 110. The first fluid reservoir 104 may accommodate a first fluid and the second fluid reservoir 106 may accommodate a second fluid. The cell 102 may be connected to the first fluid reservoir 104 and the second fluid reservoir 106. The first fluid from the first fluid reservoir 104 may enter the space in the cell 102, and may be withdrawn back from the space in the cell 102 into the first fluid reservoir 104. Likewise, the second fluid from the second fluid reservoir 106 may enter the space in the cell 102, and may be withdrawn back from the space in the cell 102 into the second fluid reservoir 106. The ingestion and withdrawal of the second fluid may be accomplished by the pump 108. The operation of the pump 108 may in turn be controlled by the control unit 110.

The pump 108, as per the instructions from the control unit 110, may inject the space in the cell 102 with the second fluid by drawing the second fluid from the second fluid reservoir 106. Further, the pump 108, as per the instructions from the control unit 110, may withdraw the second fluid from the space in the cell 102 into the second fluid reservoir 106. The extent of injection and withdrawal of the second fluid may also be controlled by the control unit 110.

In an embodiment, the reception into or withdrawal of the first fluid from the space in the cell 102 may be a result of the withdrawal from or injection of the second fluid into the space in the cell 102. In other words, a pump may not be separately required for the first fluid.

In an alternate embodiment, a pump configuration may be provided separately for the first fluid, as was explained earlier for the second fluid.

Examples of the pump may include, but not limited to, digital peristaltic pump (INTLLAB RS385-635) and digital syringe pump (New Era Pump Systems, NE-1010).

Figure 2B:
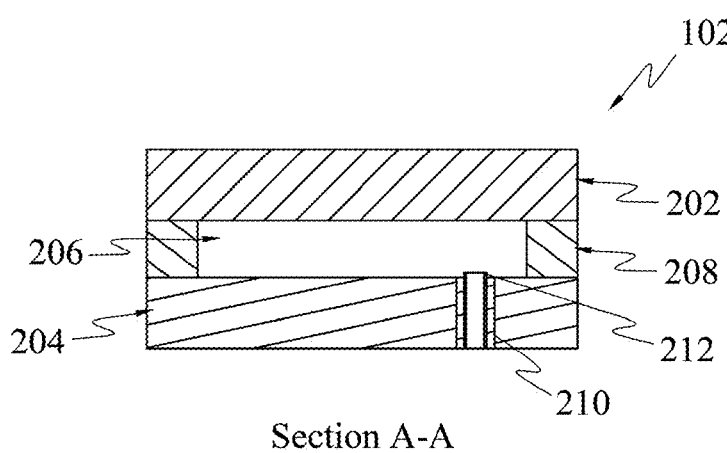
FIG. 2B is a sectional view of the cell 102 of FIG. 2A, in accordance with an embodiment.

We now move on to discussing the construction of the cell 102. Referring particularly to FIGS. 2A to 2B, the cell 102 includes a first optically transparent member 202 and a second optically transparent member 204. The members 202, 204 may be disposed in a vertical direction. Further, the transparent members 202, 204 may be placed parallel to each other and disposed at a distance from each other with closed edges thereby defining a space 206 between the transparent members 202, 204. The cell 102 may include a spacer or a seal 208, which may be provided at the edges of the transparent members 202, 204 to define the space 206. The second optically transparent member 204 may further define a through hole 210 exposed to the space 206. The second fluid may enter and exit the space 206 via the through hole 210 or a port 212 provided at the through hole 210.

In an embodiment, the first fluid may be received within the space 206. Selectively, when there may be need to alter the optical properties of light incident on the cell 102, the second fluid may be received into the space 206, while at least a portion of the first fluid is still disposed in the space. Such an introduction may cause the second fluid to branch in the first fluid, thereby changing the optical properties of the light passing through the cell 102. The injection of the second fluid into the space 206 displaces the first fluid. The first fluid and the second fluid interface with each other in the space, while remaining separate. Selectively, the second fluid may be withdrawn from the space leaving the first fluid behind in the space 206.

Figure 2C:
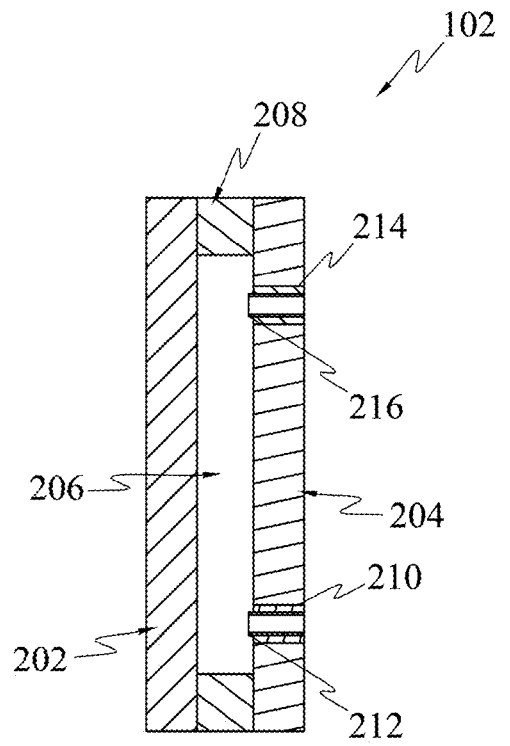
FIG. 2C is a sectional view of the cell 102 of FIG. 2A, in accordance with an embodiment.

In an embodiment, referring to FIG. 2C, the second optically transparent member 204 may further define another through hole 214 exposed to the space 206. The first fluid may enter and exit the space 206 via the through hole 214 or a port 216 provided at the through hole 214. The first fluid may be received into the space 206 through the fluid port 216, and the first fluid may exit the space 206 through the fluid port 216. Notably, the ports 212, 216 may be provided at a distance (without abutting) the first transparent member 202, which may ensure that the ports 212, 216 are not blocked by the surface of the first transparent member 202, when the fluid is withdrawn from the space 206.

In an embodiment, as illustrated in FIG. 2C, fluid ports 212, 216 may be spaced apart. Further, the system 100 may configured to limit injection of the second fluid into the space 206 such that the second fluid fails to reach the fluid port 216 of the first fluid. Such a configuration ensures that the second fluid that is injected into the space 216 does not exit from the fluid port 216 of the first fluid, which otherwise may result in undesired consequences.

In an embodiment, the first fluid is configured to be received within the space 206 by gravity, and the second fluid is configured to be received within the space 206 by external pressure, such as the pump 108. As discussed earlier, the cell 102 may be placed in a vertical configuration, and therefore by providing the fluid port 216 for the first fluid towards the top of the cell 102, the first fluid may be received into the space 206 by gravitational force. The first fluid may exit the space 206 because of the pressure applied by the second fluid entering the space 206.

Figures 2D, 2E, 3:
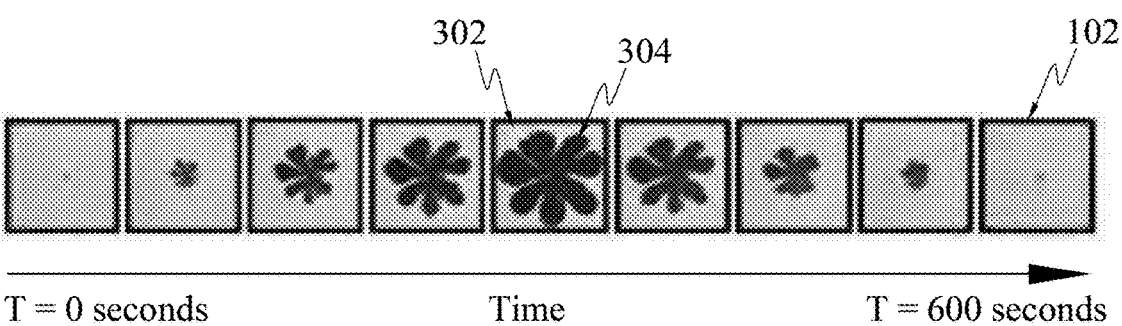
FIG. 2D is a sectional view of an alternate embodiment of the cell 102, in which a backflow area 218 is provided.
FIG. 2E is a sectional view of another alternate embodiment of the cell 102, in which another backflow area 220 for the second fluid is provided.
FIG. 3 illustrates branching of the second fluid 304 into the first fluid 302 in the cell 102, in accordance with an embodiment.

In an embodiment, referring to FIG. 2D, the system 100 may include a backflow area 218. The backflow area 218 may be provided towards the top of the cell 102. The backflow area 218, in an embodiment, may be the first fluid reservoir 104 discussed earlier. The backflow area 218 may interface with the first fluid and may be empty (example, air at atmospheric pressure). The backflow area 218 may define a volume greater than a volume of the second fluid receivable into the space 206. The second fluid causes the first fluid to be displaced into the backflow area 218, when the second fluid is received into the space 206. The first fluid may flow from the backflow area 218 and into the space 206 when the second fluid is withdrawn from the space 206. The first fluid flows from the backflow area 218 and into the space 206 may be assisted by gravity. Such an embodiment may be preferred when the cell 102 is used as window pane. A further alternate embodiment is discussed in reference to FIG. 2E in which a second backflow area 220 is provided. The second backflow area 220 is provided as the second fluid reservoir 106 discussed earlier. The second backflow area 220 may be provided at the bottom of the cell 102. The second fluid in the second backflow area 220 may be injected into the space 106 via the fluid port 212 assisted by the pump 108.

Figure 6:
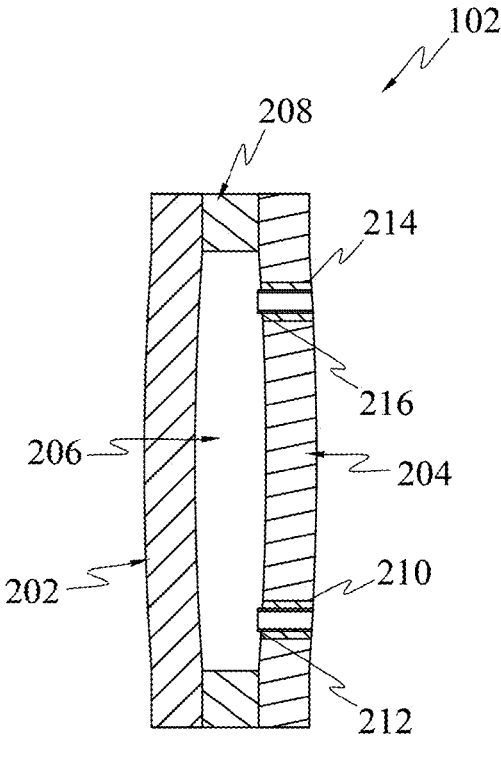
FIG. 6 is a sectional view of another alternate embodiment of the cell 102, in which the transparent members are flexible.

In an embodiment, referring to FIG. 6, of the first optically transparent member 202 and the second optically transparent member 204 are elastic. The reception of the second fluid into the space 206 causes the elastic first optically transparent member 202 and the elastic second optically transparent member 204 to expand. Further, withdrawal of the second fluid from the space 206 causes the elastic first optically transparent member 202 and the elastic second optically transparent member 204 to regain a shape that existed before expansion. It may be noted that, although the figure illustrates both the members 202, 204 to be elastic, it is possible to have any one of the members 202, 204 to be elastic, and the other to be rigid.

Having discusses the various embodiments of the construction of the cell 102, we will now move on to discussing the working of the system 100, in accordance with an embodiment. Referring to FIG. 3, the first fluid and the second fluid may be chosen to have matching, while being immiscible. In an embodiment, first fluid may be liquid, and the second fluid may a gas. The first fluid may be of a clear fluid, while the second fluid may be pigmented. As can be seen in the figure, the second fluid 304 branches into the first fluid 302 as the second fluid 304 is received into the space of the cell 102. The branching of the second fluid 304 may be controlled with viscosity and injection flow rate of the second fluid 304 within the space. Further, as the second fluid 304 is withdrawn from the space of the cell 102, the branch collapse, and the first fluid 302 alone is left in the cell 102.

Figures 4A, 4B:
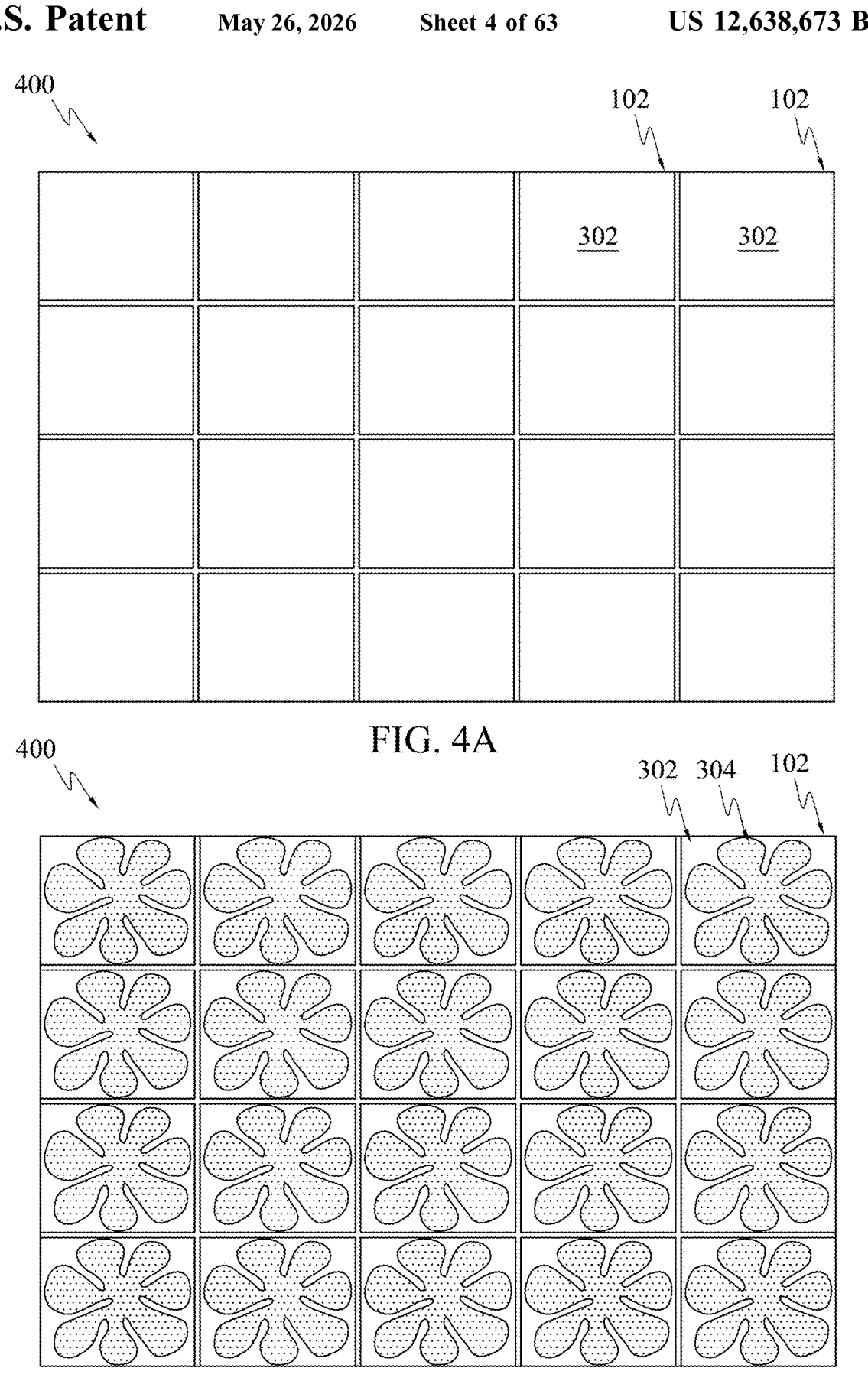
FIG. 4A illustrates multiple cells 102 arranged to form a facade 400 of a building, in which the first fluid alone is present in the cells 102, in accordance with an embodiment.
FIG. 4B illustrates the facade 400, in which the second fluid is introduced into all the cells 102, in accordance with an embodiment.
Figure 4C:
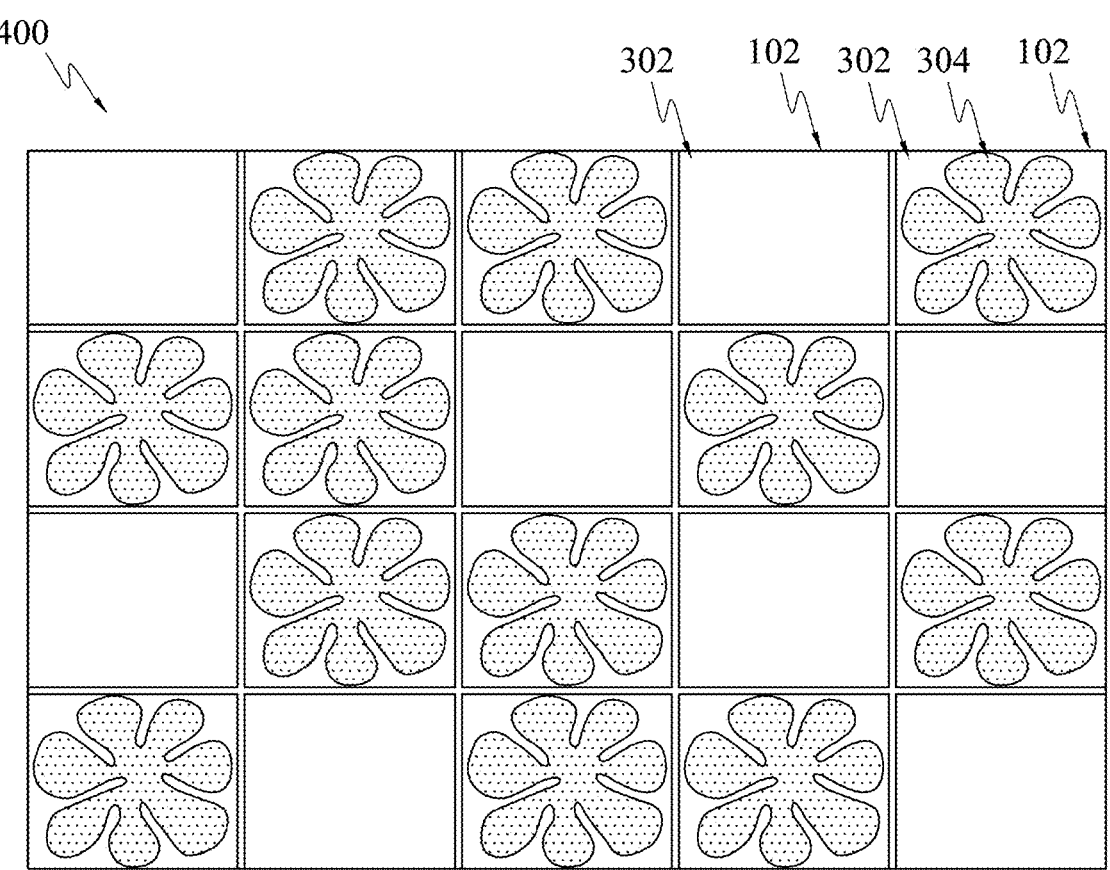
FIG. 4C illustrates the facade 400, in which the second fluid is introduced into some of the cells 102, in accordance with an embodiment.

Referring now to FIG. 4A-4C, a facade 400 for a building may be formed using a plurality of systems 100 or cells 102 arranged adjacent to each other. Referring specifically to FIG. 4A, only the first fluid (clear fluid) may be present in all the cells 102, which may allow for relatively high sunlight penetration into the interior of the building through the facade 400. Alternatively, referring to FIGS. 4B and 4C, based on various factors, such as time of the day, the direction of the facade 400 relatively to the sunlight, desired intensity of illumination, desired scattering of the light and desired temperature inside the building, among others, the second fluid may be introduced into some or all the cells 102.

It may be noted that, selectively, the second fluid may be introduced and withdrawn independently from each of the cells 102, thereby enabling control of the characteristics of the sunlight at the level of each cell 102.

In an embodiment, groups of cells 102 may share a single pump 108, which brings down the cost of the facade, while allowing each of the groups to be controlled independently.

Figure 5:
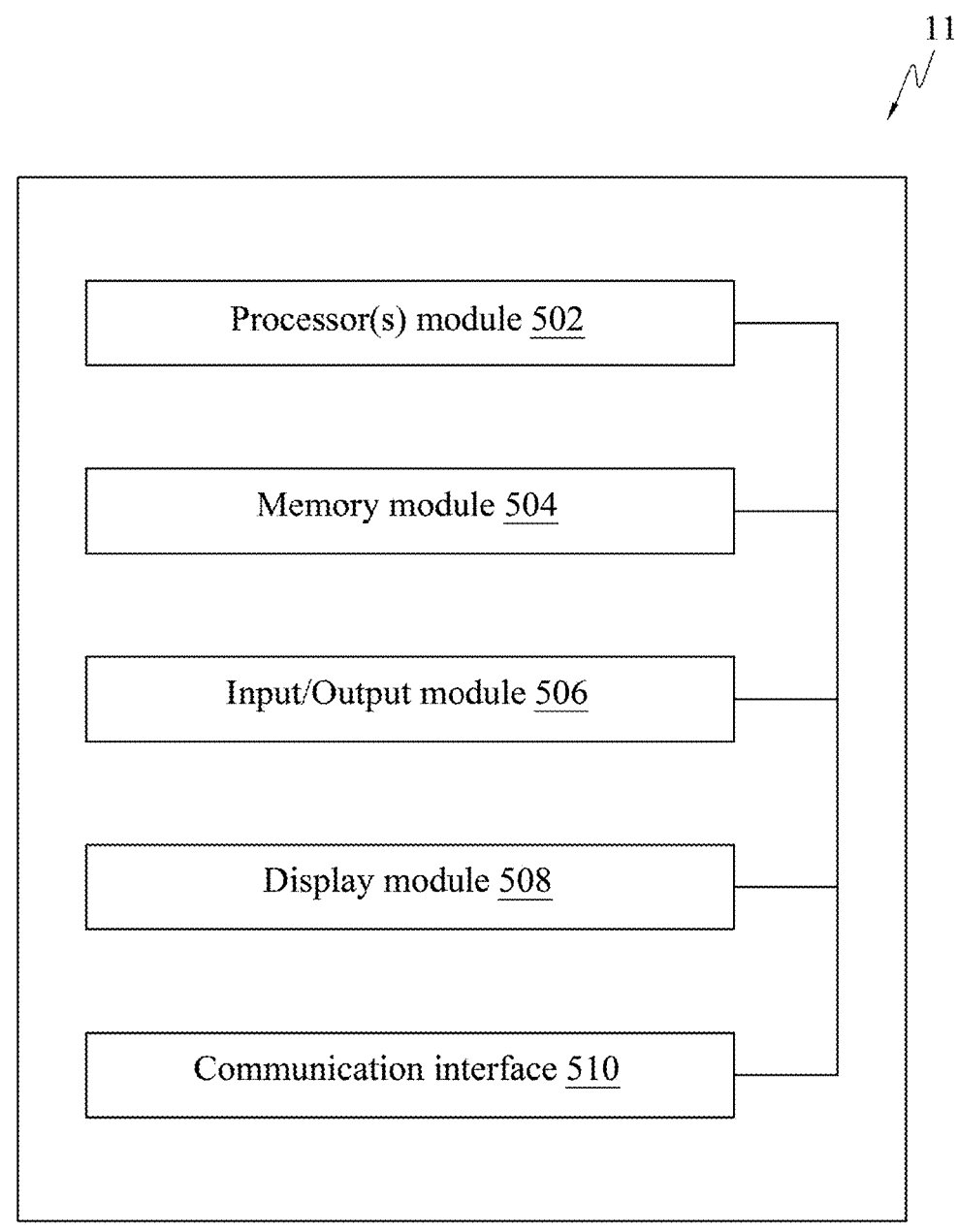
FIG. 5 is a block diagram of a control unit 110 of the system 100, in accordance with an embodiment.

Moving on, as discussed earlier, the flow of the fluids into and out of the cell may be controller by a control unit 110. Referring to FIG. 5, the control unit 110 may include processor(s) module 502, a memory module 504, an input/ output module 506, a display module 508, a communication interface 510 and a bus interconnecting all the modules of the control unit 110.

The processor(s) module 502 may implemented in the form of one or more processors and may be implemented as appropriate in hardware, computer executable instructions, firmware, or combinations thereof. Computer-executable instruction or firmware implementations of the processor(s) module 502 may include computer-executable or machine-executable instructions written in any suitable programming language to perform the various functions described. The instructions that may enable the functionality of the system 102 may be executed by the processor(s) module 502.

The memory module 504 may include a permanent memory such as hard disk drive, may be configured to store data, and executable program instructions that are implemented by the processor(s) module 502. The memory module 504 may be implemented in the form of a primary and a secondary memory. The memory module 504 may store additional data and program instructions that are loadable and executable on the processor(s) module 502, as well as data generated during the execution of these programs. Further, the memory module 504 may be a volatile memory, such as a random access memory and/or a disk drive, or a non-volatile memory. The memory module 504 may comprise removable memory such as a Compact Flash card, Memory Stick, Smart Media, Multimedia Card, Secure Digital memory, or any other memory storage that exists currently or may exist in the future.

The input/output module 506 may provide an interface for input devices such as sensors, computing devices, keypad, touch screen, mouse, and stylus among other input devices; and output devices such as speakers, printer, and additional displays among others. The input/output module 506 may be used to receive data or send data through the communication interface 510.

The display module 508 may be configured to display content. The display module 508 may also be used to receive input. The display module 508 may be of any display type known in the art, for example, Liquid Crystal Displays (LCD), Light Emitting Diode (LED) Displays, Cathode Ray Tube (CRT) Displays, Orthogonal Liquid Crystal Displays (OLCD) or any other type of display currently existing or which may exist in the future.

The communication interface 510 may include a modem, a network interface card (such as Ethernet card), a communication port, and a Personal Computer Memory Card International Association (PCMCIA) slot, among others. The communication interface 510 may include devices supporting both wired and wireless protocols. Data in the form of electronic, electromagnetic, optical, among other signals may be transferred via the communication interface 510.

Furthermore, biological organisms have evolved a vast collection of dynamic regulatory controls to maintain an equilibrium with their environment. As a remarkable example, Antarctic krill, *E. superba*, can actively change colour within minutes depending on sunlight intensity for ultraviolet protection. Like several decapods, krill store and disperse pigment throughout the cells within their skin, evolving a rapid and reversible response mechanism for solar shading (FIGS. 3A-3D).

Buildings, in contrast, are generally unequipped to achieve adaptive solar shading responses, built with static outer facades, despite operating within highly variable temperature and light regimes. A skyscraper in a typical seasonal climate, for instance, might experience fluctuations in solar radiation from almost 0 to an astounding 3 kW/m$^2$ within a day. Static glazing materials cannot regulate optical transmission in response to these fluctuating solar loads. Unshaded windows, for instance, allow excessive solar heating in the summer when directly normal to the sun, contributing to high seasonal cooling energy costs. Windows with infrared-reflective and low-emissivity coatings, on the other hand, limit crucial solar ingress in the winter, and incur equally-consequential seasonal heating energy costs. Beyond heating effects, windows also must provide sufficient total interior illumination while limiting excessive localized glare. Today, in large part because outer glazing materials cannot adaptively or locally shade against solar loads, buildings consume almost 75% of the U.S. national electricity supply and approximately one third of the global energy supply. Adaptive glazing materials, capable of both dynamic and localized solar shading, have the potential to significantly improve energy efficiency for a recognizable impact on climate change, and could additionally reduce local glare to improve indoor human comfort.

Despite this potential impact, active shading in buildings has been difficult to achieve. An 'ideal' optically-active building facade should be locally-responsive (maximize light transmission, but limit glare), digitally-controllable (optimize material properties and building configuration), low-cost and scalable across large areas, while also energy-efficient to operate. Currently, many buildings only achieve shading through manual, large-scale, mechanical blinds. Rotating shading frits and other automated mechanical structures have also been tested. However, these macroscale mechanical approaches are typically costly, slow, and have low spatial resolution for localized shading responses. Certain smart materials have also been developed for active shading, but have practical limitations. Electrochromic systems, for instance, which use chemical redox reactions to control optical transmission, are expensive and complex to manufacture, restricting market viability. More experimental chromogenic systems that use electrically-reorientable liquid-crystals and suspended-particles, as well as active polymers that leverage dielectric elastomer actuations, require a continuous energy supply to maintain a 'bleached' state. Finally, stimulus-responsive materials and actuators (e.g., photochromics, thermochromics, and hygroscopics) suffer functional restrictions of their own, and cannot be digitally controlled or decoupled from their unique environmental triggers, limiting both the capacity for digital information processing and tuneable user control.

Furthermore, buildings typically interface with the environment statically. Their outer facades, which regulate the ingress and egress of energy between interior and exterior regimes, are conventionally designed as hybrid systems of fixed thermal insulators (e.g., walls) and fixed optical conductors (e.g., windows). This static disposition critically undermines energy performance; buildings aim to maintain a constant indoor environment, but cannot tune material properties to quickly address hourly, diurnal, and seasonal fluctuations in exterior temperature, daylight availability, and radiative solar intensity. The development of active building facades, capable of achieving on-demand responses to these solar fluctuations, has emerged as an important scientific and engineering challenge.

Conventional mechanisms to control light transmission through the building facade are generally either low-resolution, impractical, or expensive. Most conventionally, buildings actively shade through manual or automated blinds, controlled on the interior side of the facade. Related mechanical proof-of-concept systems have also been reported, including rotating fritting structures, bending elements, and active microscopic and milliscopic daylight-regulating louvers, each able to modulate shading density. Unfortunately, some of these mechanical systems are low-resolution, rigid, and prone to failure, and have only been implemented within a handful of buildings to date. Stimulus-responsive mechanisms have also been proposed for dynamic shading applications, where local environmental changes, rather than mechanical actuations, drive material configuration. For instance, moisture uptake in hygroscopic materials, driven by vapor pressure gradients, can cause a macroscopic change in material structure. Similar efforts have been established to develop thermo and photochromics, which modulate optical transmission in response to light intensity and temperature. Despite the potential to achieve local actuation without a supplied energy source, the inability to decouple these material responses from their dedicated environmental stimuli limits applicability within real-life building environments. Electrochromic devices have also been developed for buildings, where a controllable electric potential can be leveraged to modulate optical transparency. While the functional performance of these systems has improved drastically over the years, their manufacturing remains costly and complex.

The disclosure includes reference to:

a vertically-oriented Hele-Shaw cell using density-matched fluids (injected and host)

reversible injection and withdrawal of the injection fluid, and using digital control modulation of overall light transmission (visible and infrared) through the Hele-Shaw cell by the amount of (pigment-loaded) injection fluid into a clear fluid, which affects interior building temperatures an array of multiple Hele-Shaw cells, each independently controlled, with programmed response overall improvement in building energy efficiency through an optimization of the programmed response (of states) of an array on building surface, able to respond to environmental and season change (temperature, solar exposure).

Biological organisms often leverage microscopic fluidic mechanisms, manipulating pigment-containing fluids intra- or extracellularly to adaptively regulate optical or thermal properties at their surface. Mammals dilate blood vessels near their skin to control their rate of convective heat loss; cephalopods stretch fluid-containing sacs to generate colourful displays for adaptive camouflage and visual communication; brittle stars transport fluidic cells between sub-surface regions to regulate photoreception; and decapods move pigments within their skin to thermoregulate and dynamically shade against the sun. In low-light conditions, krill store pigments in a central reservoir within sub-surface chromatophore cells. Under intense light exposure, they can rapidly spread pigment through the branching microtubules of the chromatophore, expanding the diameter of pigment coverage from <100 μm within the reservoir to >500 μm expanded across the cell and, in aggregate, across the affected surface regions of their body. Fluids have independent optical properties, and can self-organize within or around a variety of structures and surfaces. Biological fluid dispersal enables dimensional material changes unachievable in the solid phase, where small volumes of fluid can be centrally stored and readily dispersed over large planar areas to induce changes to global optical properties.

Tuning the Reversible Branching Morphology of Injected Fluids

Marine organisms use branched vascular networks to disperse pigment within their skin. In this work self-organizing branching architectures dynamically and reversibly are generated, within a confined two-phase fluidic system (FIG. 9A-E, F). Viscous fingering is a mechanism for branching pattern formation, occurring when a less viscous fluid is forced under pressure into a more viscous fluid while constrained between two closely spaced plates. This patterning has been widely demonstrated and characterized within the quasi-two-dimensional Hele-Shaw cell, where boundary conditions dictate the morphology and planar area coverage of the invading fluid. Here it is reported reversible control over the viscous fingering mechanism. It is demonstrated that expandable and retractable pigment coverage, from a stored to dispersed state, across a Hele-Shaw cell (FIG. 9F-G), analogous to pigment dispersal in the krill chromatophore cell (FIG. 10F-G).

Hele-Shaw cells ($30 \times 30 \times 0.1$ cm$^3$) confined by PMMA plates were developed controlling fluid access digitally through a central injection point. In their transmissive (clear) state, cells contained a transparent viscous fluid (mineral oil, 891 cP), enabling full transmission of visible light. To shade, a less viscous fluidic pigment was injected (carbon black suspension in water-glycerol solution, 0.89-891 cP) into each cell (FIGS. 3H-3I, FIGS. 9A, 9D-4E). Optical transmission was measured for suspensions across different carbon concentrations, and found a critical concentration (1.0 g C/50 mL H$_2$0) such that transmission was 0% across the full visible and infrared spectrum for a fluid thickness equal to the depth of the cell, FIG. 5B).

Interfacial instability driven by pressure gradients causes feedback branching effects. For vertical Hele-Shaw cells, unstable tip-splitting growth of fingers occurs when the amplification factor, $\alpha > 0$, for $$a = \frac{b^2}{12(n1+n2)}\left[\frac{2\pi}{\lambda}\left\{\frac{12V}{b^2}(n1-n2)+g(\rho1-\rho2)\right\}-\frac{8\pi^3\sigma}{\lambda^3}\right] \qquad (1)$$

Where $n_1$ is the host fluid viscosity, $n_2$ is the invading guest fluid viscosity, $\rho_1$ is the host density, $\rho_2$ is the guest density, g is the gravitational constant, V is the interface velocity, b is the gap height between the two plates, $\sigma$ is the interfacial surface tension, and $\lambda$ is the wavelength of the instability. Unstable branching tips will grow if the viscosity and density differences are sufficiently positive, and the width of the tip is large enough to overcome interfacial surface tension. However, if the direction of flow is reversed, it can be expected that the reversal of stability. The sign of a changes, causing a decay of finger amplitudes. This allows the design to be completely reversible: when driven in the forward direction, instabilities cause branching network formation. When driven backwards, the curvature dampening effect allows for the coordinated collapse of the invading fluid back to its source. To tune the branching behaviour in a selected fluid medium, the critical finger width $\lambda_c$ was modulated, $$\lambda_c = \pi b \sqrt{\frac{\sigma}{\Delta n}} \qquad (2)$$

Then, $\lambda_c$ can be decreased or increased by increasing or decreasing the injection rate Q, related to V, or relative viscosity $\Delta n$.

Figure 8E:
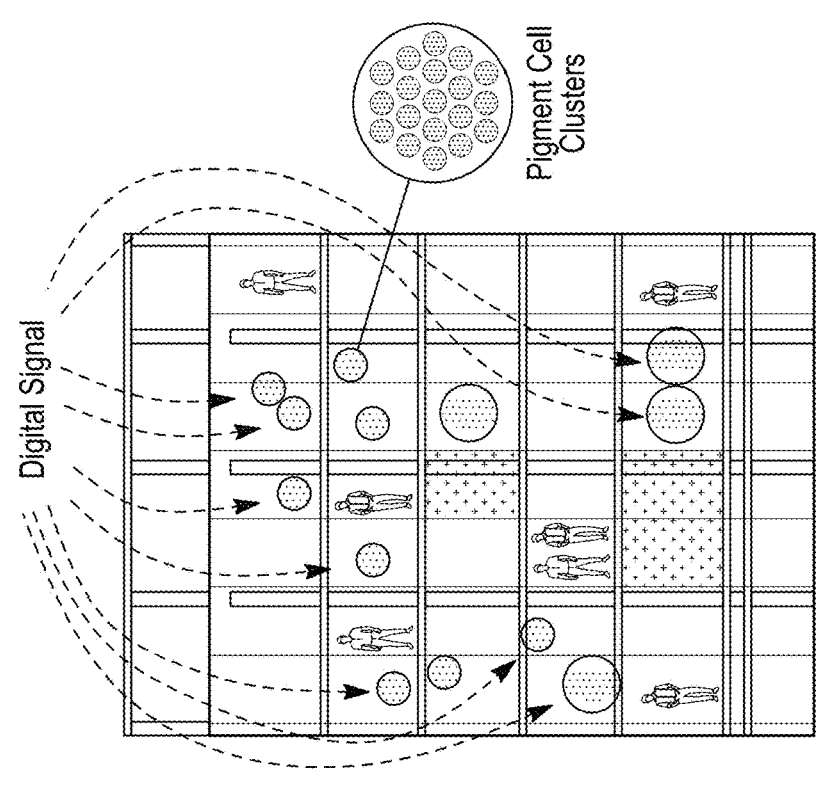
FIGS. 8D-8E depicts schematic comparing the activation pathways for both biological chromatophore clusters in Krill and synthetic chromatophore clusters in buildings.
Figure 8D:
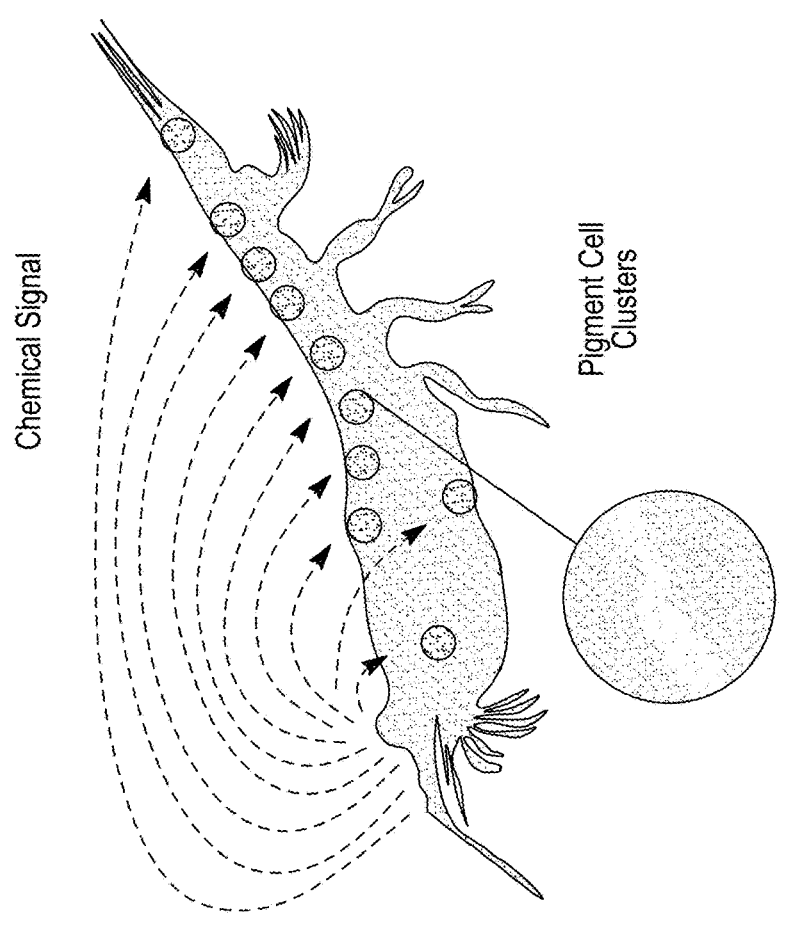
Figure 8J:
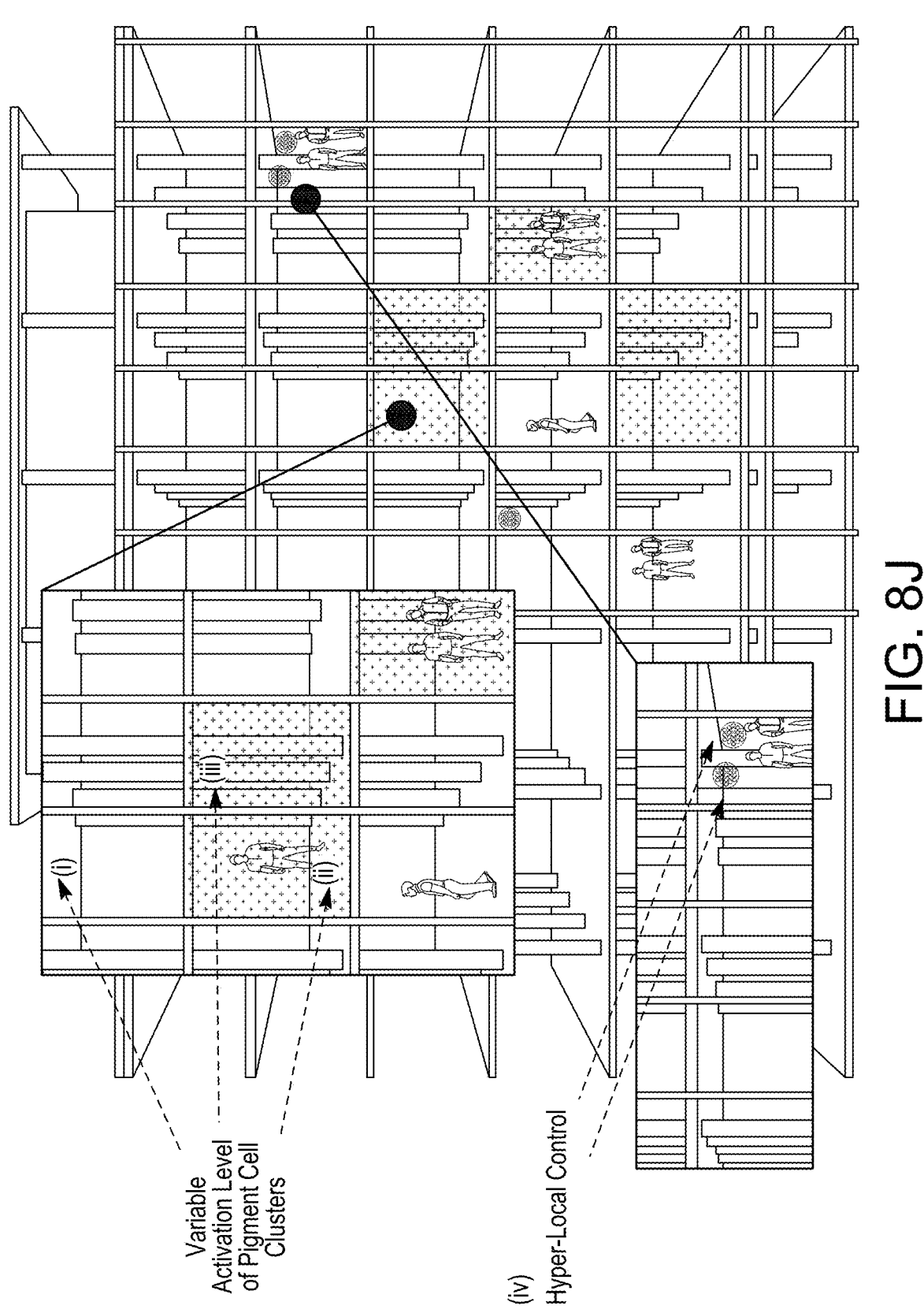
FIG. 8J depicts render showing dynamic and localized synthetic chromatophore activation within a building facade.
Figure 9F:
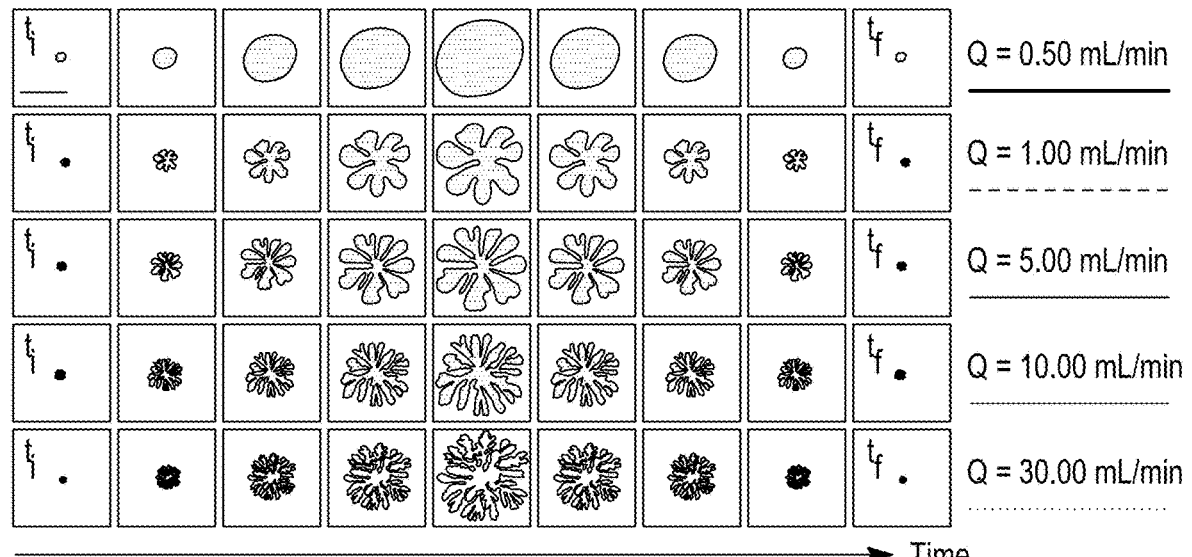
FIG. 9F depicts reversible pigment injection/withdrawal.
Figure 9G:
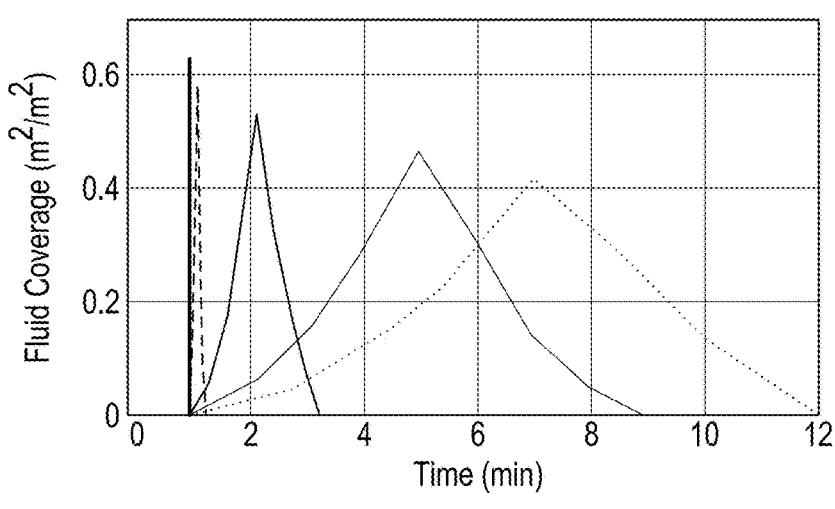
FIG. 9G depicts the fluid coverage as a function of time for experiments pictured in FIG. 9F.
Figure 9H:
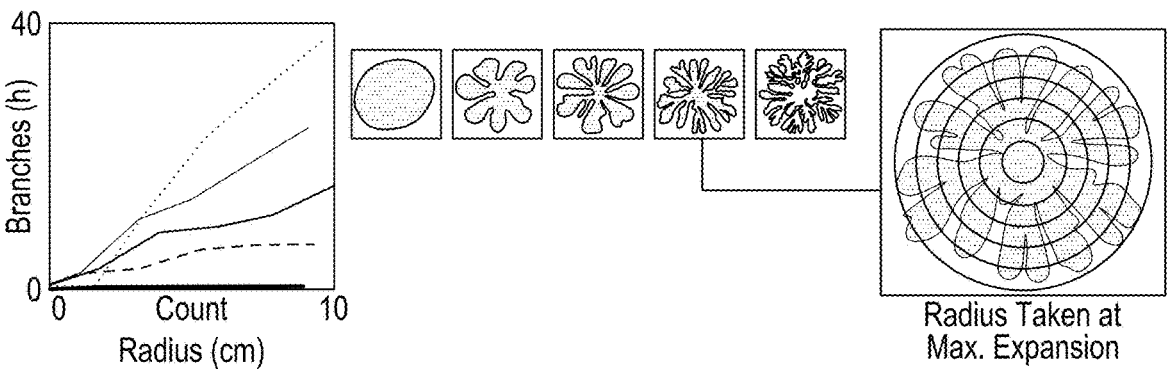
FIG. 9H depicts that the number of fluidic branches increases with flow rate.
Figures 9I, 9J, 9K:
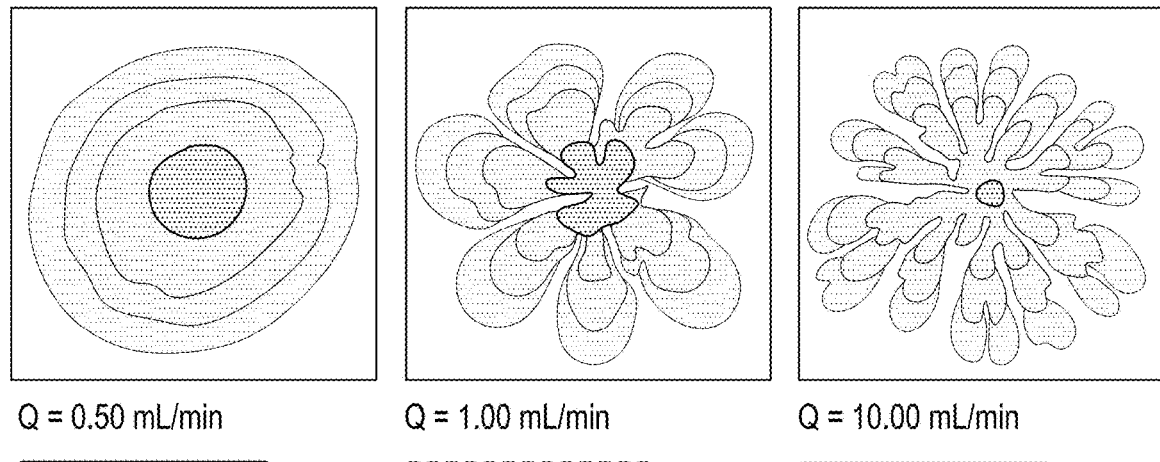
FIGS. 9I-9J depicts overlayed images of pigment fluid dispersal over time for three different flow rates.
FIGS. 9K-9L depicts cyclical light intensity measurements across three pigment fluid dispersal and contraction cycles.
Figure 9L:
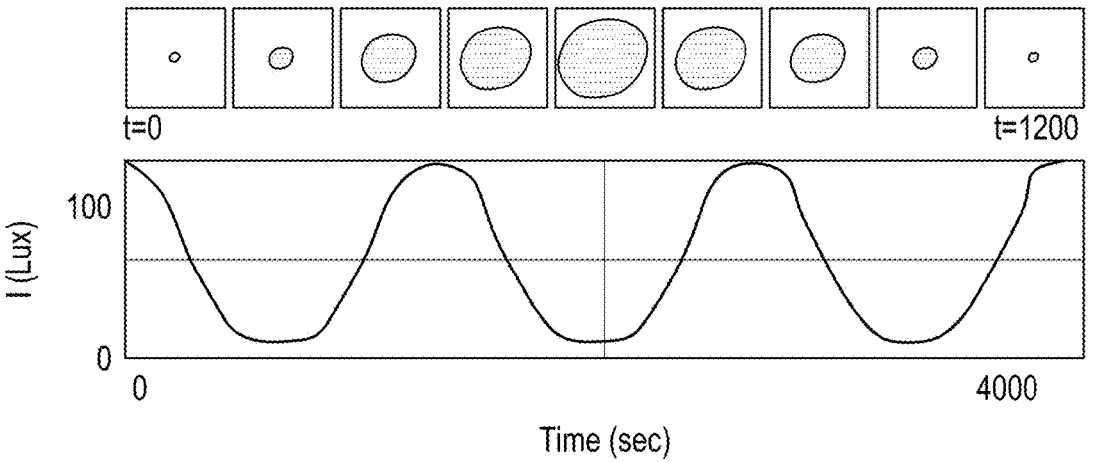

It is established that reversible control over planar pigment coverage by injecting and withdrawing fluidic pigment (roughly 20 mL) within a confined Hele-Shaw cell at a controlled rate (FIG. 8H, FIG. 9F). It is established that control over pigment morphology by injecting and withdrawing fluidic pigment at independent constant flow rates (FIG. 9F), influencing both the fractional fluidic area coverage (FIG. 9G) and the branching pattern features (FIG. 9H), consistent over multiple cycles (FIGS. 9L-9N). Through fluidic morphology control, fractional light transmission indirectly is tuned (FIG. 9L-9N). Transmitted light decreased linearly with fluidic pigment coverage area, initial slope). By controlling the branching effects of the pattern with flow rate, light transmission was modulated by 23%, and, by additionally controlling the branching effects of the pattern with viscosity differences, light transmission was modulated by 12%. It is therefore demonstrated how branching stability can be leveraged to control solar exposure in the built environment. Agreement between branching structure geometry and Equation 2 is reported.

Stable Vertical Fluid Injection

Branching occurs outside of thermodynamic equilibrium. Finger features are therefore unstable, and highly branched patterns decay towards a less-branching state over time. Unstable finger structures are also susceptible to disconnection during retraction, and compromise reversibility over several cycles (n>40). To improve system reversibility and preserve pattern morphology over time, it was designed for and demonstrated stable interfacial growth (i.e., for a<0 in Equation (1)) in a Hele-Shaw cell.

Non-branching fluid injection was achieved, for the first time, within a vertical cell by constraining a<0 and $c_{patt}$<$\Delta$, in Equation (1) such that $$\frac{2\pi}{b^2}\left\{\frac{12V}{b^2}(n1-n2)+g(\rho1-\rho2)\right\}<\frac{8\pi^3\sigma}{cpatt^3}$$

where $c_{patt}$ is the circumference of the largest fluidic pattern achievable within a Hele-Shaw cell with diameter $c_{patt}/\pi$. Guest and host fluids were selected to be immiscible and of the same density ($\rho1-\rho2=0$), while interfacial surface tension was made sufficiently large to overcome viscosity difference $$\left(\text{for } a<0, \text{ then } \sigma>\frac{3Vcpatt^2}{\pi^2b^2}(n1-n2)\right).$$

The range of multifluid interfacial surface tensions and viscosity differences acceptable to achieve a<0, for $c_{patt}$=0.12 m, b=0.004 m, and V=0.0001 m/s within the vertical cell, is bounded by the line with slope $$m=\frac{3Vcpatt^2}{\pi^2b^2}, \text{ or } m=27 \text{ mm/s}.$$

Uniform Optical and Thermal Responsiveness

Heating and cooling energy usage in buildings is largely regulated through conductive heat flow and radiative solar heat gain through the facade. Conductive heat flow, Q, through a cross-sectional surface area, A, is given by Q=A·U·$\Delta$T, where $\Delta$T is the difference in indoor and outdoor temperature, and U is the heat transfer coefficient. Radiative heat gain, defined by a fractional solar heat gain coefficient (SHGC), is given by SHGC=Tsol+Asol·N, where $$T_{sol}=\left\{\sum_{\lambda=250\,nm}^{2500\,nm}T_{\%}\lambda\right\}$$

is the transmission fraction across the solar radiation spectrum on Earth, Asol is the solar absorptance fraction, and N is the inward reemission fraction. Decapods control radiative solar heat gain to thermoregulate by controlling the volume of pigment dispersed within their skin. Analogously, in the fluidic building layers, solar heat gain through visible and infrared transmission can be regulated through control over the injected volume of fluidic pigment expanded across a two-dimensional surface plane.

A multicell facade was fabricated, with 16 unique injection sites and 16 corresponding sensors. Cells were designed with an elastic cell wall, removing drainage requirements. Using the input of photosensors behind a cell, a digital negative feedback system was developed to drive the pigment fluid injection response to regulate transmission, based on measured values of light intensity (FIGS. 10C-10F). Similarly, using the input of thermocouples behind a cell, a digital negative feedback system was developed to drive the pigment fluid injection response to regulate infrared transmission, based on measured values of temperature (FIGS. 10K-10N).

Critically, active control over solar heat gain and internal temperature independent of conductive heat flow was demonstrated, Q, through surface manipulation of a solar-absorbing fluid with a unique SHGC. In buildings, infrared light transmission underpins energy consumption, and it has been estimated that adaptive control over infrared light transmission and SHGC, as it is reported here, in just 18% of building windows could reduce building energy use by around 50%.

Differential Optical Responsiveness

Figure 11A:
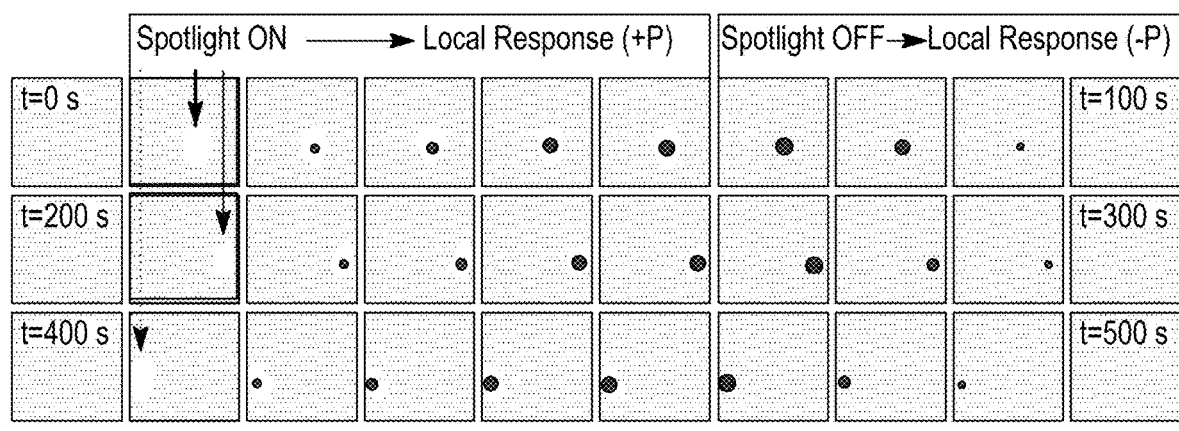
FIGS. 11A-11G depicts differential pigment fluid responsiveness.
Figure 11B:
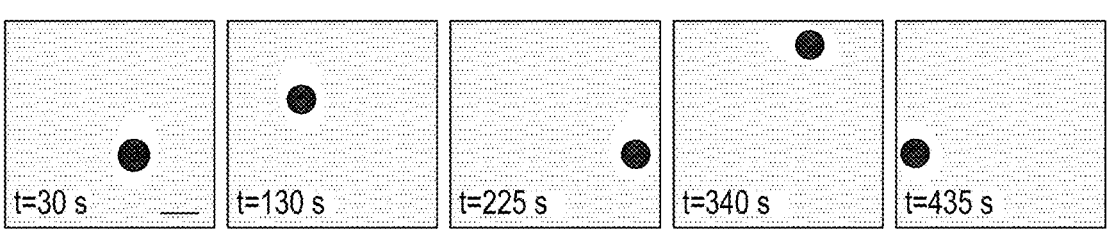
Figure 11C:
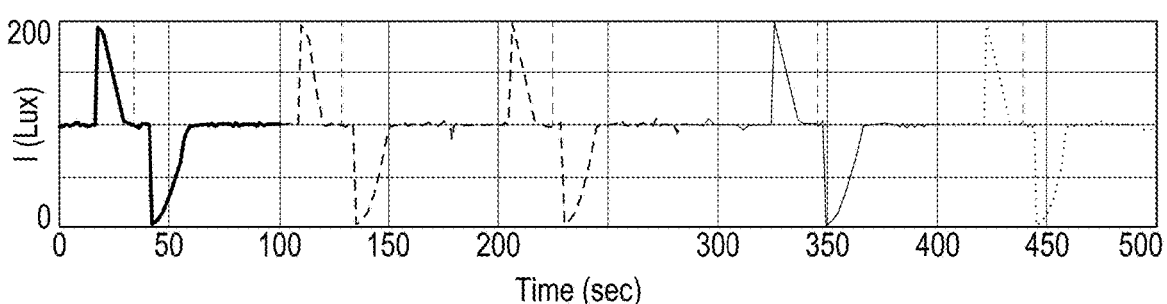
Figure 11D:
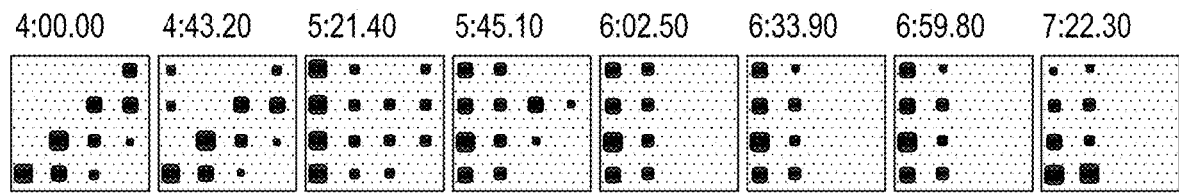
Figures 11E, 11F, 11G:
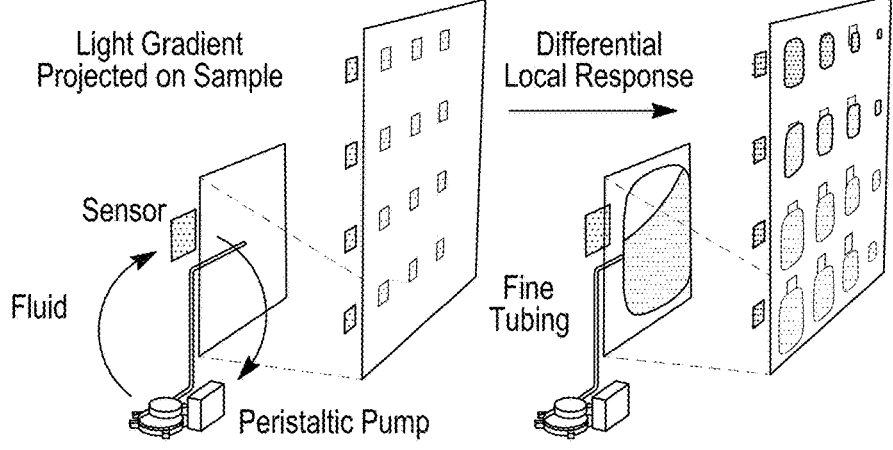

Crucial in the camouflaging, shading, and thermoregulatory efforts of several marine organisms is the coordinated differential response of independent fluidic cells over an animal's surface. Analogous to organisms with independent chromatophore actuation, a multicell facade was developed, and a cell-independent negative feedback system to regulate light transmission differentially (FIG. 11G). Cells were selectively illuminated, and responded within 15 s to locally-targeted light pulses (FIGS. 11-11B). Additionally, it was demonstrated that independent and differential fluid cell control (FIG. 11D), and multicell differential fluid dispersal as a response to a light intensity gradient (FIG. 11E). This experiment is illustrated in FIG. 11F. Pigment response was rapid (<100 seconds, similar to pigmentary responses across decapods) and was observed to be repeatable across several cycles. Other experiments were performed to demonstrate fluidic responsiveness proportional to measured light intensity. These tissue-like differential responses enable independent, localized surface control over direct and indirect solar ingress, which can limit glare and excessive daylight, improving building occupant comfort, productivity, and health.

Simulated Building Performance

Dynamic fluid control enables a continuous digital search for an optimal facade configuration (SHGC) and, indirectly, a significant reduction to both heating and cooling energy within a building. Heating and cooling functions, along with ventilation loads, represent roughly 10-20% of the total energy use in developed countries, and are a major source of greenhouse gas emission. Estimates suggest this energy use can be halved by strategically regulating the transmission of visible and infrared light, through active control over the surficial SHGC.

Figure 7A:
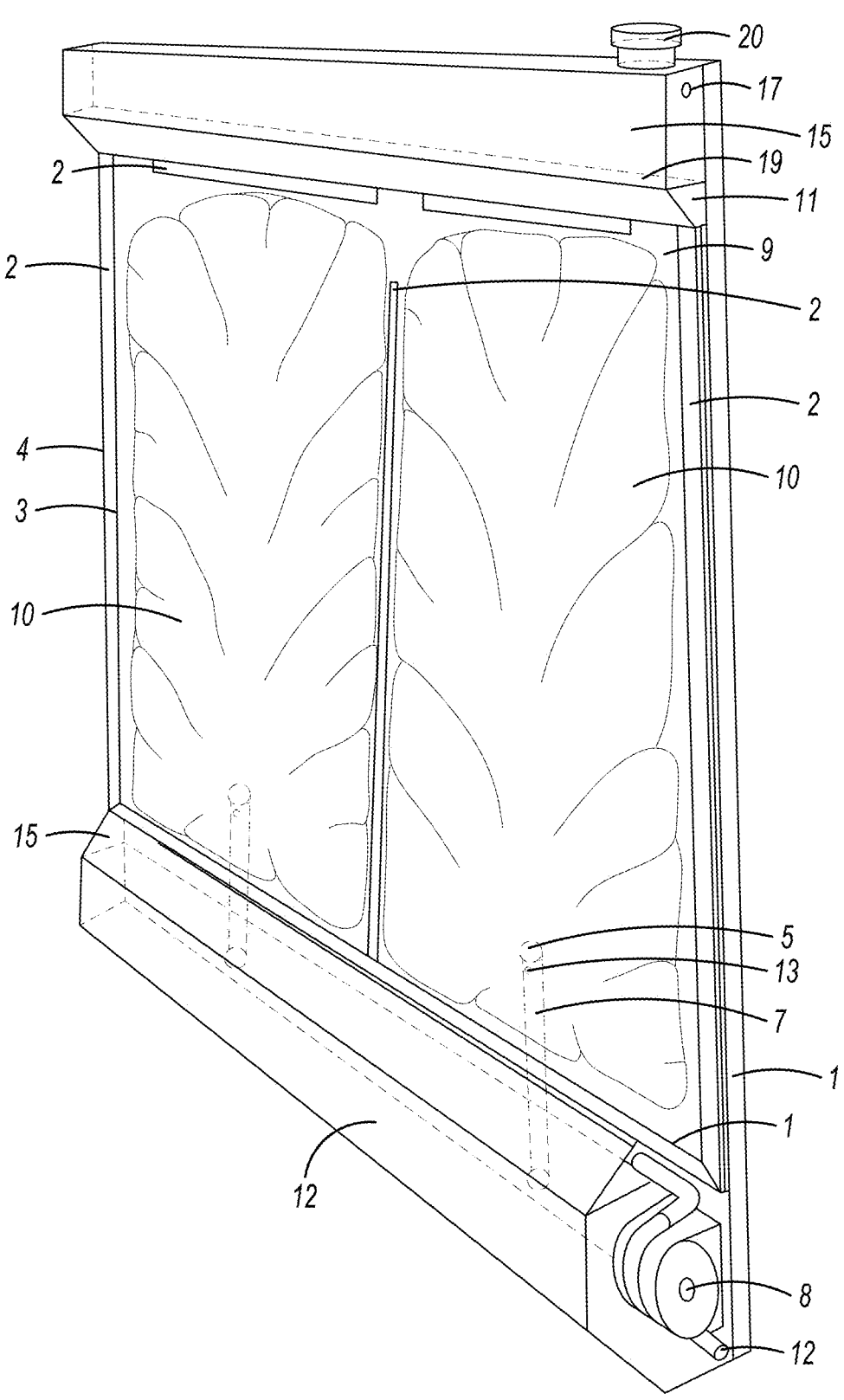
FIGS. 7A-7B illustrate an implementation of the system in accordance with an embodiment.

To assess the relative solar heat gain impact of the dynamic fluidic system, simulated annual heating and cooling energy usage between the adaptive facade and conventional static claddings was compared (double-pane glass facade, double-pane glass facade with low-emissivity coating, double-pane glass facade with permanent 60% area sun-shade) for a simple space (20 m×20 m×6 m) in Boston, Massachusetts (chosen for its seasonally-varied climate) (FIG. 7A). A fluidic facade configuration was searched for and selected every hour such that the heating and cooling energy load for that hour was minimized.

Figure 12A:
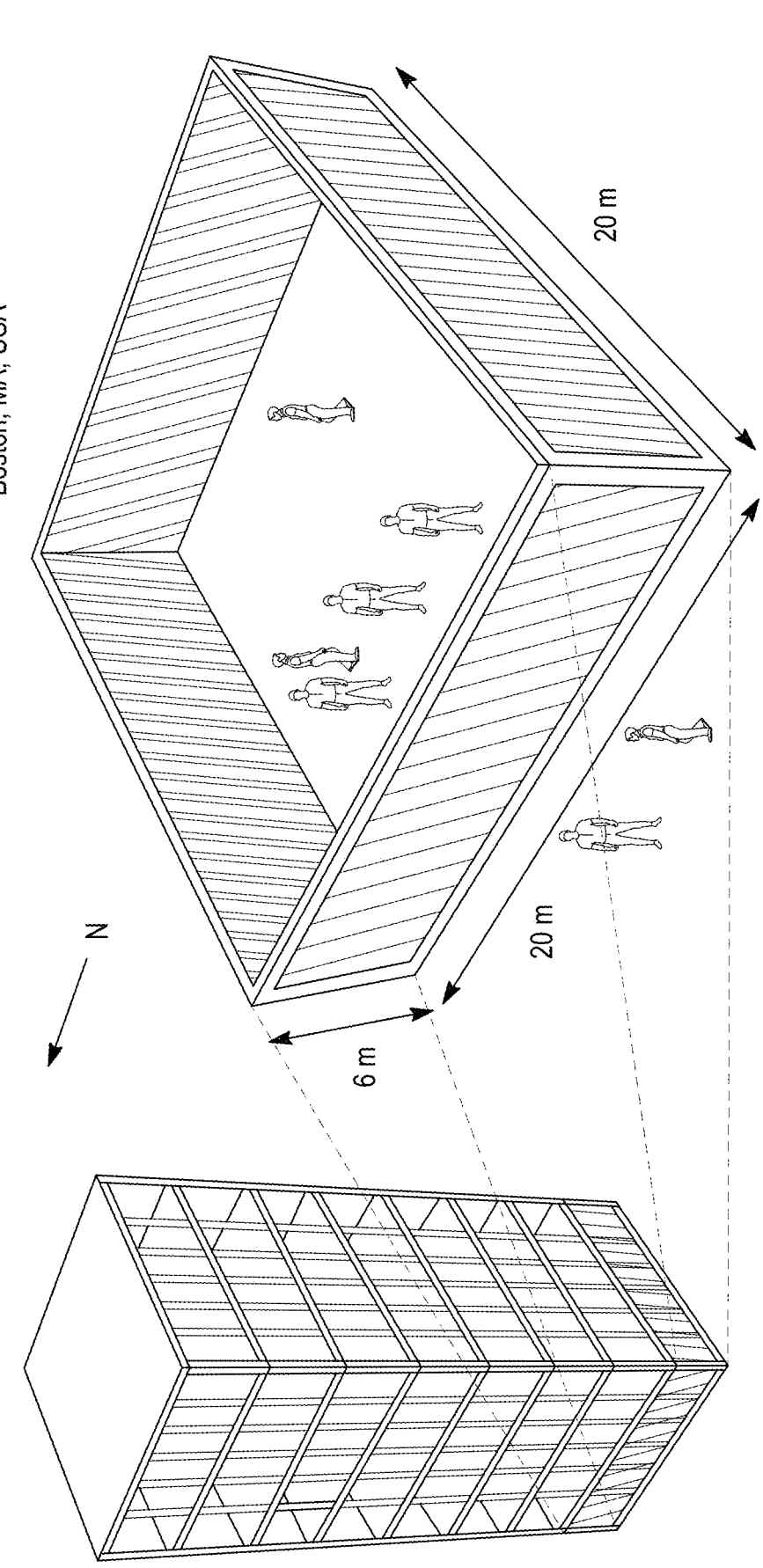
FIGS. 12A-12N depicts simulated system performance and annual energy savings.
Figures 12B, 12C, 12D, 12E:
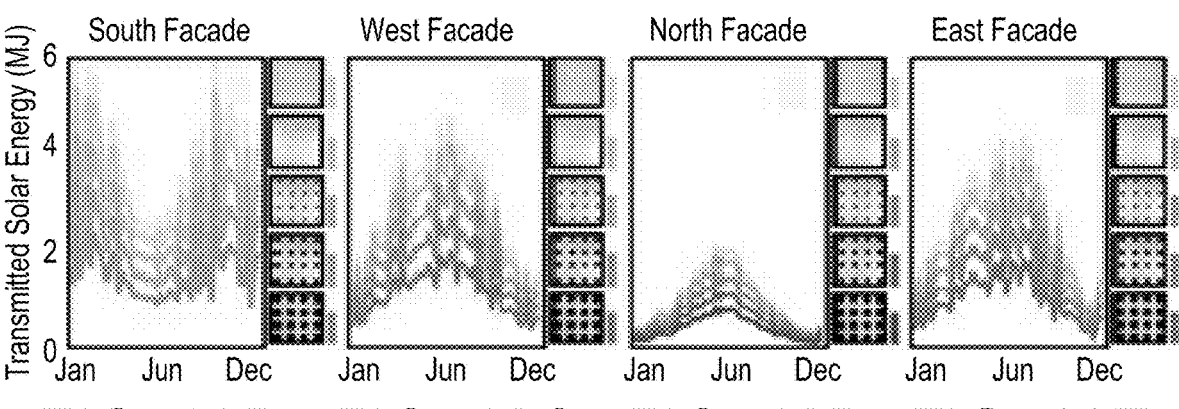
Figure 12F:
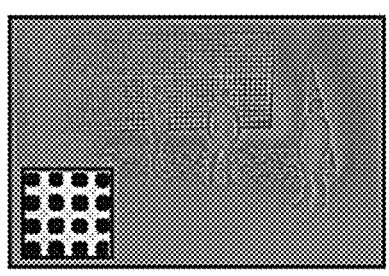
Figure 12G:
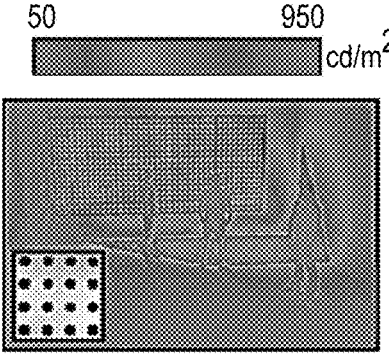
Figure 12H:
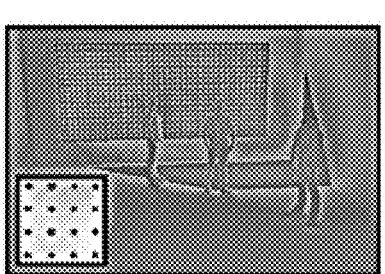
Figure 12I:
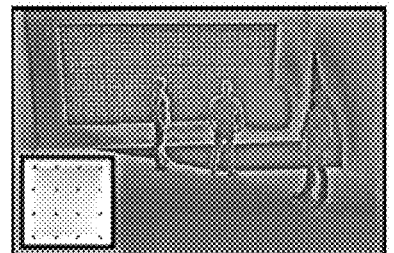
Figure 12J:
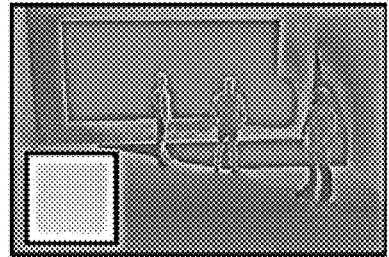
Figure 12K:
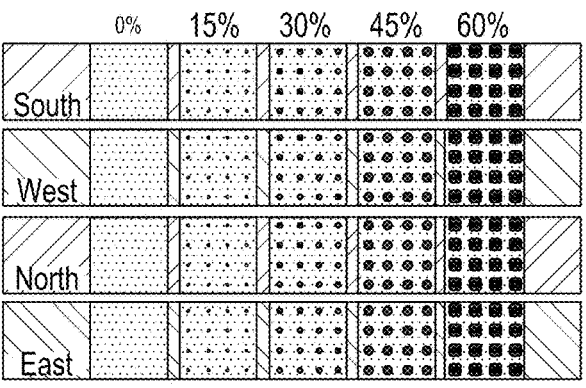
Figure 12L:
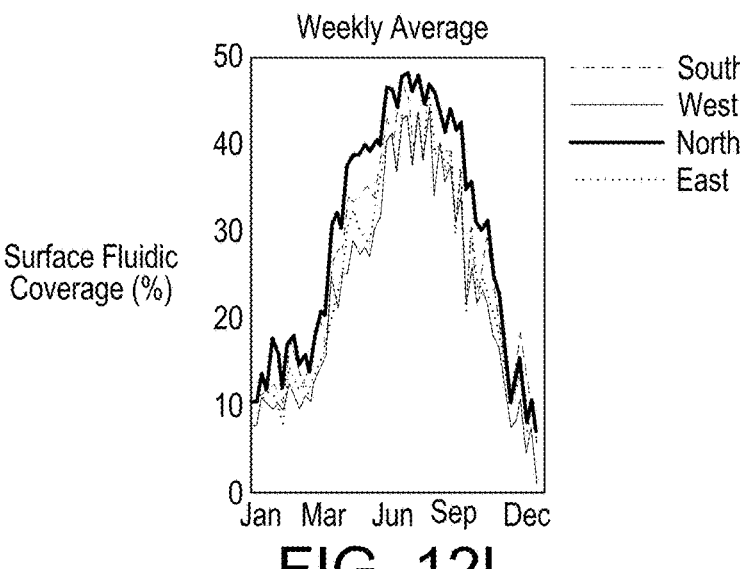
Figure 12M:
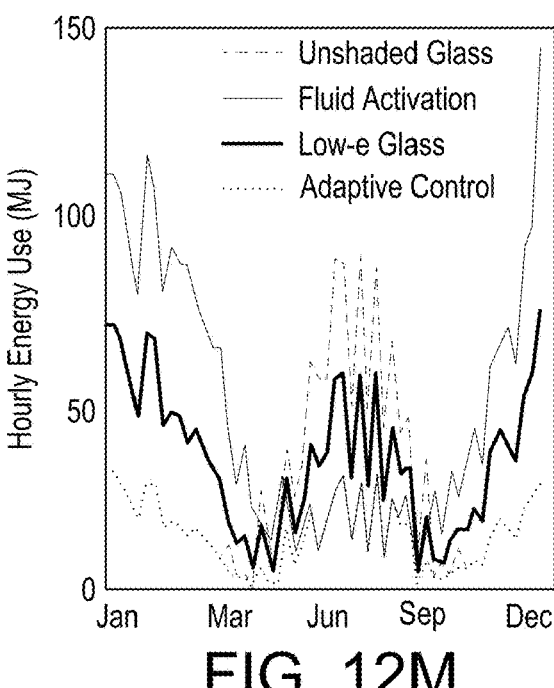
Figure 12N:
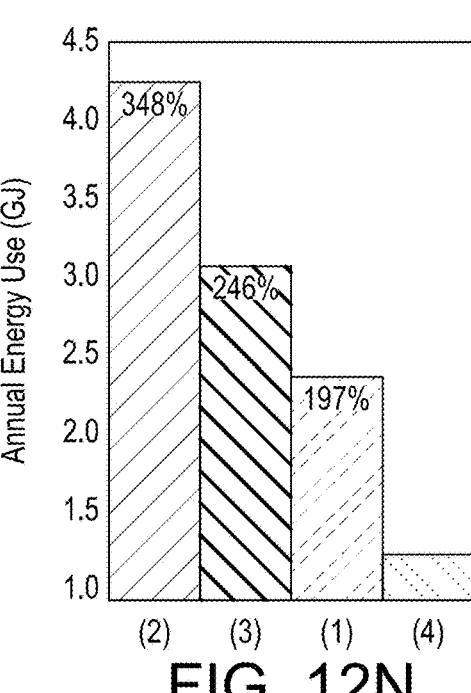

An annual heating and cooling energy savings of 71%, 59%, and 50% between the adaptive facade and a statically-shaded double-pane glass facade, a double-pane glass facade with a static low-emissivity coating, and a static double-pane glass facade, respectively was reported (FIG. 12M). Savings were achieved through constant facade reconfiguration (FIG. 12L), finding the minimum-energy configuration at an hourly time step. Statically-shaded and low-emissivity facades have low SHGCs (<0.1) and perform relatively favourably in the summer months, blocking hurtful thermal radiation, but relatively poorly in the winter months, blocking helpful thermal radiation. Oppositely, static glass facades have high SHGCs (>0.7) and perform relatively favourably in the winter months, transmitting helpful thermal radiation, but relatively poorly in the summer months, over-transmitting thermal radiation. The adaptive fluidic facade can bypass seasonal performance constraints through consistent spatial reconfiguration of a fluid varying the average surficial SHCG by 100%.

Importantly, results suggest that active control over fluids with independent absorption properties can induce significant changes to solar heat gain (ΔSHGC>95%) and heating and cooling energy consumption (50-71%), independent of thermal properties (conductivity). It is proposed that fluids can enable a new optically-adaptive paradigm in building design, and suggest a systematic investigation into the energy impact of active pigment control across climatic regions and building typologies.

DISCUSSION

This work leverages millifluidic self-organization to enable new adaptive optical behaviours at the building scale. A scalable mechanism was established for responsive building shading, through the digitally-controlled dispersion and retraction of small volumes of fluid over large planar areas. Principles of self-assembly are scarcely applied above the molecular length-scale, however it was demonstrated that the self-organization of branching flow can be manipulated via boundary conditions to tune the nature of optical transmission to desired rates. Control over the degree of branching in surface pigments can be used to adaptively adjust the condition of optical filtration. Light quality can be controlled, where highly branched pigmentary morphologies produce more uniform transmission compared to the quality of light produced with less branching fluidic patterns.

Now more than ever, as sensory capabilities grow in intelligent buildings, digital actuation capabilities are critical. Multicellular, digital pigment control enables localized responsive behaviour, through a fluidic material mechanism, to tune building properties and improve energy performance. The system demonstrates distributed surface-level sensing and responsiveness—a key attribute of certain marine organisms, that also use active fluidic elements to generate remarkable adaptive displays. In some cephalopods, both sensory and responsive functions are implemented directly in the dermal structure itself, enabling efficient and localized visual feedback that can circumvent centralized control.

Figure 13E:
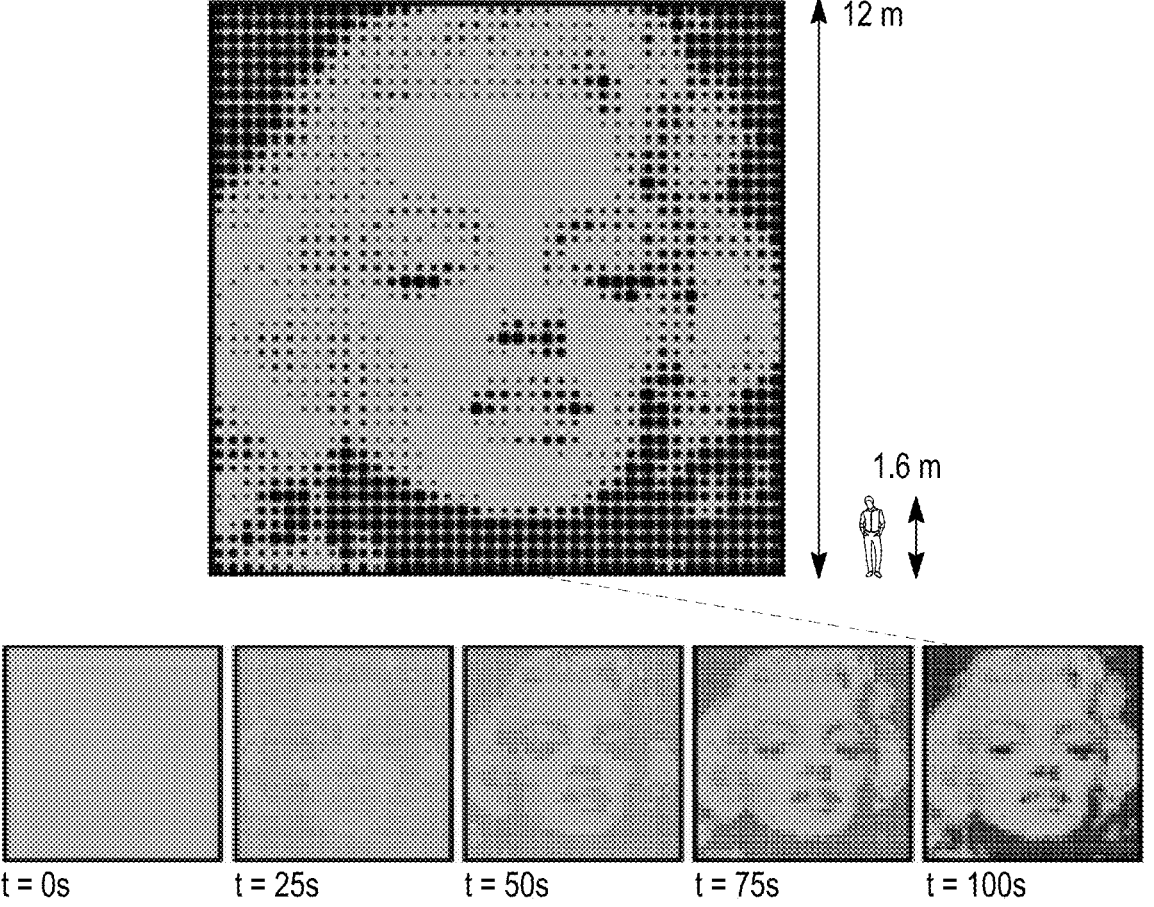
Figure 14A:
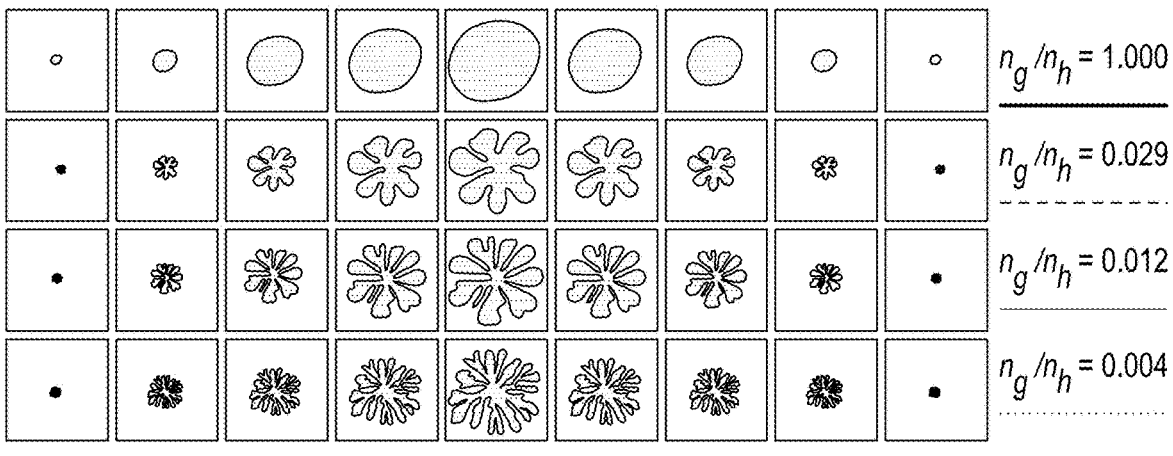
FIGS. 14A-14E depicts control over geometrical characteristics of pigment dispersal through tuning of ratio between viscosity of guest fluid ($n_g$) and viscosity of host fluid ($n_h$)
Figure 14B:
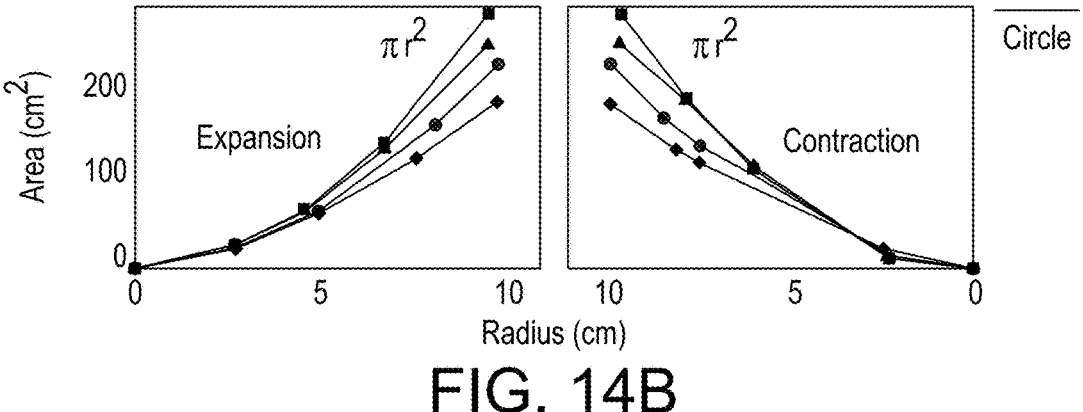
Figure 14C:
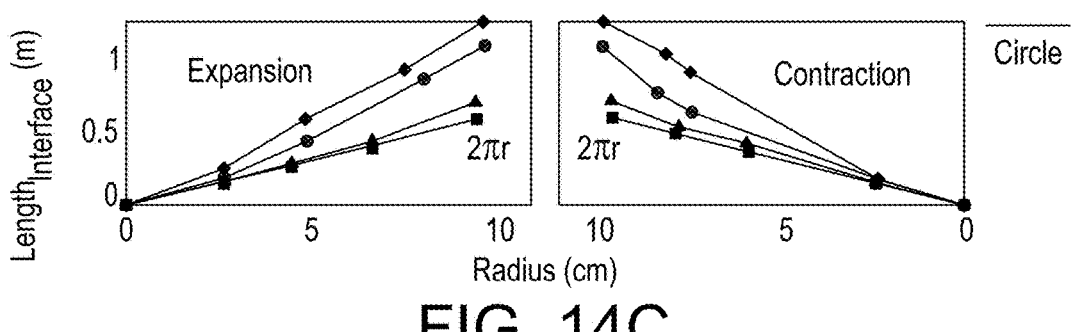
Figures 14D, 14E:
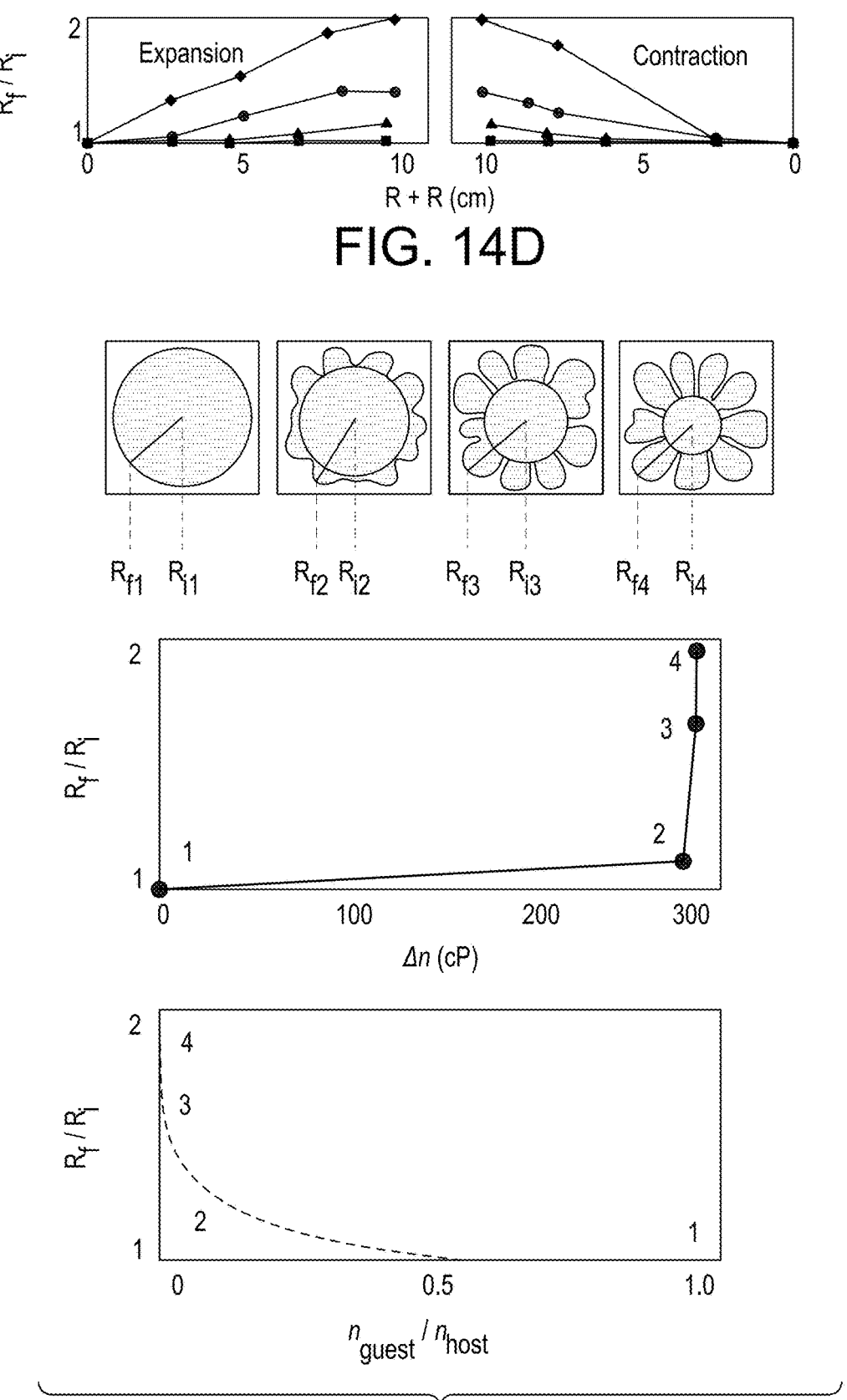
Figure 15A:
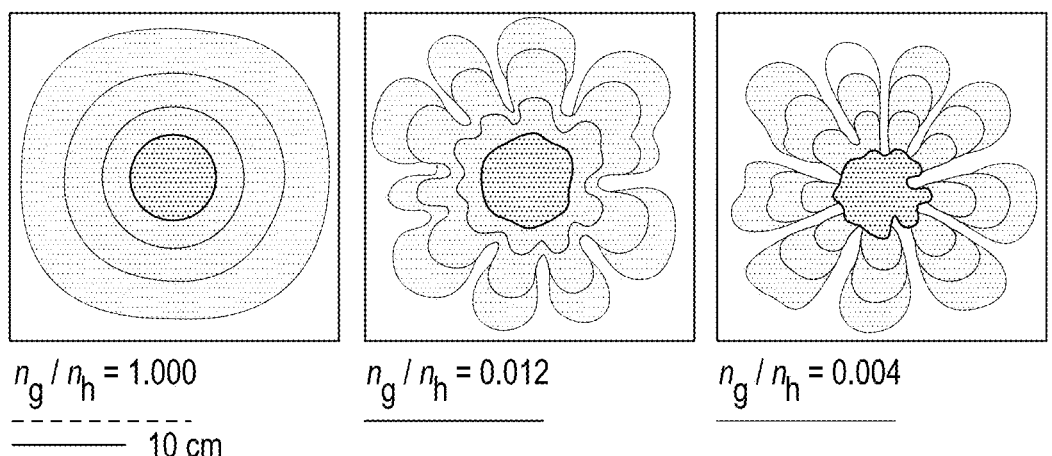
FIGS. 15A-15D depicts the indirect effect of viscosity difference on light transmission.
Figure 15B:
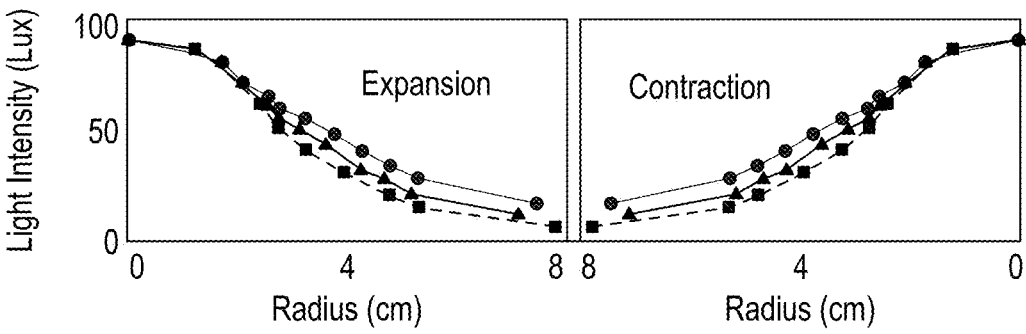
Figure 15C:
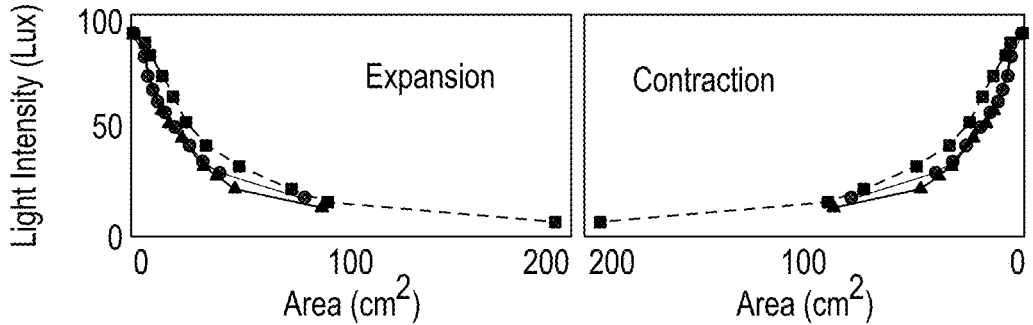
Figure 15D:
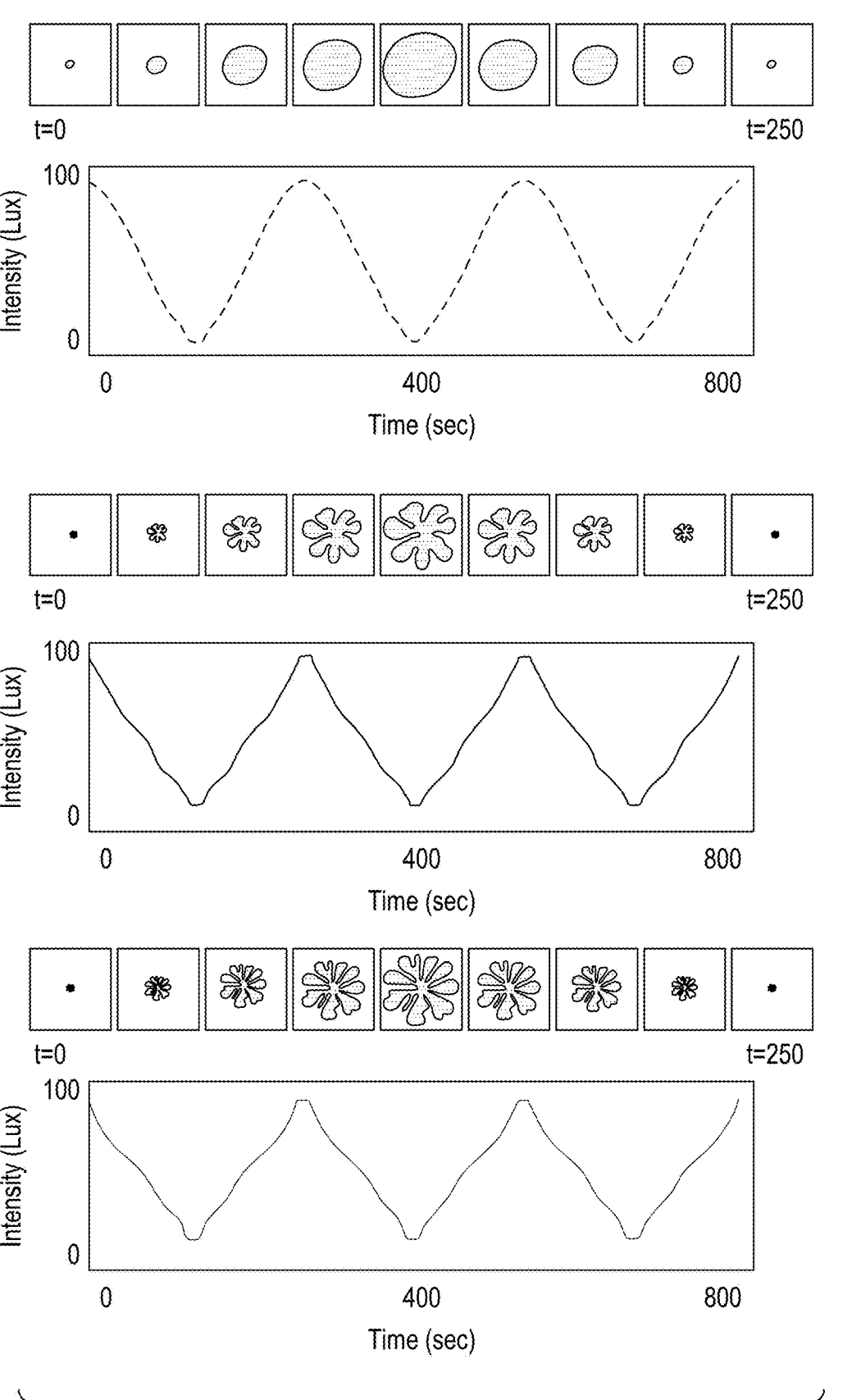

These active fluidic systems can generate differential fluidic patterns across a facade, and might be of interest for large-area visual displays (FIG. 13). Differential control is limited by pump granularity (i.e., number of fluidic cells each digital pump controls), and it is proposed digital valve control to minimize complexity in full-scale building integration. This work marks an important step forward for adaptive and responsive infrastructure. As buildings begin to learn through neural networks and operate through active skins, the design principles of the natural and constructed worlds will continue to converge.

Confined Fluidic Responses in Biology

Biological organisms often leverage tissue-scale fluidic mechanisms to regulate interfacial properties within evolving environments. Mammals dilate blood vessels near their skin to control rates of convective heat loss; cephalopods stretch fluid-containing sacs to generate colourful displays for adaptive camouflage and visual communication; brittle stars transport fluidic cells between sub-surface regions to regulate photoreception; and decapods (e.g., krill, crab) move pigments within their skin to thermoregulate and dynamically shade against the sun. In low-light conditions, krill store pigments in a central reservoir within sub-surface chromatophore cells. Under intense light exposure, they then quickly (<20 minutes) spread pigment through the radially-branching microtubules of the chromatophore, expanding the diameter of pigment coverage from <100 μm within the reservoir to >500 μm when expanded across the cell (FIGS. 8A-8B). In aggregate, this extended pigment fluid coverage significantly changes the optical properties of the skin (FIGS. 8A-8B). Crucially, only a small volume of fluid is required to actively and efficiently shade a large surface region, expanding from a point (reservoir) to an area.

It is hypothesized that this intracellular actuation of confined fluidic pigment, scaled up as a material layer within a building facade, can replicate the dynamic optical response of biological tissue (FIGS. 8G-8J). Here, principles of microfluidics is combined, self-assembly, and digital actuation to conceptualize a large area building interface that can differentially sense and react to local optical conditions. It is thereby shown that pigment-containing fluids, confined within layered devices, can be injected and withdrawn (FIG. 9D) to control colour and shading, interior light intensity, and temperature. The self-organizing morphology of these injected fluids is controlled through the non-equilibrium dynamics of branching instabilities. This mechanism allows us to demonstrate that building facades with adaptive and reversible fluidic shading can achieve unprecedented improvements to energy efficiency.

Characteristic Branching Morphologies of Injected Fluids

Marine organisms use radially-branching vascular networks to disperse pigment within their skin. Branched area coverage increases the effective scale of pigment dispersion, where a small volume of pigment fluid can expand across a much larger surface area in a branched morphology compared to a uniform disk. Here, radially-branching pigment fluid morphologies within layered devices for tuneable optical transmission is generated. Referring to FIGS. 8F-8G a reversible pigment coverage, from a point reservoir to a large area, analogous to pigment dispersal for optical control in the krill chromatophore cell is demonstrated.

Through the viscous fingering (VF) effect, branched morphologies is controlled (FIGS. 9A-9E). VF is a mechanism for branched pattern formation, where interfacial instabilities grow as a less viscous fluid is forced under pressure into a more viscous fluid, while confined between two closely spaced plates. This patterning has been widely demonstrated and characterized using the quasi-2D Hele-Shaw (H-S) cell, where fluid parameters and cell geometry can be controlled to tune the morphology and planar area fraction of the invading fluid.

Within H-S cells, injection flow rate affects pressure at the interface between the two fluids, and can be controlled experimentally. At sufficient flow rates, this interface can expand in a budding and branching pattern, as the 'guest' fluid bifurcates to form fingers within the 'host' fluid. The curvature of this interface, if unstable, is locally amplified. For vertical H-S cells, with density-matched fluids (no buoyant forces, see), the unstable tip-splitting growth of fingers occurs when an 'amplification factor' of a specific finger width, $a_\lambda > 0$, for $$a_\lambda = 3V\Delta n - \sigma\left(\frac{\pi b}{\lambda}\right)^2 \qquad (1)$$

Where $\Delta n = n_h - n_g$, $n_h$ is the host fluid viscosity, $n_g$ is the invading guest fluid viscosity, V is the interfacial velocity, b is the gap height between plates, $\sigma$ is the interfacial surface tension, and $\lambda$ is the finger width, or wavelength, of the instability. Unstable branching tips will grow if the growth rate (left hand term) is large enough to overcome the smoothing-effect of surface tension on the decay rate (right hand term). However, if the direction of flow is reversed, the reversal of stability can be expected. The sign of $a_\lambda$ changes, due to the change in flow direction (swapping the host and guest fluid viscosities), causing a net decay of finger amplitudes. This mechanism of stability reversal allows the design to be flow reversible: when driven in the forward direction (pigment injection), instabilities cause branching morphologies. When driven backwards (pigment withdrawal), the curvature-dampening effect allows for the coordinated collapse of the branched fluid network back to its source.

The width of the branches in the pattern is a critical design parameter that helps to control pigment fluid area fraction and, subsequently, light transmission. The critical finger width divides stable and unstable growth, $$\lambda_c = \pi b \sqrt{\frac{\sigma}{3V\Delta n}} \qquad (2)$$

Figure 21:
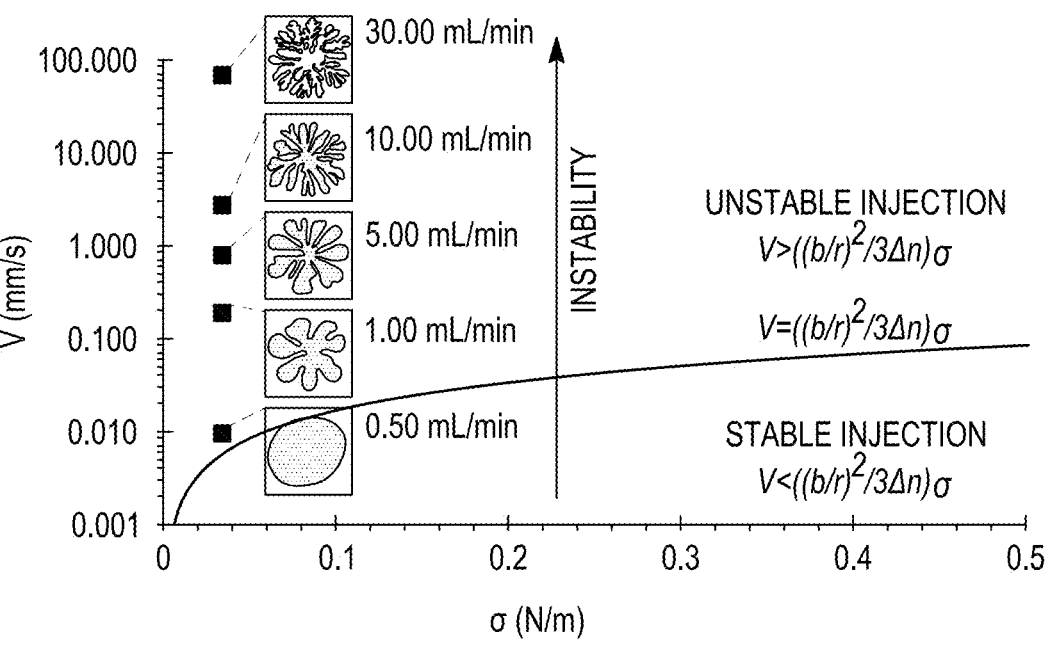
FIG. 21 depicts binary phase space differentiating between stable and unstable pigment injections within a Hele-Shaw cell.

Wavelengths less than 2 are stabilized due to the increase in the decay term in equation (1). All wavelengths longer than 2 are unstable, with a practical upper limit at the longest wavelength that can fit along the interface, determined by the radius of the fluid injection (FIG. 21). The most accelerated instability that is characteristic of the branched pattern, is characteristic wavelength, $$\lambda^* = \sqrt{3}\,\lambda_c = \pi b \sqrt{\frac{\sigma}{V\Delta n}} \qquad (3)$$

H-S cells ($30\times30\times0.1$ cm³) using PMMA sheets (fabrication details in SM) was developed, and controlled reversible fluid injections through a central port and digital syringe pump. Assuming a stably expanding circular disk, the velocity of the fluid interface is linearly proportional to the injection flow rate, $$V = \frac{Q}{2\pi r b}$$

(derivation in SM). Therefore, injection flow rate (Q) can be used to modulate V, and the onset of branching instability ($\lambda^*$). Experimentally, Q is highly practical for establishing control over pigment morphology due to its digital tunability.

Figure 16B:
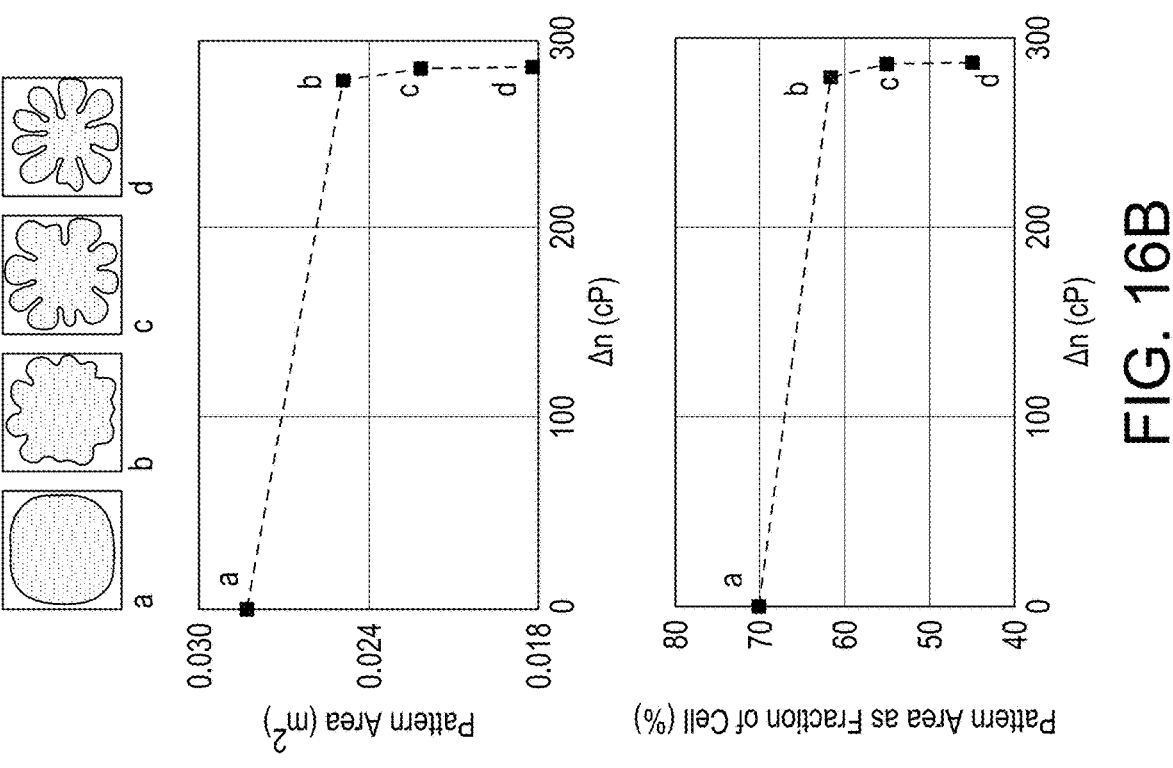
FIGS. 16A-16B depicts tuning of pattern area as function of flow rate (a) and viscosity difference (b) for patterns of a comparable radius within a Hele-Shaw cell.
Figure 17A:
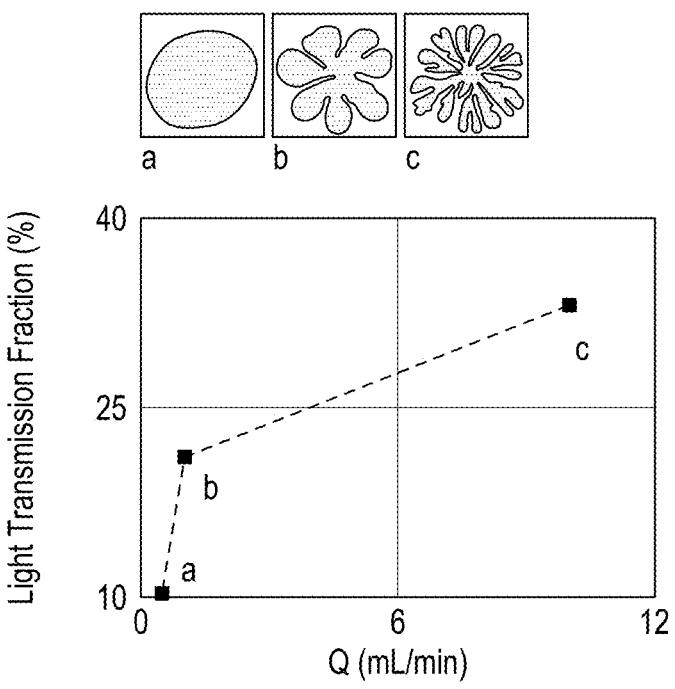
FIGS. 17A-17B depicts tuning of light transmission through Hele-Shaw cell for different pattern morphologies as a function of flow rate (a) and viscosity ratio (b)
Figure 17B:
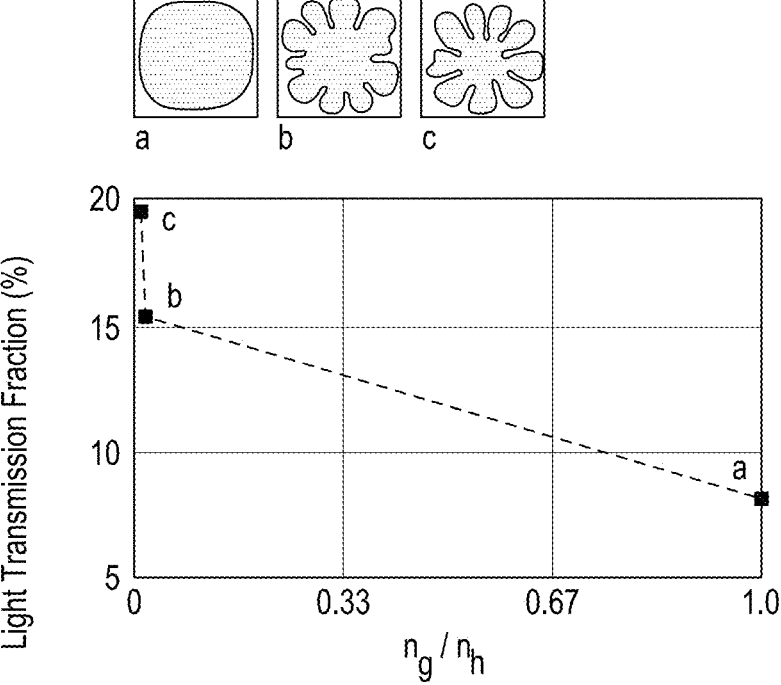
Figure 18A:
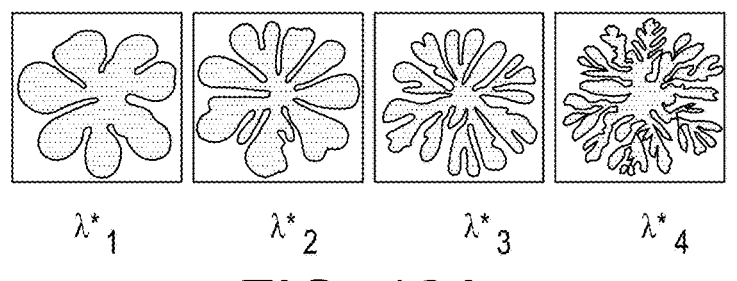
FIGS. 18A-18C depicts the observed pattern morphology.
Figure 18B:
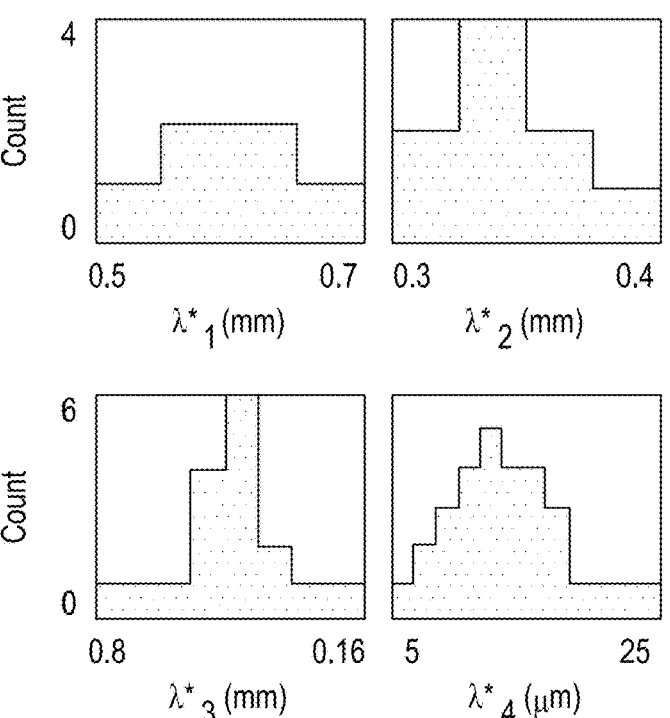
Figure 18C:
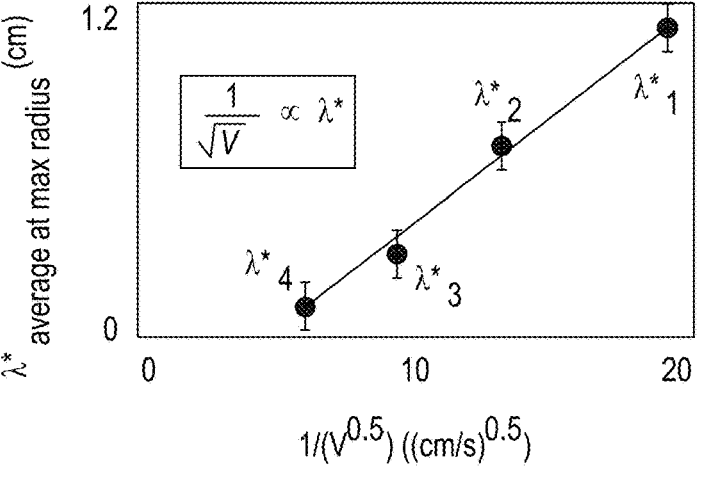
Figure 19A:
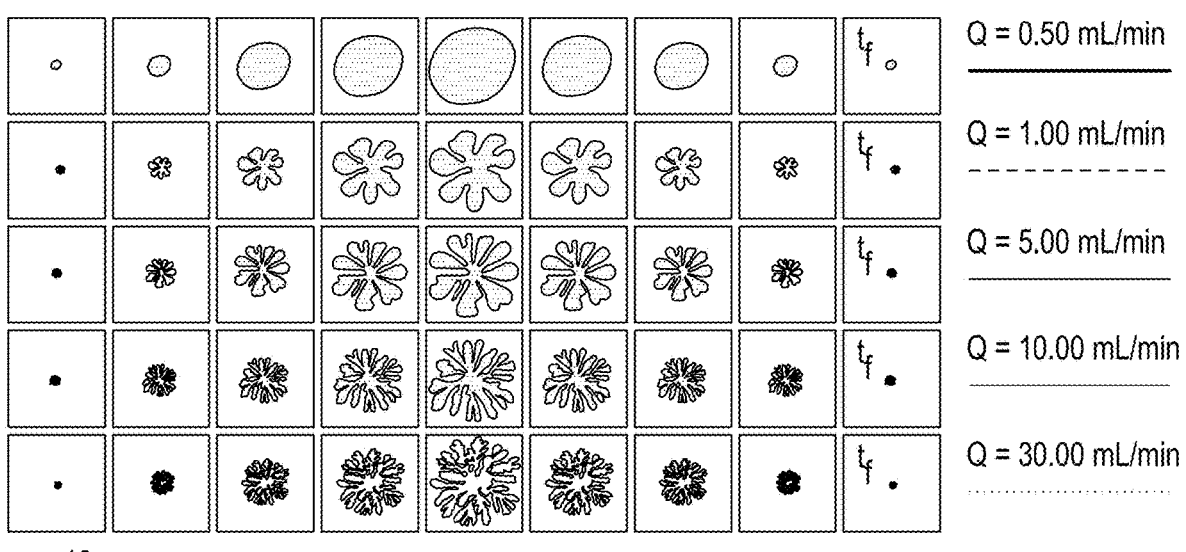
FIGS. 19A-19C depicts the control over geometrical characteristics of pigment dispersal through tuning of flow rate.
Figure 19B:
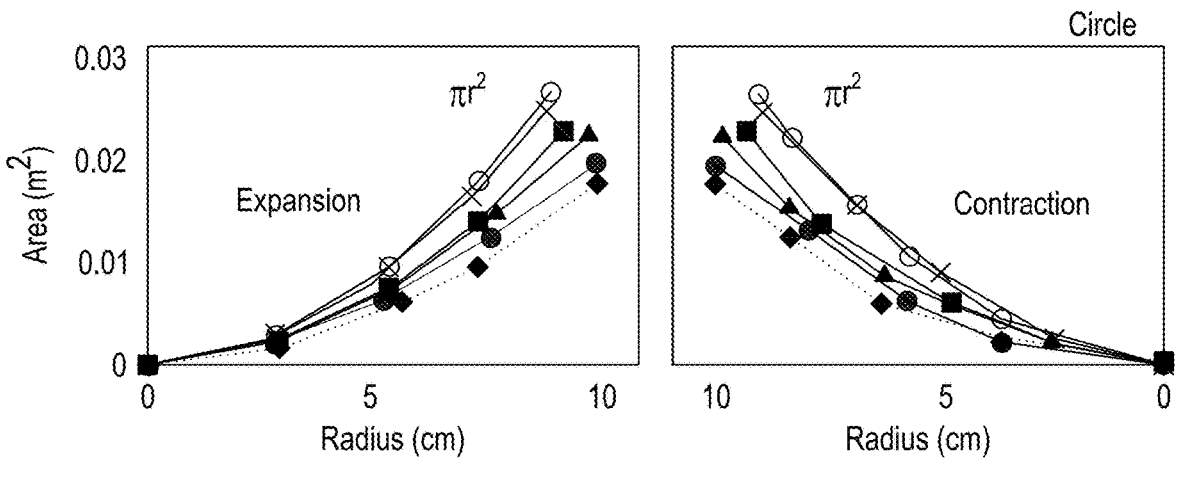
Figure 19C:
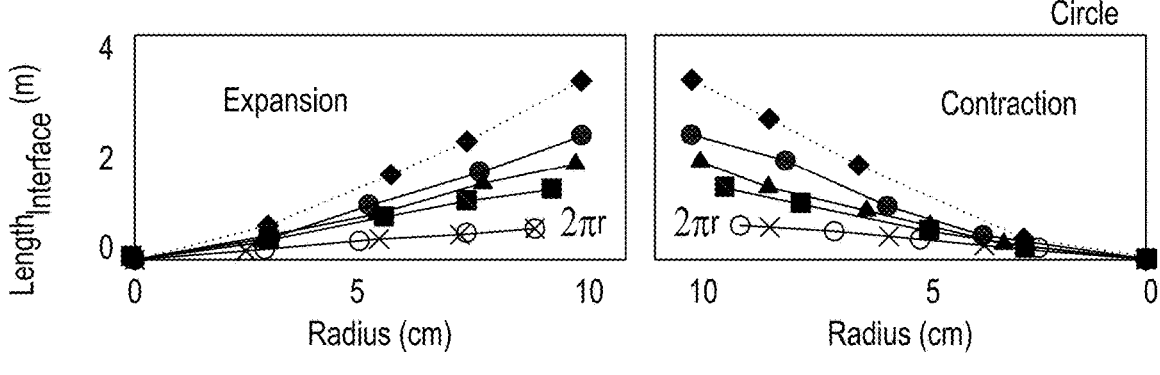
Figure 20A:
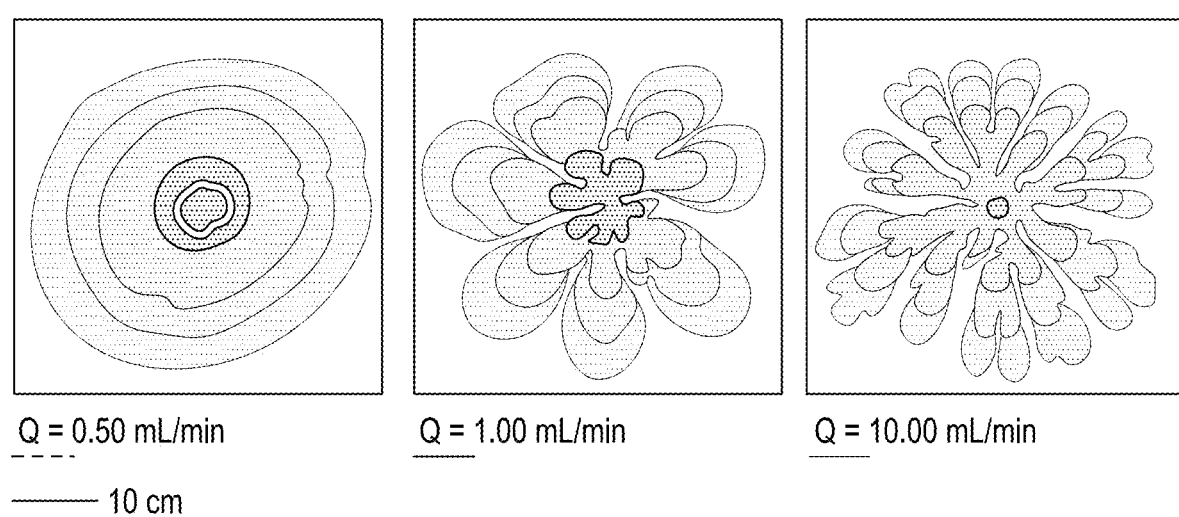
FIGS. 20A-20C depicts the indirect effect of flow rate on light transmission.
Figure 20B:
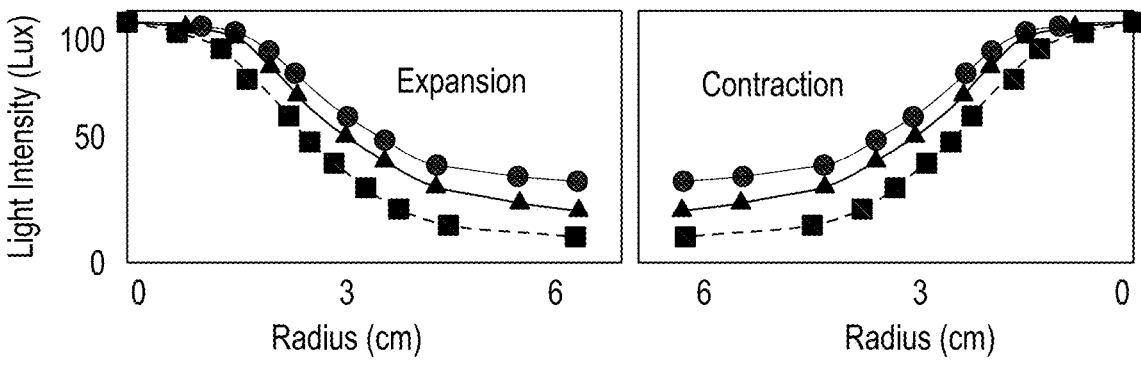
Figure 20C:
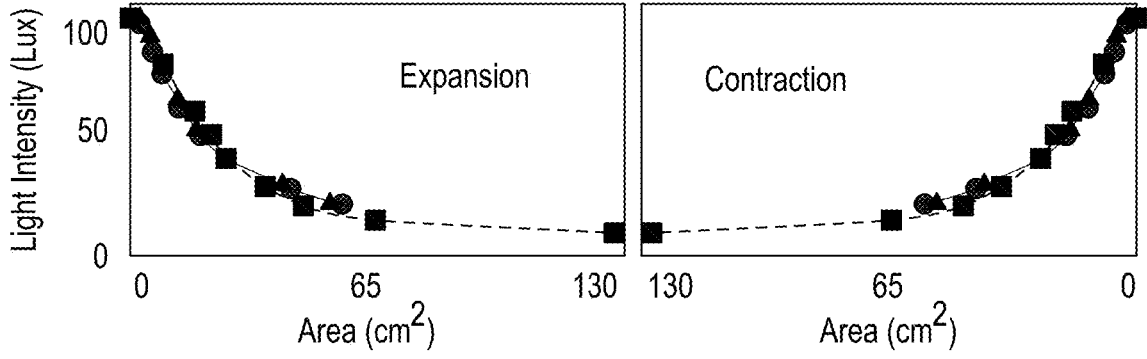

Based on equation (1), two immiscible fluids are chosen—a transparent mineral oil (288 cP, 20° C.) and aqueous carbon suspension (0.89 cP, 20° C.)—as the host and guest phase, respectively. Low injection rates (e.g., 0.5 mL/min) of the aqueous pigment phase corresponded to patterns of decreased branching during dispersal (FIG. 9F, top row), while increasing flow rate increased branching (FIG. 9F, moving downwards, FIG. 9H). For a consistent dispersal radius within a H-S cell, differences in branching resulting from injection flow rate corresponded to disparities of up to 21% in pigment fluid area coverage, from 42% coverage for a highly-branched state (FIG. 9F, top row), up to a maximum of 63% coverage for a non-branching state (FIG. 9F, bottom row, FIG. 9H). The well-established linear relationship between characteristic wavelength and interfacial velocity is confirmed using equation (3) (FIG. 18C). Systematic control of $\Delta n$ (and $n_{guest}/n_{host}$) was also demonstrated to tune area fraction by 25% (for the same relative pigment fluid radius), from 45% to 70% coverage (FIG. 16B). Other results demonstrating geometric control over viscous fingering to tune optical transmission are available in FIG. 14A-20C.

Reversibility of Injections and Switchable Injection Stability

Figure 22:
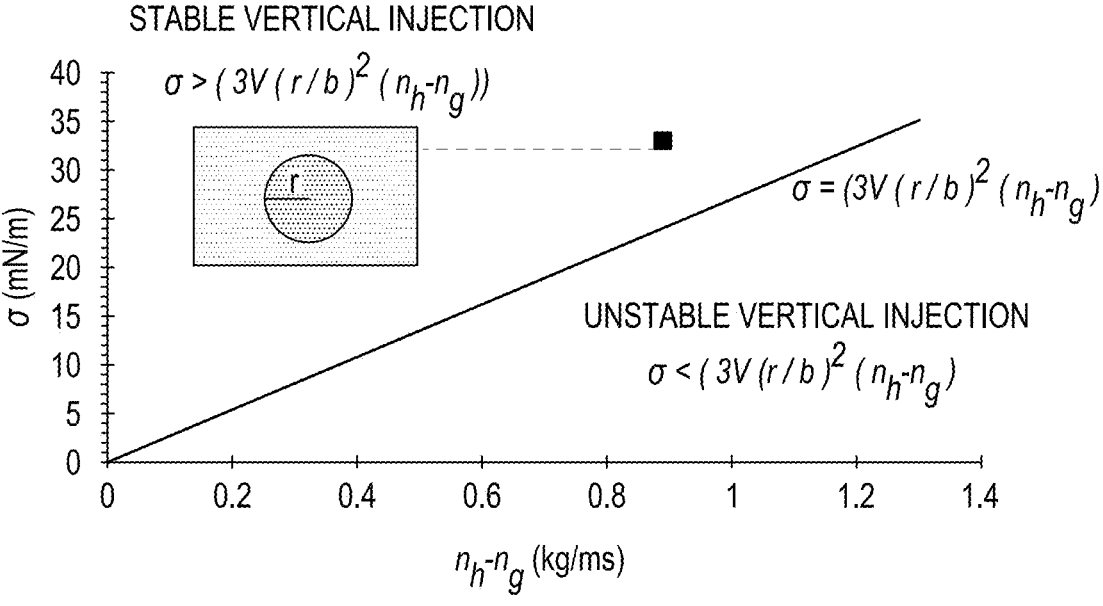
FIG. 22 depicts binary phase space for stable non-branching and unstable branching pigment injection within a vertical Hele-Shaw cell.

To avoid buoyant forces in vertically-oriented cells, the aqueous pigment phase was adjusted (by adding ethanol) to an equivalent density such that $\rho_a - \rho_o = 0$. To control conditions for branching, it is assumed that the largest wavelength that can be supported on a circle is $$\lambda = \frac{c}{2} = \pi r,$$

where c is the circumference of a circle and r its radius. This minimal instability simply transforms a circle into an ellipse, with two crests (fingers) oriented on opposite poles of the major axis. Unstable branching growth will therefore occur for $\lambda_c < \lambda < \pi r$. Stable, non-branching fluid injections ($a<0$) occur when $\lambda_c = \pi r$, and can be accomplished within a vertical cell by ensuring $$3V\Delta n < \sigma\left(\frac{b}{r}\right)^2,$$

where r is the effective radius of the pigment injection within a H-S cell. Plotting $\sigma$, $\Delta n$ as in FIG. 17, a binary phase space is shown, where $a=0$ defines a line through the origin, of slope $$m = 3V\left(\frac{r}{b}\right)^2,$$

separating stable and unstable regions (FIG. 17). For a H-S cell aspect ratio $$\frac{b}{r},$$

one can then control the degree of instability using any of σ, λn, V (FIG. 21-22). It was found that less branched morphologies were often better able to retract due to pinching effects in narrower fingers.

Reversible Injection Tuning for Dynamic Shading

Figure 16A:
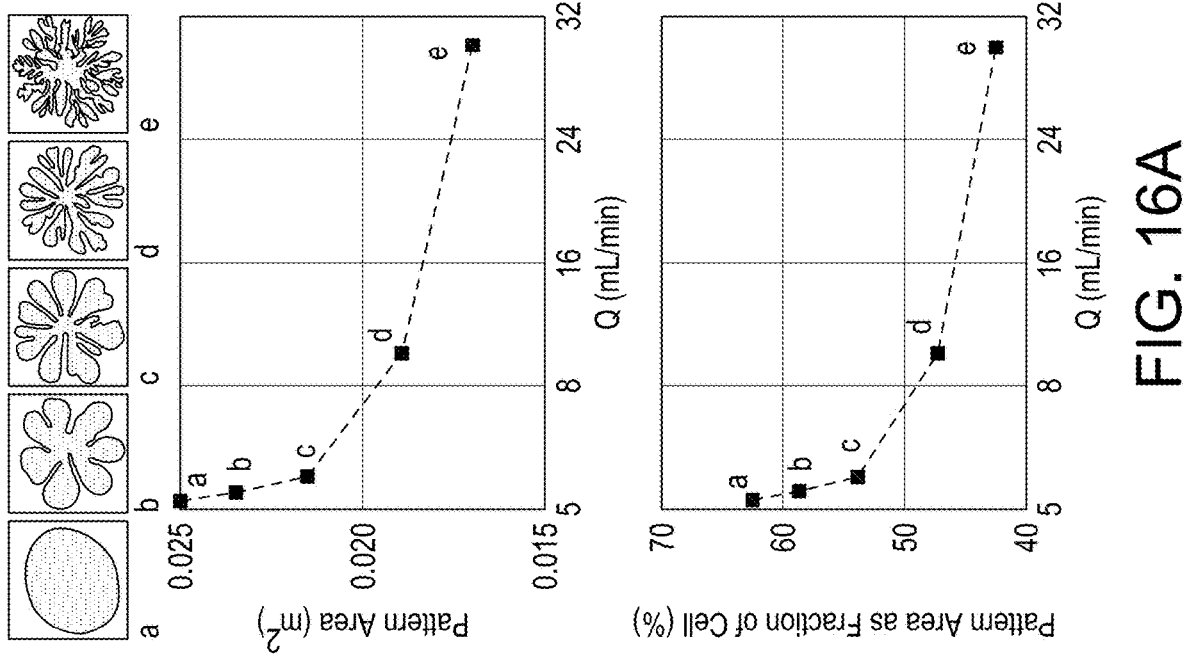
Figure 23:
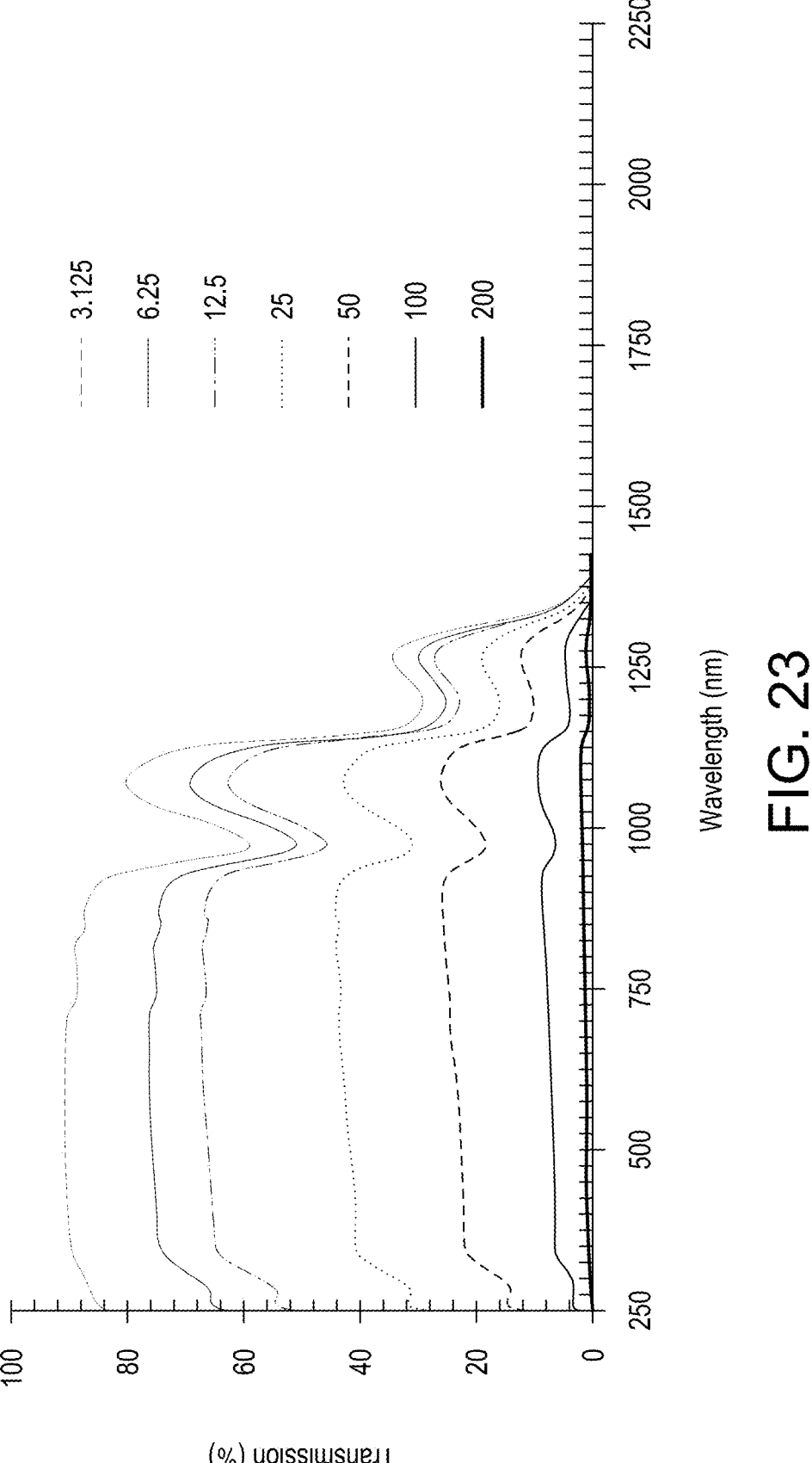
FIG. 23 depicts optical transmission for various aqueous suspensions of carbon black.

With well-defined control over branching stability, pigment fluid morphology, and pigment fluid reversibility, a reversible, programmable, pigment fluid injection to tune optical transmission and shading in H-S cells was demonstrated. In their transmissive (clear) state, cells contained a transparent fluid (mineral oil, 288 cP), enabling full transmission of visible light (FIG. 10B). To shade, a less viscous pigment fluid was injected (carbon black suspension in water-glycerol solution, 0.89-288 cP) into the mineral oil layer (FIGS. 8H-8I, FIG. 9A, 9D-9E). Optical transmission for these aqueous carbon suspensions and found a minimum concentration (0.02 g C/mL $H_2O$) for zero light transmission (300-3400 nm) for a cell thickness of 4 mm was measured (FIG. 23, FIG. 9B). Light transmission behind a cell across a complete dispersal and retraction sequence was measured. As expected, transmitted light decreased as a function of pigment fluid area (FIG. 20), to decrease interior visible light intensity by 91%, 80% and 67% for maximum injections with flow rates of 0.5, 1.0, and 10.0 mL/min, respectively (FIGS. 9L-9N, respectively). Therefore flow rate can be used to control branching and relative area coverage, modulating light transmission through the cell by 24% for differentially-branched patterns of the same maximum radius (FIG. 16A, FIG. 17A). Additionally, by controlling the branching effects of the pattern with viscosity differences (ratios), light transmission was modulated by 12% for patterns of the same radius (FIG. 14A-14B, FIG. 15A-15B, FIG. 16B, FIG. 17B).

Proportional Fluidic Optical and Thermal Responsiveness

Radiative heat transfer through a building facade is a major contributor to operational cooling and heating costs. Transmitted light through a facade, and the energy that is absorbed and reemitted as heat into or out of a building, must be appropriately regulated. In buildings, the fraction of solar radiation that is transmitted into a building is captured by a solar heat gain coefficient, SHGC=$T_{sol}$+$A_{sol}$·N, where $$T_{sol} = \left\{ \sum\nolimits_{\lambda=250\,nm}^{2500\,nm} T_{\%}\lambda \right\}$$

is the transmission fraction across the solar radiation spectrum on Earth, $A_{sol}$ is the solar absorptance fraction, and N is the inward reemission fraction. Decapods, like the sand fiddler crab, control radiative solar heat gain to thermoregulate by managing the volume of pigment dispersed within their chromatophores[58]. Analogously, the fluidic building layers can achieve a variable response to incident light by managing the amount of pigment fluid distributed over their cell areas.

Figure 10A:
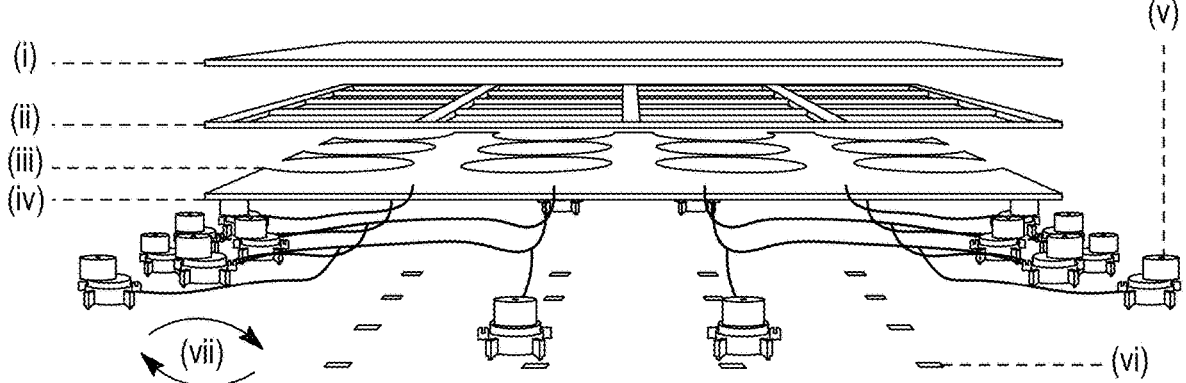
FIGS. 10A-10N depicts optical and thermal characterization of responsive pigment fluid dispersal for single and multicell system.
Figure 10B:
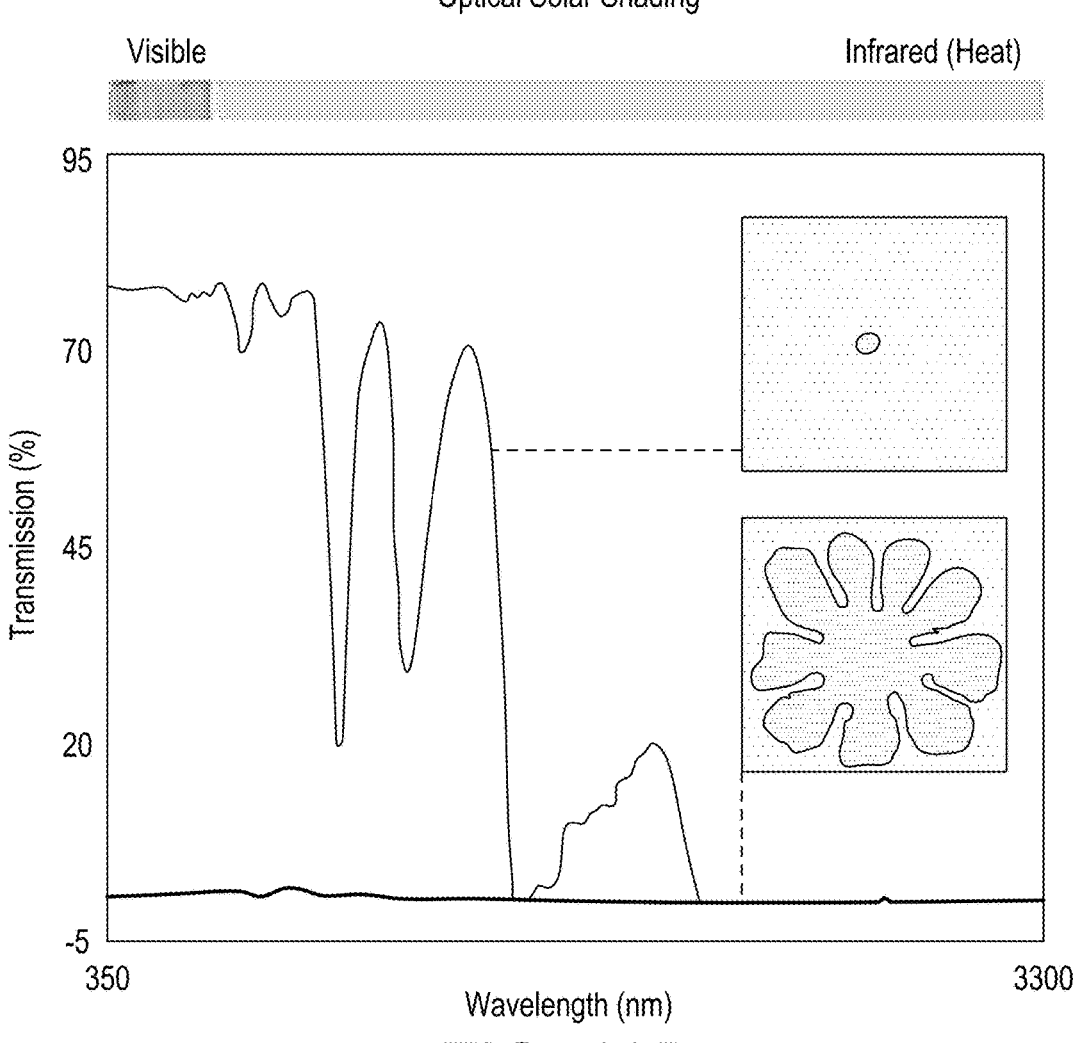
Figure 10F:
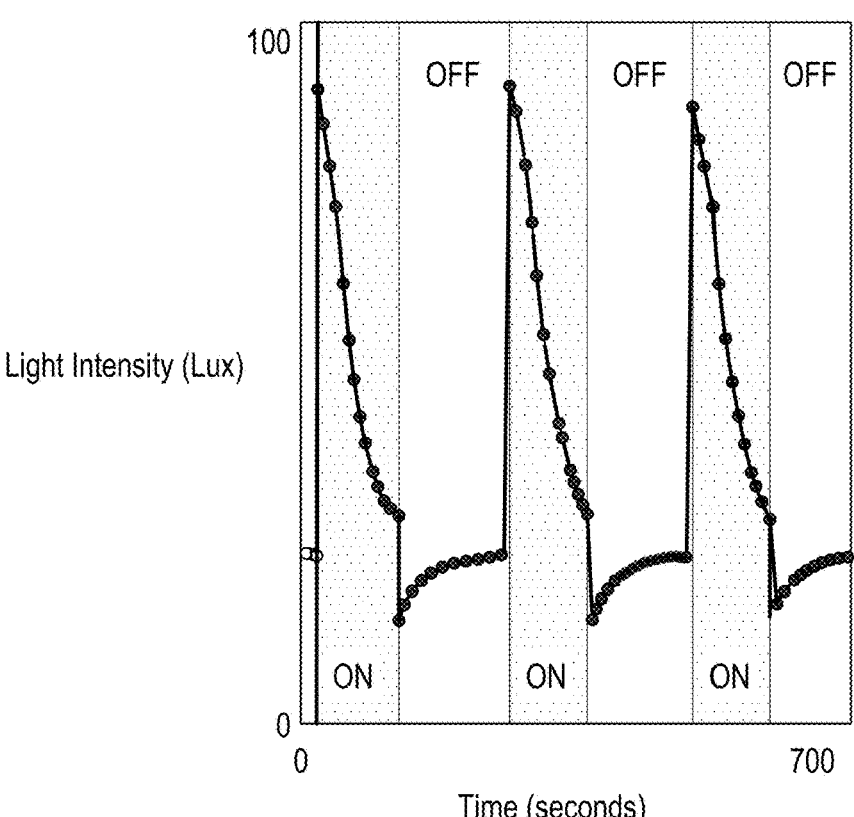
Figure 10G:
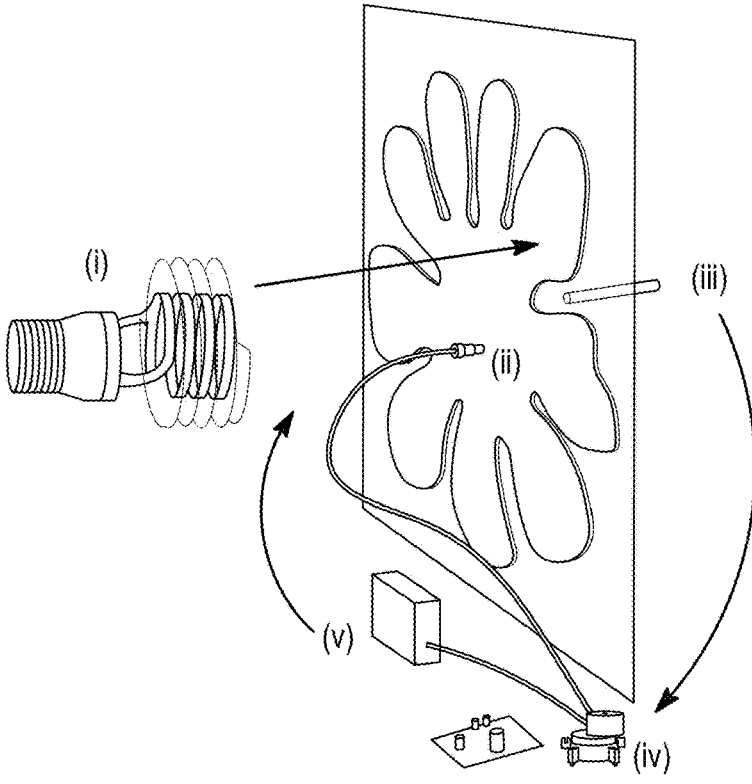
Figure 10H:
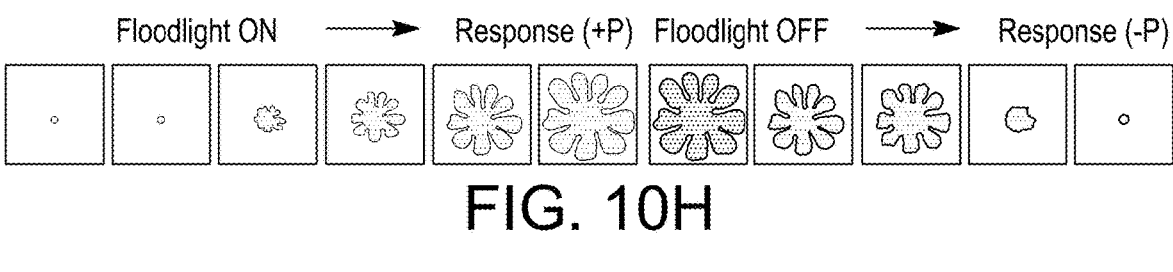
Figure 10I:
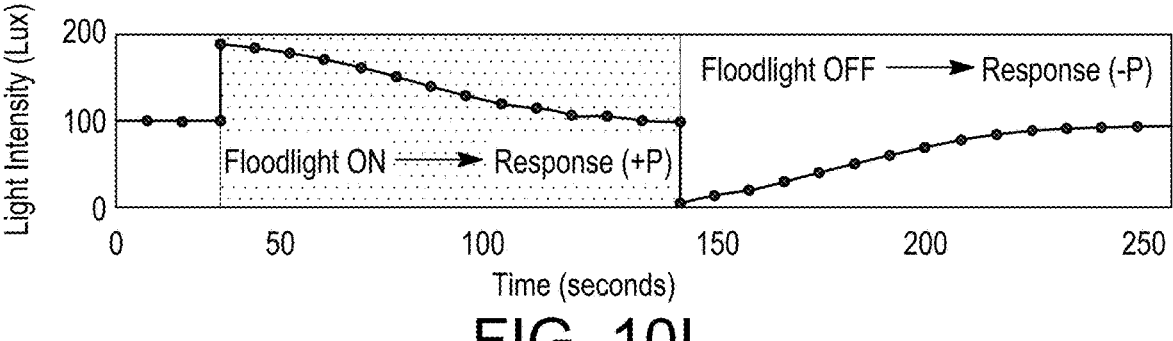
Figure 10J:
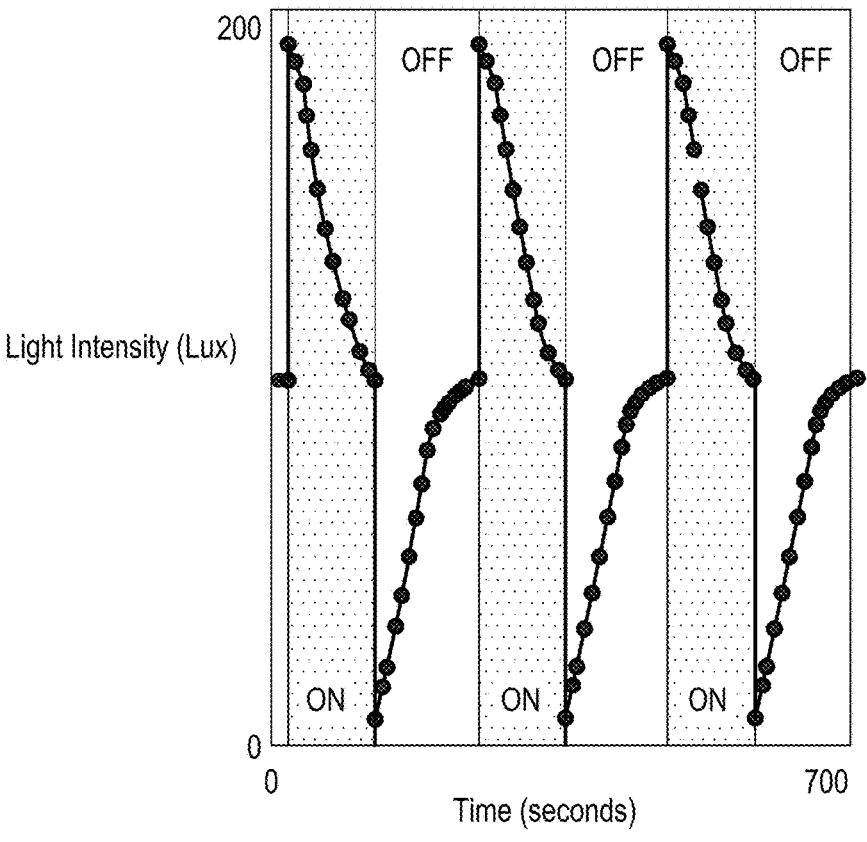
Figures 10K, 10L:
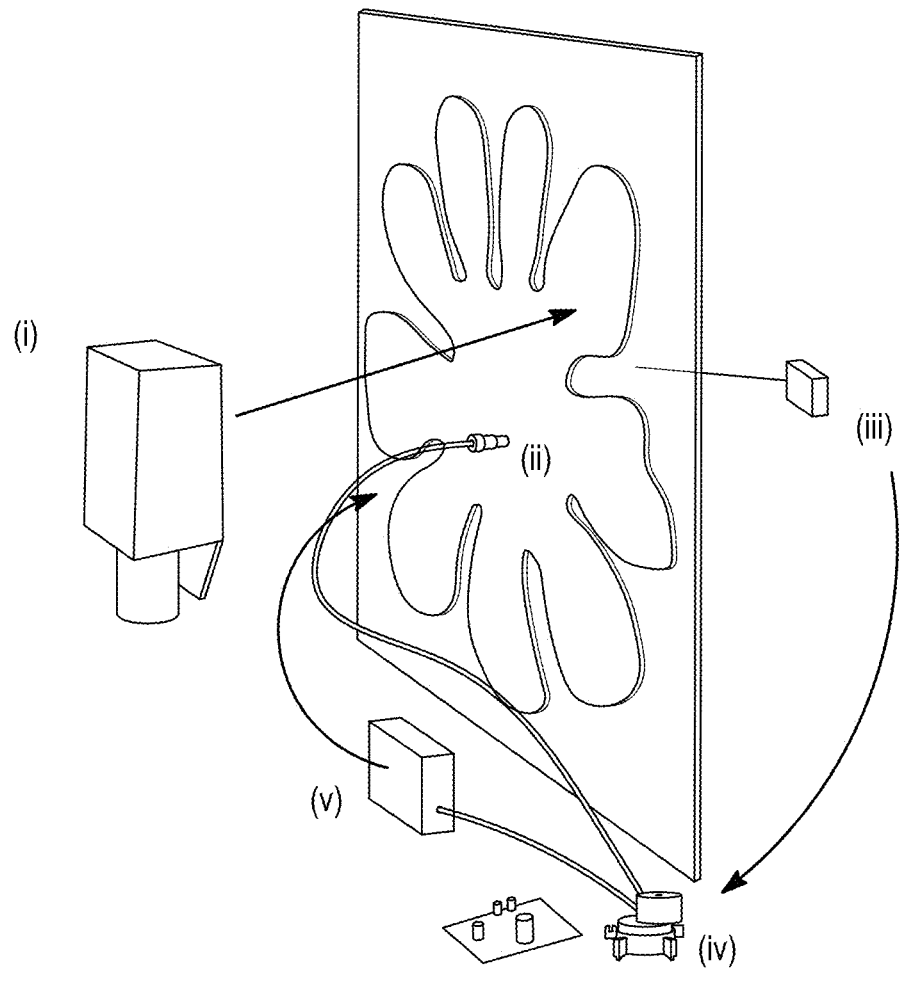
Figure 10M:
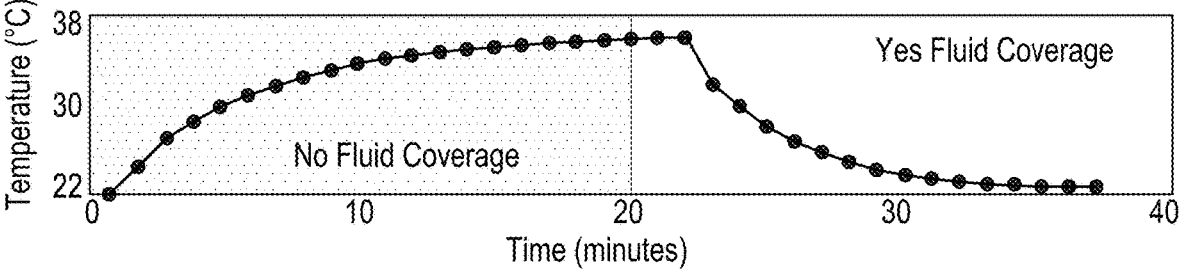
Figure 10N:
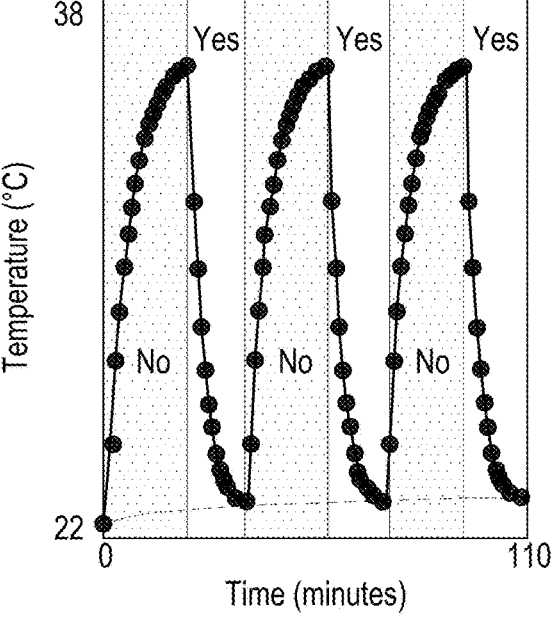

To demonstrate this adaptive and proportional response, a multicell facade with 16 independent injection sites was fabricated, each with a local photosensor and thermocouple (FIG. 10A, 10C). Using the photosensor input behind each cell, a digital negative feedback system was developed for the pigment fluid to maintain a light transmission setpoint, given variable incident light intensity (FIG. 10G-10J). An optical stimulus of 100 Lux was directed at each cell (FIG. 10G), triggering a temporary and proportionate response (FIG. 10H). 20 mL of pigment was injected (10 mL/min) within 115 s to shade the sensor and restore optical transmission to a set value of 100 Lux (FIG. 10I).

For analogous temperature-driven control, a thermocouple was placed on a PMMA sheet 3 cm behind each cell to control a pigment injection response to temperature (FIGS. 10K-10N). Visible and infrared (IR) light transmission through the cell from an applied heat source elevated the sensor temperature from 22° C. to 38° C., and triggered a 20 mL pigment injection (10 mL/min) within 115 s to shade the sensor. The measured temperature of the uninsulated acrylic sheet returned to 22° C. after 16 min (FIG. 10M), demonstrating a thermoregulatory effect governed by optical properties, and generally independent of the thermal conductivity of a building facade. Importantly, it has been estimated that adaptive control over IR light transmission and solar heat gain, as demonstrate here, in just 18% of total building window stock in the United States could reduce building energy use by around 50%.

Spatially-Differential Optical Responsiveness

Figures 24A, 24B, 24C:
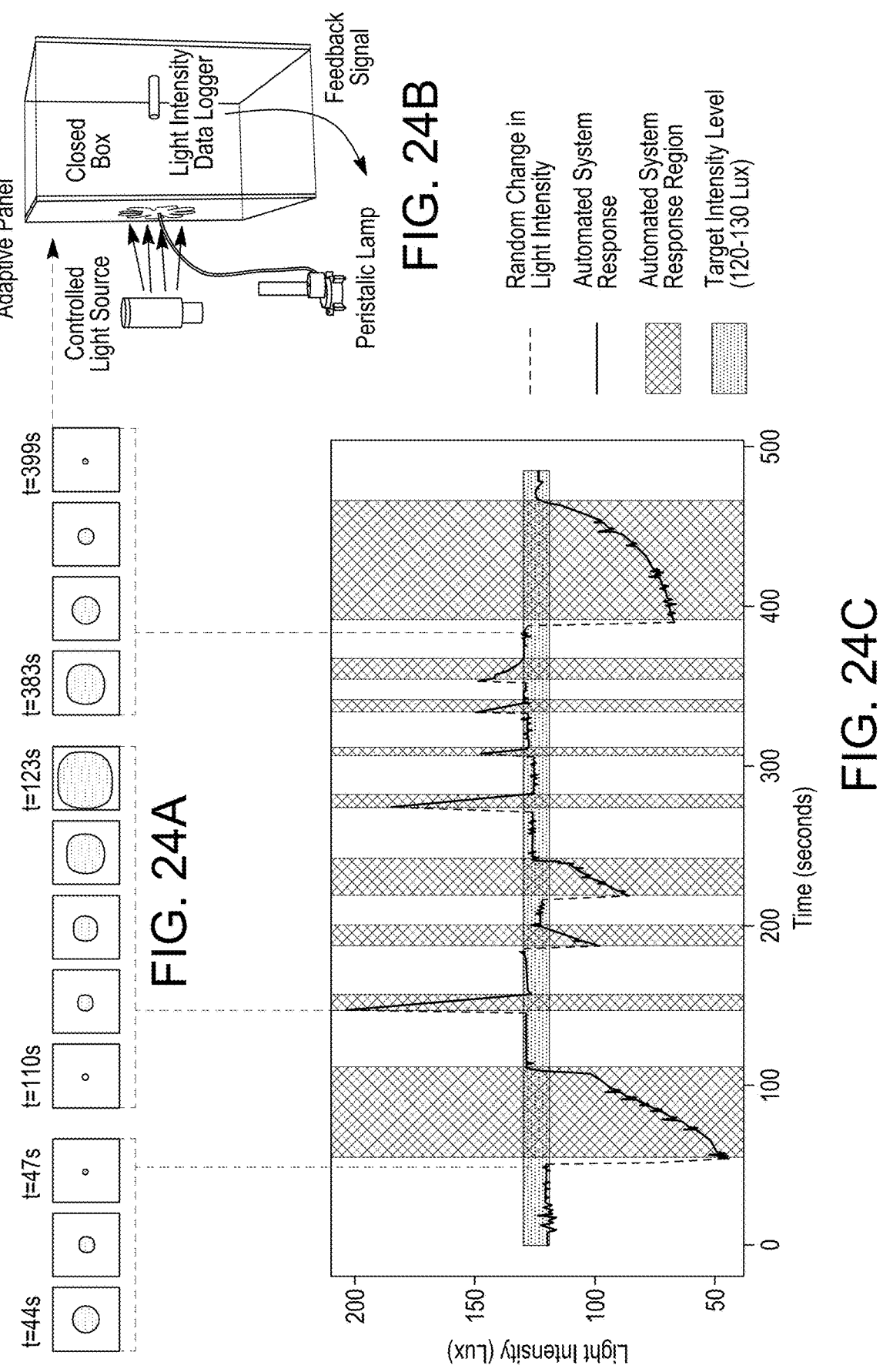
FIG. 24A-C demonstrates negative optical feedback system.

Crucial in the camouflaging, shading, and thermoregulatory efforts of several marine organisms is the coordinated differential response of independent fluidic cells across the skin. In buildings, this localized shading control might be similarly beneficial, where spatially-differentiated shading responses could provide glare control without sacrificing diffuse light transmission, and provide desirable differences in daylight penetration across a large space. This local actuation capacity in biology to regulate spatially-varied light transmission in building facades is mimicked. Regions across a multicell facade were individually illuminated (+100 Lux), in a sequential manner, and each responded within 15 s (FIG. 11A-11B). A similar response was demonstrated post-illumination, as pigment cells contracted to return light transmission to a preset threshold (100 Lux). Regions were also differentially illuminated, i.e., as a light intensity gradient, and each of the 16 independent cells responded proportionally in under 100 s (FIG. 11E, FIG. 24, experimental setup demonstrated in FIG. 11G), varying a fluidic response between 0-20 mL. The capacity for differential pigment injections across multiple cells over multiple cycles was also demonstrated in FIG. 11D.

The possibility for large-area pattern control, generating differential pigmentary responses (FIG. 13B-13C) through spatial or injection volume modulation, to match the 'pixels' of large digitized, optofluidic displays (simulated in FIG. 13D) is additionally highlighted. This 'halftone' effect (analogous to screen printing), where a pixel array with a varied radius or morphology can create the appearance of a gradient, is achieved with high accuracy for a resolution of 40×40 cells (approximately 12×12 $m^2$ for 30 cm devices). Increased spatial resolution can be achieved by varying not only the injection pigment radius, but also the branched morphology. Control of pigment branching allows spatially-programmable variation in area coverage for finer spatial resolution than a series of circular half-tone pixels.

Simulated Building Performance

Digitally-controlled, dynamic fluid interfaces enable a continuous 'search' for optimal facade configurations and building operational energy efficiency. To assess the performance impact of the fluidic facade, we defined a typical building space (20×20×6 m3) located in Boston, Massachusetts, chosen for its seasonally-varied climate (FIG. 12A). A computational building simulation platform is used to estimate the annual energy required to heat and cool the space, based on historical environmental data, with temporally-precise information on dry bulb and dew point temperature, relative humidity, direct and indirect radiation, solar azimuth, cloud cover, wind speed, and wind direction. Annual heating and cooling energy load for the space when clad with conventional static facades (double-pane glass alone, with low-emissivity coating, and fixed 60% area sun-shade) is compared, each impacting the thermal and optical properties of the building envelope. Heating and cooling energy usage within the space for a simplified model of active facade over one year is simulated. The material properties of pigment devices were estimated, and a simple control algorithm was used to modify pigment fluid coverage (between 0% and 60% area coverage, with a 10% step) hourly, to reduce the operational energy required to heat and cool the space (details in Methods section and FIG. 20A-20B, Extended Data Table 1).

DATA TABLE 1

| Material property | Double pane glass | Fluid + plastic layer |
|---|---|---|
| Thickness (m) | — | 0.015 |
| Conductivity (W/m*K) | — | 0.4 |
| Density (kg/m$^3$) | — | 2200 |
| Specific heat (J/kg*K) | — | 3600 |
| Thermal Absorbance (%) | — | 50 |
| Solar Absorbance (%) | — | 50 |
| Visual Absorbance (%) | — | 50 |
| U-value (W/m$^2$K) | 1.2 | — |
| SHGC (%) | 95 | — |
| Visual Transmittance (%) | 95 | — |

DATA TABLE 2

| Property/Setting | Assumption |
|---|---|
| Zone volume (m$^3$) | 2400 |
| Zone floor area (m$^2$) | 400 |
| Active proportion of facade (%) | 95 |
| Ventilation infiltration rate (L/s per person) | 10 |
| Occupancy schedule | Office, 5 days per week |
| Occupant density (people/m$^2$) | 0.2 |
| Heating temperature (° C.) | 20.0 |
| Heating setpoint (° C.) | 19.0 |
| Cooling temperature (° C.) | 22.0 |
| Cooling setpoint (° C.) | 23.0 |
| Mechanical heat recovery efficiency (%) | 50 |
| Lighting power (W/m$^2$) | 5.0 |
| Target illuminance (Lux) | 250 |

Through active control of pigment fluid coverage (between 0-60%), transmitted weekly solar energy varied by up to 300% along the south, west, and east facades (FIG. 12B-12E). This level of solar control allowed the active facade to functionally reconfigure and achieve annual heating and cooling energy savings of 71%, 59%, and 50% compared to a statically-shaded double-pane glass window, a double-pane glass window with a static low-emissivity coating, and a static double-pane glass window by itself, respectively (FIG. 12M). All modelled assumptions regarding optical and thermal material properties, occupant density, human activity, ventilation rate, heat recovery, and lighting efficiency are outlined in Extended Data Tables 1-2. A high standard thermal conductivity (Extended Data Table 1) across all facade materials is assumed, such that almost all absorbed solar radiation is conducted back outdoors rather than internally, thereby minimizing conductive heat flow and isolating the radiative thermoregulatory effect.

Figure 25A:
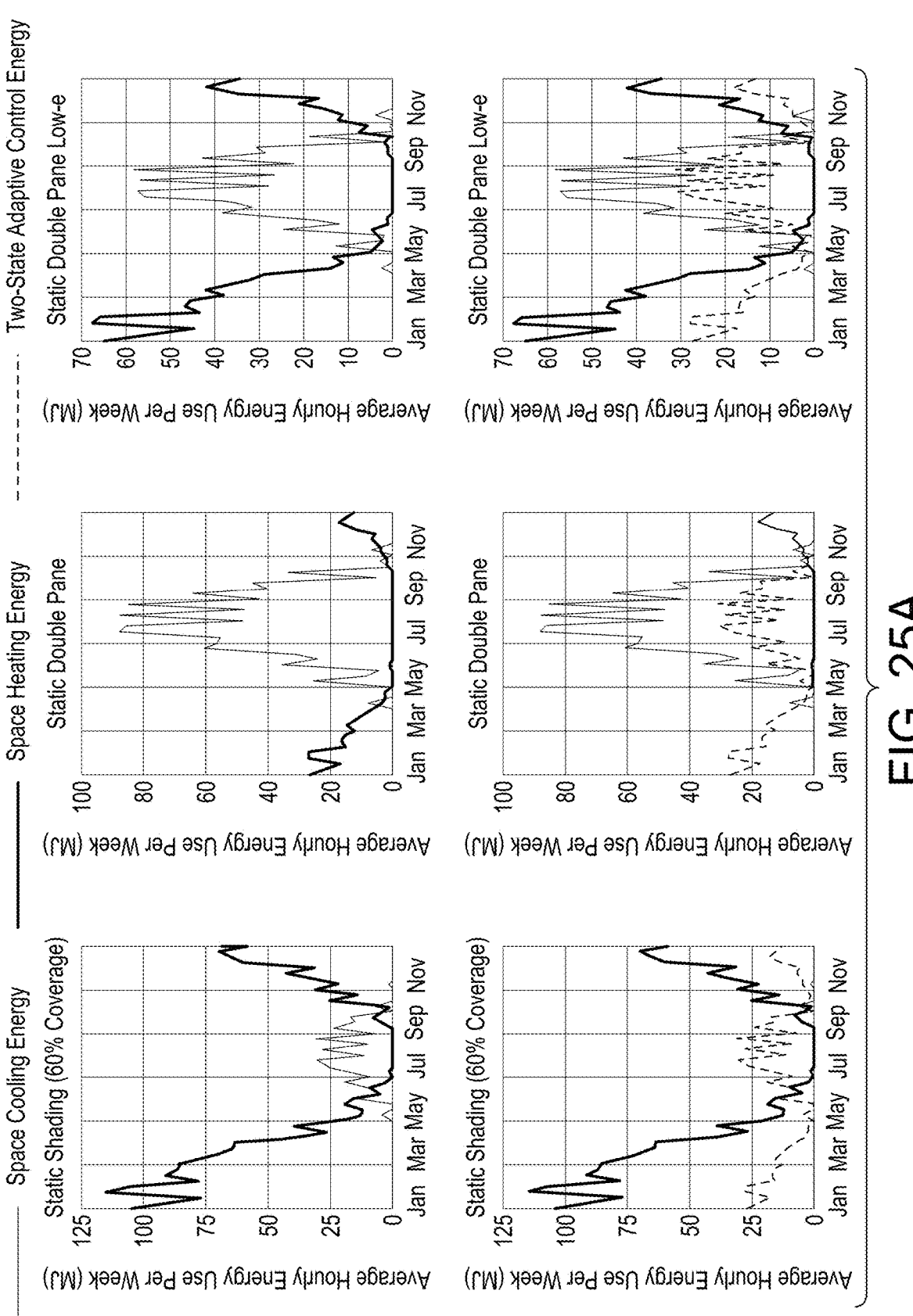
FIG. 25A depicts simulated space heating and space cooling energy use for test-case building when statically shaded.
Figure 25B:
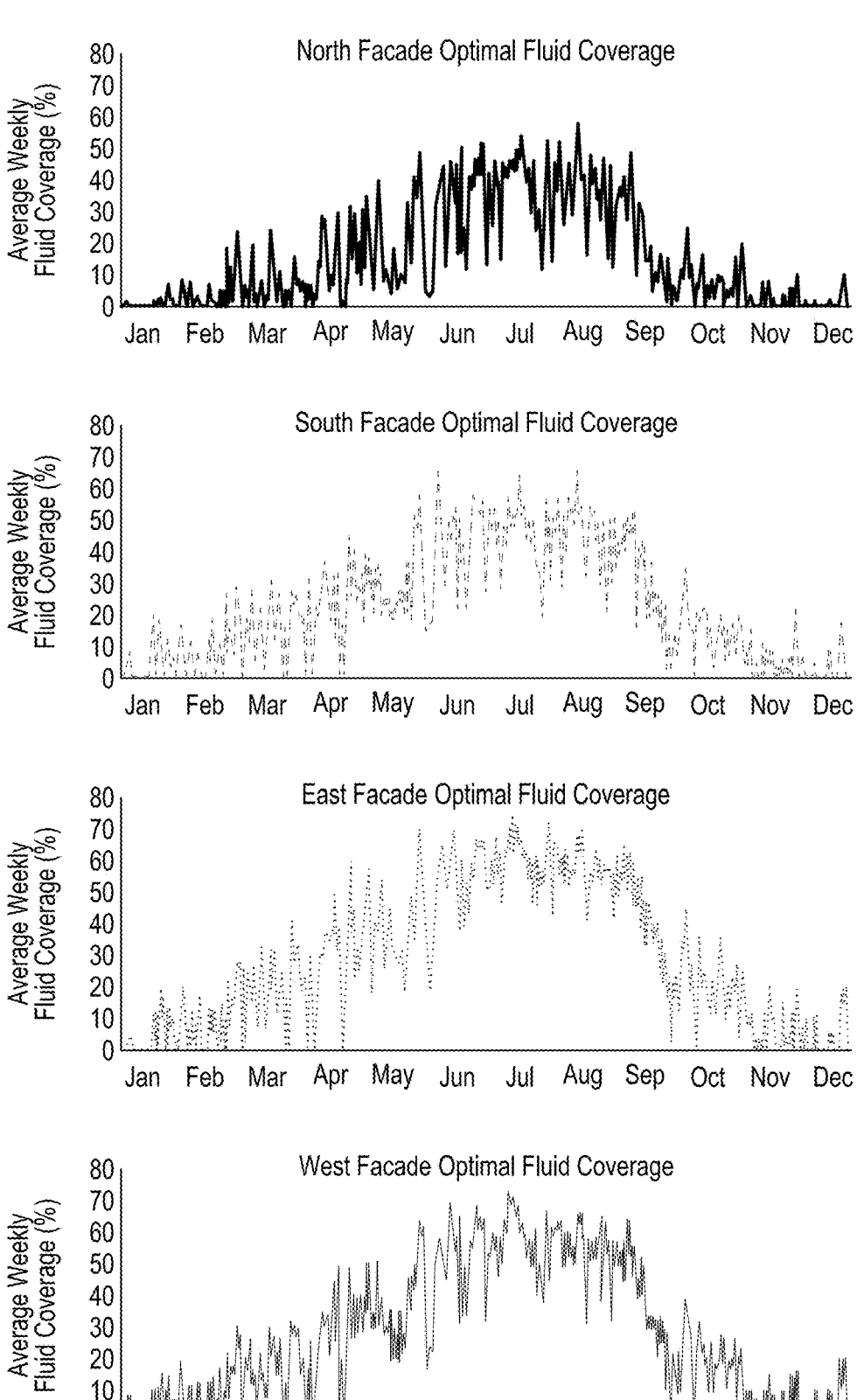
FIG. 25B depicts hourly change in fluid coverage to minimize combined heating and cooling energy use for each building facade.

Statically-shaded facades and low-emissivity-coated facades both have low SHGCs (<0.2) and perform relatively favourably in the summer months, when shade is beneficial, blocking unwanted thermal radiation. However, they perform relatively poorly in the winter months, blocking useful thermal radiation (FIG. 25, top). Static glass facades with no shading or low-emissivity coating have high SHGCs (>0.7) and perform relatively favourably in the winter months, transmitting helpful thermal radiation, but relatively poorly in the summer months, over-warming through unmitigated thermal radiation. The adaptive fluidic facade can avoid seasonal performance constraints through consistent spatial reconfiguration of a pigment-containing fluid (FIG. 25A, bottom, FIG. 25B), varying the average SHGC by approximately 60%.

Importantly, the results suggest that active control over fluids with independent transmission properties can induce significant changes to solar heat gain ($\Delta$SHGC>60%) and heating and cooling energy consumption (50-71%), independent of thermal properties (thermal conductivity). These energy efficiency benefits correspond to the 'best case' scenario, when the optimal configuration is identified at discrete time points. In a real environment, sub-optimal configurations are expected. However, it is important to consider the potential for machine learning algorithms to adjust this digitally-controlled system. It is proposed that fluidic facades can enable a new optically-adaptive paradigm in building design, and suggest a systematic investigation into the energy impact of active pigment control across climatic regions and building typologies.

Discussion

Inspired by the dynamic pigment shading response in marine decapods, a low-cost, large-area shading mechanism, leveraging the reversible re-distribution of pigment from a 1D reservoir to 2D area, while organized into independent cells within an array is demonstrated. Analogous to the krill, a small volume of stored pigment fluid (20 mL) can change the overall light transmission of a 30×30 cm$^2$ area by over 90% when injected and expanded, without an energy requirement to maintain the absorption (shaded) state. While these dynamic optical transitions are much slower than conventional digital displays (seconds to minutes, rather than the <10 ms response of a typical LCD display), they fit well within the necessary response time of active building facades in changing solar conditions.

Importantly, buildings are the costliest energy sinks on the planet, consuming approximately 75% of the electricity in the U.S. Any objective to reduce energy efficiencies and total carbon emissions globally should immediately recognize the need for even modest improvements in building design. Despite significant improvements in energy efficiency in certain technologies (e.g., transportation, energy-harvesting), improved building efficiency has progressed only moderately within the past century, and in many respects has even declined. For instance, while the energy costs and inefficiencies of glass windows were recognized since the mid-19th century, the use of glazing in buildings, and the associated indoor heating and cooling costs, has significantly increased.

Buildings with significant glazing ratios must compromise between maximizing total indoor daylight illumination, while limiting localized glare, and the heating and cooling costs year-round. The development of building materials that can find this compromise—i.e., that can actively shade by locally toggling between the optical performance of a window and wall—might simultaneously increase total illumination, reduce concentrated glare and discomfort, and substantially lower mechanical heating and cooling requirements. This work represents significant progress in this direction, as locally-responsive shading that might overcome the functional limitations of macro-scale mechanical mechanisms is achieved (e.g., blinds).

Moreover, because the optical properties and functions of fluids can be easily tuned, switchable fluid expansion can be leveraged to control a range of responses beyond opaque shading—for example, directionally-programmable light scattering, polarization, and spectrally-selective absorption of IR light (this would crucially decouple control of daylight and heat gain indoors, which is another fundamental challenge in building design).

In addition to area fraction control of injected pigment fluid, an interfacial branching instability to tune morphology is leveraged. Branching, as opposed to stably expanding, pigment coverage enables larger length-scales of dispersal for small volumes of fluid. Krill achieve branching morphologies through a fixed channel structure, while, in this work, branching dynamically through active control of injection flow rate is tuned. Over large areas, branching provides more uniform optical transmission across a window, where multiple branching structures achieve a high spatial resolution of optical consistency, as a halftone response.

Finally, dynamic control over multiple fluidic cells enables highly-localized, digitally-programmable shading responses. Digital control importantly ensures that a 'whole building response' can be optimized for maximum energy efficiency in varied hourly, diurnal, and seasonal environmental conditions. In this vein, it is showed that fluid reconfigurations at hourly timesteps could achieve massive performance improvements, saving almost 60% on annual heating and cooling energy compared to the static state-of-the-art low-emissivity window. With this fluidic control established, it is assumed that artificial intelligence algorithms can collect, processes, and act upon large amounts of localized environmental data, even more drastically improving system management and energy efficiency. Ultimately, there is great potential for digitally-controlled, active shading to allow the next generation of buildings to learn, with fundamental implications for an architecture that designs and redesigns itself.

Methods

Prototype Fabrication and Preparation

Several prototype devices were fabricated, ranging in surface area from 5×5 cm$^2$ to 45×45 cm$^2$. All prototypes were fabricated as PMMA-liquid-PMMA sandwiches (Hele-Shaw cells, 1-mm fluid gap). For single-cell devices, an inlet hole (5.5 mm diameter) was drilled into one of the PMMA plates, and a luer adapter with a barbed hose fitting was sealed to the inlet using two-part epoxy resin. PVC tubing (¼" I.D., ⅜" O.D.) was connected to a digital peristaltic pump (INTLLAB, RS385-635) or digital syringe pump (New Era Pump Systems, NE-1010) for experimentation. The space between rigid plates was sealed with a 1-mm-thick sheet of double-sided tape (3M), which acted as a durable and waterproof boundary for the enclosed liquid layer. An outlet hole (5.5 mm diameter) was drilled to allow air to escape during filling.

The devices were first filled with transparent host liquid (oil). Experiments were conducted by pumping pigment fluids into the oil-filled cell. If both plates of the cell were rigid (in this case made of 3-mm-thick PMMA), four outlets were established (one at each corner of the cell, 5.5 mm diameter). Each outlet enabled a small volume of liquid to reversibly leak and return, into a container open to the atmosphere. This method was used for pattern morphology testing, as plate thickness could be kept constant (plate thickness impacts branching pattern features). For multi-cell prototypes, a thinner PMMA plate (0.2 mm thick) was used to alleviate the need for outlets. All PMMA sheets were transparent, however a white sheet of plastic was placed directly behind the cell to observe fluidic patterning more clearly. All PMMA sheets were either milled using a three-axis CNC-mill (AXYZ Pacer 4010 ATC) or cut with a laser cutter (Universal Laser Systems PLS 6.150D). The tape gasket was cut manually.

Fluid Preparation and Viscosity Measurements

Castor mineral oil was used (Heritage Store) as the clear host liquid. Different glycerol-water (BioShop, purity 99%) solutions with suspended carbon black particles was used (Davis Colors, 0.2 g C per 50 mL glycerol-water solution) as the pigmented liquid. Mixtures were sonicated (iSonic D3200) for 120 seconds. Viscosities of glycerol-water solutions were calculated using the four-parameter correlation of temperature dependence on aqueous glycerol solution viscosities, presented by Chen and Pearlstein, and were further verified by comparing the calculated values to experimental values measured by Segur and Oberstar. The viscosity of the carbon suspension in water was measured using a Cannon-Fenske capillary viscometer (Sigma-Aldrich Z275301), and was found to be identical to water by itself (1 cP). The viscosity of castor oil was also measured using the viscometer (288 cP).

Density Matching Experiments

To eliminate buoyancy differences, a water/ethanol solution was used (23 vol %) as a guest fluid to match the density of the host fluid (castor oil) at 23° C. (0.95 g/mL). Mixing of these miscible liquids does not result in a significant change in partial molar volumes. Experiments with vertical devices confirmed there were no drifting effects observed over multiple-hour-long periods.

Branching Pattern Characterization and Flow Rate Measurements

Branching fluidic patterns were characterized based on the number and thickness of branches formed for various flow rates. Fluid area coverage was calculated in ImageJ (NIH, United States). The number of branches were counted and marked in Rhinoceros3D (McNeel, United States). Radius was measured based on a circle that fully enclosed all branching features. Pattern perimeter was measured digitally in Rhinoceros. Characteristic wavelength was determined based on the thickness of the most unstable wavelength— that is half of the width of a finger branch at the moment before it begins to split, as described in previous work. For viscosity tests, an inner and outer circle was defined, respectively, as a circle that completely enclosed the inner fluidic area, and as a circle that completely enclosed all fluidic features. These were identified and defined manually, and their radii, perimeters, and areas were measured digitally in Rhinoceros. Flow was generated and measured using a NE-1010 digital syringe pump. A syringe was connected to inlet PVC tubing (¼" I.D., ⅜" O.D.), which connected the pressurized syringe to the cell.

Light Intensity Measurements and Electronic Feedback

Arduino MEGA 2560 R3 (Elegoo) was programmed to translate the output of a simple photosensor (Adafruit 161) into a proportional input for a 12V DC digital peristaltic pump (INTLLAB RS385-635). A handheld LED light source was used (Neewer 10095736) to provide a constant light intensity of 100 Lux.

Temperature Measurements and Electronic Feedback

Arduino MEGA 2560 R3 (Elegoo) was programmed to translate the output of a digital K-type thermocouple (Hi-LetGo) into a proportional input for a 12V DC digital peristaltic pump (INTLLAB RS385-635). The experimental setup is detailed in FIG. 10K. An incandescent light bulb was used as a heat source that generated a constant power of 100 W. A K-type thermocouple was used (0.523 kJ/kgK) to measure the temperature of a PMMA sheet (1.42 kJ/kgK), 3 cm behind the fluidic facade.

Optical Spectral Measurements

UV-vis-infrared spectrophotometry (Perkin-Elmer Lambda 1050) was performed for both clear and pigment fluids.

Local and Differential Light Intensity Control and Electronic Feedback

One digital peristaltic pump (INTLLAB RS385-635) to the inlet tubing for every cell was connected, and placed a photosensor (Adafruit 161) 2 cm behind each cell to measure cell-specific local light intensity. A similar control algorithm was applied as described for individual cells, and illuminated individual cells in sequence to generate a fluidic pigment response to independent local light intensity changes.

Simulated Optofluidic Displays

A Python program was developed to first input and convert RGB images as greyscale multipixel arrays, next average regional collections of greyscale pixels, and finally replace multipixel collections with experimental images of fluid injection. Larger greyscale values were replaced with proportionally larger fluid pattern structures. Several half-tone displays were generated using experimental images of stable, quasi-circular, injection sequences.

Building Energy Simulation Setup and Baseline Calculations

Annual energy consumption for space heating and cooling was calculated using Honeybee, a user interface for the EnergyPlus, OpenStudio, and Radiance simulation engines. A room 'zone' (20×20 m in area, 6 m high) was defined without partitions, and was aligned parallel to the cardinal directions. The simulation used climate data from Boston, Massachusetts, and the generated room was set to maintain temperatures outlined in Data Table 2 provided in the foregoing. All four of the room's faces were set as glazing materials and annual energy was initially simulated for two opposing conditions: (a) static shading across all four faces, and (b) complete static transmission across all four faces. Static shading was defined as 60% fluidic area coverage (i.e., 60% fluid-to-window ratio), where the window material was defined as a double-paned window, and the fluidic material was defined as multilayer material comprising a plastic and fluid layer (see Data Table 1 for complete list of material properties). Static transmission was defined as 0% fluidic area coverage, where the entire face was defined as a double-paned window (Data Table 1). Static transmission was also simulated for a standard double-paned window with low-emissivity coating.

Adaptive System Simulations and Optimization Calculations

To simulate energy performance for adaptive control, thirty unique combinations of fluidic area coverage across all four faces were generated. It is worth noting that there are 625 permutations for area coverage (assuming each face can be at either 0%, 15%, 30%, 45%, or 60% area coverage); in our case, the thirty simulated states represented those deemed most likely to be energetically beneficial. Annual heating and cooling energy were calculated for each of the thirty system states, and the state that yielded the lowest energy load (space heating plus space cooling energy) for every hour within the year was selected. Total energy for each optimized hourly condition was summed across the year to generate an annual energy load. While this technique is common in the literature, one crucial assumption it makes is that, by taking hourly energy loads resulting from independent building simulations, the difference in the indoor thermal energy between simulations at successive timesteps is small. This assumption was validated by running a simple building simulation, with fluidic switches scheduled according to our defined optimal performance (FIG. 12L). This version of the simulation considers transient thermal effects, and only small differences was noticed in operational energy use. Additionally, by modelling all facades incorporating glazing units with low thermal conductivity (Data Table 1), it was assumed that nearly all solar energy absorbed by the pigment fluid was reemitted back outside, rather than conducted through the well-insulated glazing.

Bubble System

Bubble Self-Assembly Background

When a fluid of lower viscosity is forced with pressure into a second fluid of higher viscosity, the interface between fluids becomes unstable. While first observed in oil fields, where the interface between water and oil is susceptible to bifurcation and branching during oil extraction, this nonlinear fluidic phenomenon has fascinated physicists and mathematicians for nearly a century. Known as viscous fingering, this instability is most commonly studied within quasi-two-dimensional venues, known as Hele-Shaw cells, where one fluid is introduced into the next between two closely-spaced rigid plates.

As demonstrated by Saffman and Taylor, the interface between the injected 'guest' fluid (e.g., air) and displaced 'host' fluid within a Hele-Shaw cell will become unstable, and is suspectable to fractal-like branching, if the amplification factor of a branch width, $a_\lambda > 0$, for $$a_\lambda = 3V\Delta n - \sigma\left(\frac{\pi b}{\lambda}\right)^2 \tag{1}$$

Here, flow in the vertical plane due to buoyant forces is assumed to be negligible, $V$ is the velocity of the fluid bubble (e.g., air) at the interface, $\Delta n = n_h - n_g$, $n_h$ is the host fluid viscosity, $n_g$ is the invading guest fluid (e.g., air) viscosity, $b$ is the gap between plates, $\sigma$ is the interfacial surface tension, and $\lambda$ is the finger width of the instability. Simply, an invading fluid bubble will bifurcate and form branches if the left-hand term is larger than the right-hand term—e.g., if the invading guest fluid is injected fast enough to overcome surface tension.

Materials and Methods

Figure 7B:
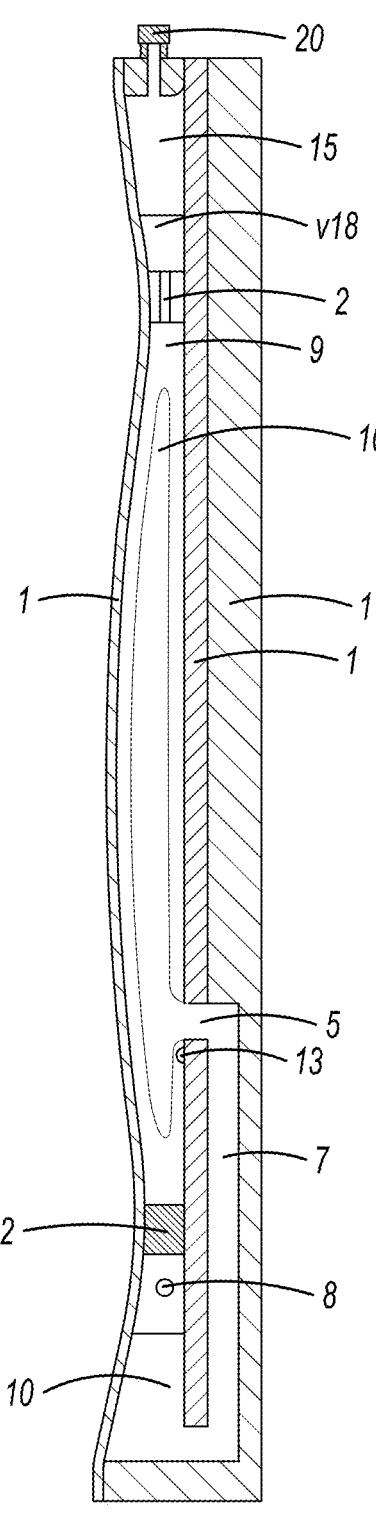

We now refer to FIG. 7, in which the device comprises:
1. Transparent Members
2. Gasket
3. Envelope
4. Cell
5. Port(s)
6. Intracellular Fluid Conductors
7. Channel
8. Pressure Source
9. Host Liquid
10. Guest Liquid 11. Host Reservoir
12. Guest Reservoir
13. Port Standoffs
14. Gap Height
15. Air Gap
16. Window Frame
17. Ventilation Holes
18. Host Liquid Height
19. Free surface interface
Method:
20. Pulsed injection of Guest Liquid
21. Area Fraction adjustable by Flow Rate
22. Area fraction adjustable by Viscosity Changes
23. Pattern adjustment by port positioning
24. Transparency relationship between host and guest fluids
System:
25. Array
26. Intercellular Fluid Conductors
27. Bidirectional Fluid Sources
28. Thermal Sensors
29. Optical Sensors
30. Historical Data
31. User Input
32. Building Interior
33. Lights
34. Window
35. Building Exterior
36. Sun
37. Control Unit System Overview A fluidic shrouding system is disclosed that provides point-specific adjustments to the optical transmission of light through the exterior boundary of a building. The shroud uses active pigmented liquid injections to control the sunlight that passes through windows, to offset and mitigate the demands of interior lighting and climate control systems.

The shrouding system consists of an array 25 of individually addressable cells 4 capable of transforming their optical properties via fluid injections in the cell 4 through at least one port 5 in the envelope 3. The method of injection is used to vary the shrouded area covered by optically active pigments contained within the host liquid 9 and guest liquid 10. The pigments are injected from at least one pressure source 8 in response to environmental stimuli detected on optical sensors 20, to adjust toward multiple objectives in lighting and interior climate control. The object of this patent is not to specify the control algorithms, or Internet of Things (IOT) networked systems that are required for large scale control over the building. These algorithms are sufficiently available through existing publications, including the Position Differential Integration (PID) control algorithm for reducing oscillations in the system based on time-varying signals. Instead, here we focused on a series of preferred embodiments for the design of the essential cell 5 and its variants.

The Essential Cell:

In a preferred embodiment, the essential cell 4 consists of two transparent members 1 and a fixed gasket 2, which define an envelope 3. The envelope 3 contains at least two fluids, comprising at least one host fluid 9 and at least one guest fluid 10, and is accessed by at least one port 5. The cell 4 is connected via port 5 to a fluid conductor 6. In a preferred embodiment of the system, the fluid conductor 6 is an embedded channel 7 within at least one of the transparent members 1. The fluid conductor 6 is connected to a pressure source 8 and host 11 or guest liquid reservoir 12. In a preferred embodiment the pressure source 7 is a peristaltic pump that can be controlled by digital electronic signalling from a control unit 28.

The guest liquid flows into a radial branching effect known as radial viscous fingering, partially or completely displacing the host fluid 9 as it invades. The radial array of fingers of guest fluid emanates from the port 5 and enters into the host fluid 9. This pattern of growth provides a discrete optical change between the area covered by guest liquid 10 and host liquid 9, due to variations in the two fluids' pigmentations and transparencies. The extent of the guest fluid 10 patterning is determined by the method by which volume is accommodated within the cell 4.

Reversible Cell Embodiments 1-4

The device operates in two primary modes of accepting new liquid volume in the form of guest fluid 10. In a first embodiment, the cell 4 is rigid and displaces host liquid 9 into a region where it is held in reserve until flow reversal. In a second embodiment, the cell 5 breathes, by elastically deflecting the transparent members 1 in a bending moment, and then relaxing the bending moment upon flow reversal.

Embodiment 1: Rigid with Sinks In a preferred embodiment of the device, the first mode of operation applies to a reversible system of control when the envelope 3 is rigid. In this type of system, the new guest liquid 10 is accommodated by displacing host liquid 9 from the cell 4 and into a host reservoir 11. The host liquid 9 exits the envelope 3 through at least one port 5 to be temporarily stored in a host reservoir 11. The host reservoir 11 is maintained in fluid communication with the cell 4, via a channel 7, and in fluid communication with the atmosphere through ventilation holes 17, to maintain atmospheric pressure within the host reservoir 11, to accommodate host liquid 9 more easily as it leaves the cell 4.

Upon reversal of the direction of flow of guest fluid 10, brought about by the reversal of the applied pressure in the pressure source 8, and thus effectively a reversal in the pumping direction, the guest fluid 10 is withdrawn from the rigid cell 4. In this embodiment, and in all embodiments wherein vacuum pressures below ambient pressure are used to withdraw guest fluid 10 from the port 5 through which guest fluid 10 came, the cell 4 ideally incorporates at least one port standoff 13, around at least one port 5, to prevent any pinching that might result from an imperfectly rigid transparent member 1 reaching deflection values in excess of the gap height 14. If no such port standoff 13 exists, there is the potential for the transparent member 1 opposite the port 5 to seal the port 5 through elastic deformation of the transparent member 1, bringing the transparent member 1 into contact with the port 5. This must be avoided to maintain fluid communication between any pressure source 8 and cell 4. Port standoffs 13 modify the local region surrounding (bidirectional) ports 5 to prevent accidental sealing. Sealing, if it does occur, can be difficult to reverse as the vacuum forces within the cell 4 affect large surface regions of the transparent members 1. Thus, small vacuum pressures can establish large clamping forces across large cells 4. Port standoffs 13 would not be necessary if in this embodiment the cell 4 was never brought into internal operating pressures that would cause significant enough negative deflection of the transparent member 1, local to the source port 5, to exceed the local gap height 14.

Guest Fluid Injection Extents

The extent of the guest fluid 10 ingress should not come into contact with a sink port 5 where host liquid 9 is leaving the cell 4 and entering a host reservoir 11. If it does, the guest fluid 10 will be evacuated from the cell 4 through this port 5. Therefore, if the above embodiment is preferred, then the guest fluid 10 must not contact the ports 5 leading to any host reservoirs 11. To avoid losing guest fluid 10 to such a host reservoir 11, it is recommended that the guest fluid 10 should be injected through source ports 5 that are far enough away from sink ports 5 such that the extent to which the guest fluid 10 fingers reach toward a sink port 5 does not exceed 95% of the distance to that sink port 5.

Embodiment 2: Rigid with a Free Surface In a preferred embodiment of the device, the transparent members 1 are rigid. In the initial state, prior to the injection of guest liquid 10, the vertically oriented cell 4 has host liquid 9 filling the vast majority (~95%) of the cell 4 area. The remaining marginal (~5%) area of the cell 4 is concealed within the window frame 16, and has a large gap height 14. In this space there exists an air gap 15. The air gap 15 is defined by the free surface interface between air and host liquid 9, and the walls of the cell 4. The air gap 15 volume should exceed the guest fluid 10 injection volume. It is recommended that the air gap 15 volume is at least 125% of the injected maximum guest fluid 10 volume injected into the cell 4. An accommodating volume within the air gap 15 can be achieved by modifying the separation of the plates with a larger gap height 14 within the air gap 15 region than is present throughout the cell 4. The free surface interface 19 is the boundary between host liquid 9 and the air gap 15 within the host reservoir 11. The free surface interface 19 is used to determine the host liquid height 18, which is adjusted by the net flux of fluids and liquids into and out of the cell 4. The host liquid height 18 is adjusted locally by the flow of host liquid 9 into the air gap 15. The air gap 15 can be hidden inside of the window frame 16. We can consider this air gap 15 as a preferred embodiment of the host liquid reservoir 11. The air gap 15 provides a space for the host fluid 9 to flow into, when the guest fluid 10 is injected. Thus, the host liquid height 17 adjusts based on the influx of guest fluid 10 flowing inward through at least one source port 5. This air gap 15 is maintained at atmospheric pressure, by being in open fluidic communication with the atmosphere through ventilation holes 17, during the injection of guest fluid 10. Thus, when a guest fluid 10 is injected through at least one port 5 into the cell 4, the guest fluid 10 is accommodated in the cell 4 by the displacement of a host liquid 9, that results in a rising of the host liquid height 18, that displaces a volume of air from the air gap 15, through ventilation holes 18. In this embodiment, the extent of the guest fluid 10 ingress should not come into close proximity with the host reservoir 11. Before such time as the guest fluid 10 becomes near to the boundary of the cell 4, the forward pumping should cease in the forward direction, and before further forward injections can be considered, the pumping should reverse and retract the guest liquid 10, so that at no time does the guest liquid 10 come into contact with the host reservoir 11.

Embodiment 3: Rigid with a Pressurized Surface In a preferred embodiment of the device, the air gap 15 is normally closed to the atmosphere. Air has a compressibility factor of 1.00 at standard room temperature (300K) and pressure (1bar). Therefore, when the guest fluid 10 is supplied to the cell 4 via a source port 5, and under sufficient pressures provided by the pressure source 8, the air gap 15 can compress, due to rises in the host liquid height 18. This pressurized air gap 15 provides a useful positive pressure "air spring" to assist in the withdrawal (reversal) of the guest fluid 10 from the cell 4 through at least one sink port 5. The positive pressures developed within the air gap 15 act as a spring, storing energy and releasing energy by forcing guest fluid 10 backwards through the ports 5 from which it came, whenever the pressure in the pressure source 8 is decreased from its injection pressure. Returning the pressure source 8 to an ambient pressure of atmospheric pressure, can provide the complete retreat and reversal of flow of guest fluid 10 from the cell 4. The compression of air within the air gap 15 provides a preferred embodiment of guest fluid 10 flow control, where the supplied pressure in the guest fluid 10 displaces the host liquid height 18 until the pressure is matched in equilibrium by the compression of air in the air gap 15 above this interface, plus any column height gravitational contributions $P_g=\rho gh$. This alternative control method uses pressure, and not volume, as the limiter of guest liquid 10 injection. The air gap 15 can even be charged with positive pressure through a source port 5 of compressed air. This overpressure can then be used to reverse flow in the cell 5.

Embodiment 4: Flexible Plates In a second mode of operation, the transparent members 1 are intentionally elastic and deform elastically under the pressure provided by the pressure source 8, to accommodate guest fluid 10 volume entering the cell 4 through at least one port 5. The host liquid 9 need not leave the cell 4 to accommodate guest fluid 10, nor is there a need in this embodiment for an air gap 15, nor ventilation holes 18, nor any host reservoir 12 to receive host liquid 9 during guest fluid 10 injection. Instead, at least one of the transparent members 1 deflects slightly from the other, modifying the gap height 14 between the transparent members 1. The deflection and variable gap height 14 that results, should be modelled computationally and used to calculate the area coverage of an injection of guest fluid 10, as the gap height 14 may vary significantly throughout the cell 5. The pressure within the cell 5 must be monitored to ensure the stability of the cell 5 during deflection. Elastic models of the cell 5 can be used in finite element simulations to ensure strain concentrations are not in excess of the yield stress for the glass, gaskets, seals, nor any aspect of the fluid assembly. The strength of this method is that the deflection of the plates can be achieved at low pressure within standard double-glazed glass windowpanes (transparent members 1), and the initial flow of guest fluid 10 into the cell 4 is established through even the slightest deflection of at least one transparent member 1.

Embodiment Combinations:

The embodiments may be combined to offer various levels of control to meet design objectives. For flexibility of design and application, we recommend a combination of the embodiments, as most systems except for the most rigid windows will display some of the plate flexion of embodiment 4. In a preferred fifth embodiment, embodiments 3 and 4 are combined to control the flow in a cell module that can be easily installed in most window frames 16 (See FIG. 7).

Plate Flexion Considerations

The pressure source 8 can supply pressurized guest fluid 10 in sufficient pressures as to cause the transparent members 1 to deflect. The deformation continues under injection of guest fluid 10 until such time as the applied pressure in the guest fluid 10 is in equilibrium with the internal stress developed within the cell 4. The transparent members 1 deflection results in an increase in volume within the envelope 3, by increasing the gap height 14 without noticeable change in the 2D geometry of the gasket 2.

Under low pressure operations, the transparent members 1 will remain in largely planar, parallel configurations, with slight outwardly convex deflection from each other. In such a configuration, as in all non-horizontally (e.g. vertically) oriented cells 4, where we seek the retraction of guest fluid

10 from the port 5 through which it came, it is important to ensure that the buoyancy effect of the guest fluid 10 within the host liquid 9 is negligible, should we wish to simply reverse flow direction and restore the initial state of the system. Increased gap height 14, through its effect on cross sectional area of a section of the cell 4, will otherwise cause irreversible acceleration via buoyant drift of guest fluid 10.

NEUTRAL BUOYANCY: Neutral buoyancy can be achieved by matching the densities of the host liquid 9 with the guest fluid 10. The significance of this non-buoyant relationship is greater when dealing with larger gap height 14 between the transparent members 1. With larger gap height 14 comes greater guest fluid 10 volume (given a constant value for area coverage). The greater volume and increased gap height 14 amplifies buoyancy effects causing accelerated drifting. Therefore the neutral or non-buoyant values of the host liquid 9 and guest fluid 10 by way of matching the densities of the two fluids, is recommended.

Guest/Host Fluid Selection

Selection of the guest fluid 10 and host liquid 9 is recommended to be restricted to the following conditions: Immiscibility, a viscosity relationship $n_h/n_g>1$, surface wetting between host 9 and guest 10 fluids and the transparent members' 1 inner surfaces, significantly different pigmentation and other optical properties between guest fluids 10 and host liquids 9. Non-wetting material interactions can be used to completely eliminate residual host liquid 9 from the transparent member 1 when guest fluid 10 displaces host liquid 9 within the cell 4.

Guest Fluid Shape Control

The pattern and shape of guest fluid 10 emanating from at least one source port 5 within a cell 4 defines the shading region provided by the cell 4. The guest fluid 10 extents are determined by several factors: volume injected, gap height, area fraction, and the direction of host liquid 9 displacement (see FIG. 14, 26, 28). We are able to adjust and deform the extent of the guest fluid 10 pattern, by modifying where host liquid 9 is flowing toward, where other guest fluid 10 source ports 5 are emanating from, and through the placement of sink ports 5 and air gaps 15, combined with the relative deflection of transparent members 1. Effectively, by combining the various embodiments above, we can control the shape of the guest liquid 10 injections.

Guest fluid 10 patterns are self-avoidant. When neighbouring ports 5 are chosen as sources of guest fluid 10, the two guest fluid 10 injection patterns will grow towards each other only to an extent below a point at which the competing pressures within the two guest liquid pattern injections 10 becomes equal and in-so-doing determine an equilibrium boundary, thereby avoiding intersecting, in a process analogous to the deformation of neighbouring bubbles in foam, and canopy avoidance among neighbouring deciduous trees in a forest.

Guest fluid 10 patterns will deform and drift in the direction of host fluid 9 flow. At the growing interface of the guest fluid 10 pattern, the local host liquid 9 flow direction determines flow direction of the guest fluid 10. The host liquid flows towards host drain ports 5, toward free surfaces 18, and away from guest fluid 10 or host liquid 9 source ports 5, and toward low pressure regions developed by the deflection of the elastic transparent members 1. Using these control aspects, one can design a guest liquid 10 tiling, based on multiple ports 5 injecting guest fluid 10 into the same cell 4.

Multiport

In a preferred embodiment to control and arrange the shading regions produced by the presence and distribution of guest liquid 10, we can add multiple ports 5 to a single cell 4. This multiport embodiment provides an opportunity for using fewer cells 4 to cover larger regions of a building surface. Effectively, it allows for larger scale windows with embedded liquid shading capabilities.

Host Source/Sink Port Placement

In a preferred embodiment, the host sink ports 5 are connected to host reservoirs far from the guest source ports 5.

Guest Source/Sink Port Placement

The guest liquid 10 source ports 5 can be placed near to, or far from, the gasket 2 boundary. The designer can choose whether or not to include sources away from the gasket 2 boundary. The advantage of placing ports 5 near the gasket 2, or even embedding the port 5 in the gasket 2, is that this eliminates the need to route a visible channel 7 across the cell 4. Side injections can be directed towards the middle of the cell 4 by using the plate deflection technique of Embodiment 4. The deflection near the middle of cell 4 will draw guest liquid 10 into this accommodating region.

To anticipate the tiling pattern of guest fluid 10 injections within the cell 4, we can consider the guest fluid 10 source ports 5 to be centroids of a Voronoi tiling. This approach roughly approximates the tiling of the cell 4 with guest fluid 10 when the injections reach their most complete forward state.

Pressure Source

The guest fluid 10 injections must be reversibly controlled by at least one pressure source 8 that can enable a reversable flow direction. In a preferred embodiment, the pressure source 8 is a peristaltic pump connected to a digital controller. Such a pump can be controlled to meter precise volume injections, at precise injection rates, at pressures of up to 30 KPa. These pumps can then be arrayed within the window frame 16 and signalled to control individual injection ports 5.

Addressing Multiple Cells

In a preferred embodiment, an entire window (cell 4) can be controlled by a single pressure source 8. The pressure source 8 can be simultaneously in fluid communication with multiple ports 5, and flowing guest fluid 9 to the multiple ports 5 within at least one cell 4 within an array 25 of cells 5. This simultaneously will trigger the injection of guest fluid 10 into a cell 4 from the multiple ports 5 in open fluid communication with the pressure source 8 (see FIG. 7)

Guest Reservoirs

The guest fluid 10 reservoirs couple with the pressure source 8 to inject guest fluid 10 through the fluid conducting channels 7 and into the cell 4 through source ports 5. These reservoirs are integrated into the window frame 16. This reservoir can be pressurized using positive pressure displacement, for example, in one embodiment by supplying a pressurized source of air into a guest reservoir in the familiar manner to a pneumatic paint spray system, where air is supplied to pressurize an air cavity above the liquid, and the liquid flows out a port located at or near the bottom of the liquid reservoir, as in FIG. 7. In a preferred embodiment, the guest liquid reservoir is drawn from using pressure sources 8 generated by a peristaltic pump. These pumps can easily operate in the forward and reverse direction, and address at least one port 5 each.

Channel Design:

Source ports 5 positioned far from the gasket 2 can be flowed-to by a covered conductive channel 7 engraved in the exterior face of one of the transparent members 1. This channel 7, covered and sealed by a laminating layer, provides a conduit for accessing ports 5 within the sandwich panel of the cell 4, and without the need for externally routed tubing.

Hele-Shaw cells were fabricated, comprising two rigid PMMA plates ($30\times30\times0.6$ cm$^3$). Plates were sealed at the seams using a 1-mm-thick double-sided elastomer adhesive (3M), creating a 1-mm-thick planar space for fluid flow. Hele-Shaw cells was designed with both a central and boundary inlet. For the former case, an inlet port was milled at the centre of, and four outlet ports at the corners of, the top PMMA plate. For the latter case, an inlet port was milled along one boundary of, and two outlet ports at the opposite corner boundaries of, the top PMMA plate. Luer locks were adhered to the inlet ports, and connected the luer locks to PVC tubing ($\frac{1}{4}$" I.D.$\times\frac{3}{8}$" O.D.). The tubing were fed to a NE-1010 digital syringe pump, to control flow rate and flow direction. All outlet ports were left open to the atmosphere, and filled the Hele-Shaw cell with a highly-viscous opaque molasses liquid (FIG. 26A)

To generate reversible air bubbles, air was introduced into the molasses layer confined within the Hele-Shaw cell at a controlled speed (25 mL/min) (FIG. 26B). The air first compressed, before rapidly self-assembling within the cell—at which point volume was estimated to be constant, and therefore pressure was assumed to be constant. As air bubbles displaced the molasses layer, light transmission increased through the cell. Optical transmission spectra, through both the visible and near-infrared regions, was measured with a Lambda 1050 Spectrometer (three-detector module). Time-dependent visible light intensity was measured behind the cell with an Extech HD450 Light Meter Datalogger. And time-dependent temperature was measured behind the cell with a k-type thermocouple. Bubbles were reversibly collapsed by reversing the direction of flow on the syringe pump.

By assuming Darcy Flow within this constant field (i.e., instantaneous flow rate is proportional to the pressure gradient, $q\propto\nabla P$), it was able to assume mathematical analogy to an electromotive model, where field strength is proportional to the gradient of electrostatic potential, $E\propto\nabla I$. Static, steady-state, potential flow for various flow-field configurations (i.e., isotropic and anisotropic) was accordingly approximated by calculating an electric potential field (MATLAB, code adapted from 26), where each inlet was prescribed a charge of $+1$ and each outlet a charge of $-1$.

Optionally, the speed at which air is injected may be used to control how much of an existing fluid is displaced, and, by extension, the transmission of light through the cell Results Reversible Bubble Injection An air bubble was injected into an opaque host phase (molasses) confined within a Hele-Shaw cell (FIG. 26C). Due to the high $\Delta n$ between air and molasses, the interface became unstable, and the bubble bifurcated and branched as it grew. The bubble was subsequently collapsed by switching the direction of air flow to create negative pressure (FIG. 26D). This action also switched the direction of instability— the collapsing interface became stable as $\Delta n$ turned negative—demonstrating stable reversibility over bubble growth. This emergence-collapse cycle was repeated, confirming robust repeatability ($n>50$ cycles)

Tuning Bubble Morphology with Injection Rate

Figures 27A, 27B, 27C:
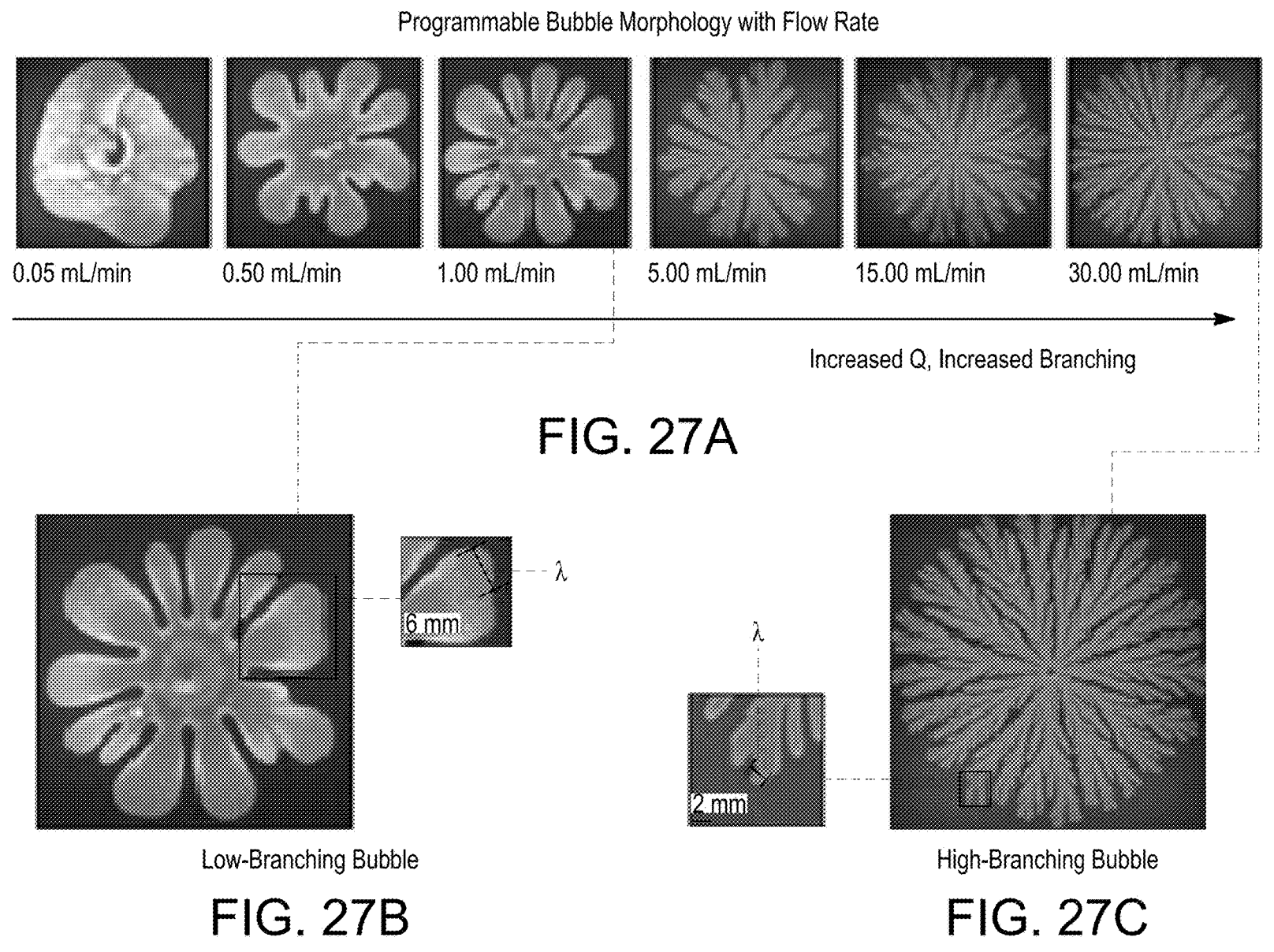

Air bubbles were injected into an opaque molasses phase confined within a Hele-Shaw cell at different constant flow rates, ranging from 0.05-30.00 mL/min (FIG. 27A). As the flow rate increased, the width of the branches decreased, as $3V\Delta n$ grew, as can be verified in the well-established derivation of equation (1) into equation (2). By indirectly tuning V through control over injection flow rate of air, bubble morphology within the cell can be controlled.

$$\lambda = \pi b \sqrt{\frac{\sigma}{V\Delta n}} \qquad (2)$$

Tuning Bubble Morphology with Flow Field

Figures 28A, 28B, 28C, 28D:
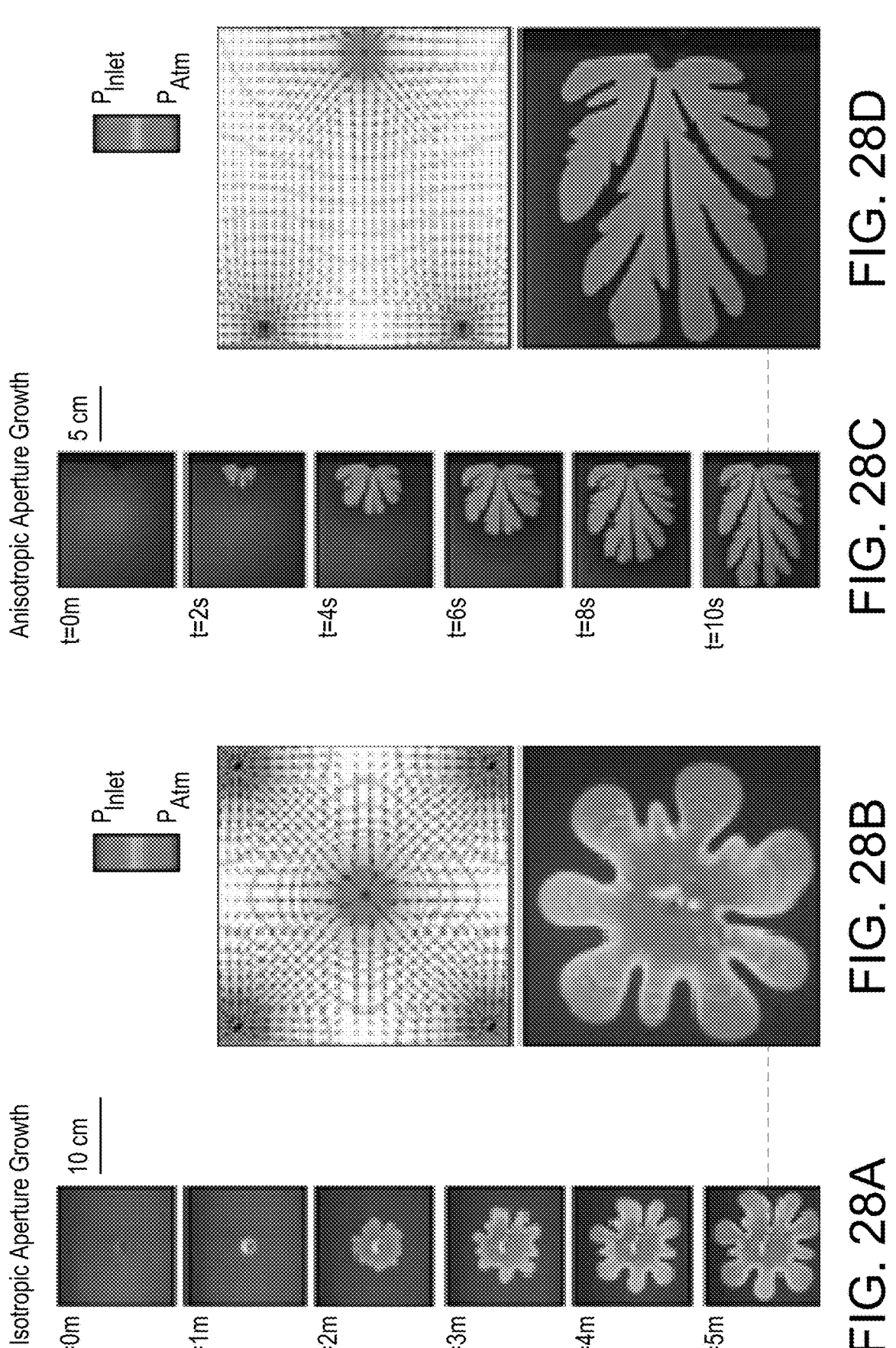
FIGS. 28A-28D depicts the effect of isotropic versus anisotropic flow field on bubble morphology.

Beyond this localized morphological control, control over global pattern morphology through the deliberate placement of inlet and outlet ports within a Hele-Shaw cell is demonstrated. The relative position of inlet and outlet ports, and the relative geometry of the confined cell, determines the static potential flow for the emerging bubble. In FIG. 28, relative morphology between a bubble emerging from a central injection port within a radially-isotropic flow field (FIG. 28A-28B) and a bubble emerging from a boundary injection port within a directionally-biased anisotropic flow field (FIG. 28C-28D) is demonstrated. While the bubble expands radially in the former case, the bubble expands unidirectionally in the latter case. It is speculated that there might be functional benefits to each of these design scenarios—most obviously, a boundary inlet enables better concealment of injection tubing over a central inlet.

Adaptive and Reversible Modulation of Visible Light Transmission

Figures 29A, 29B:
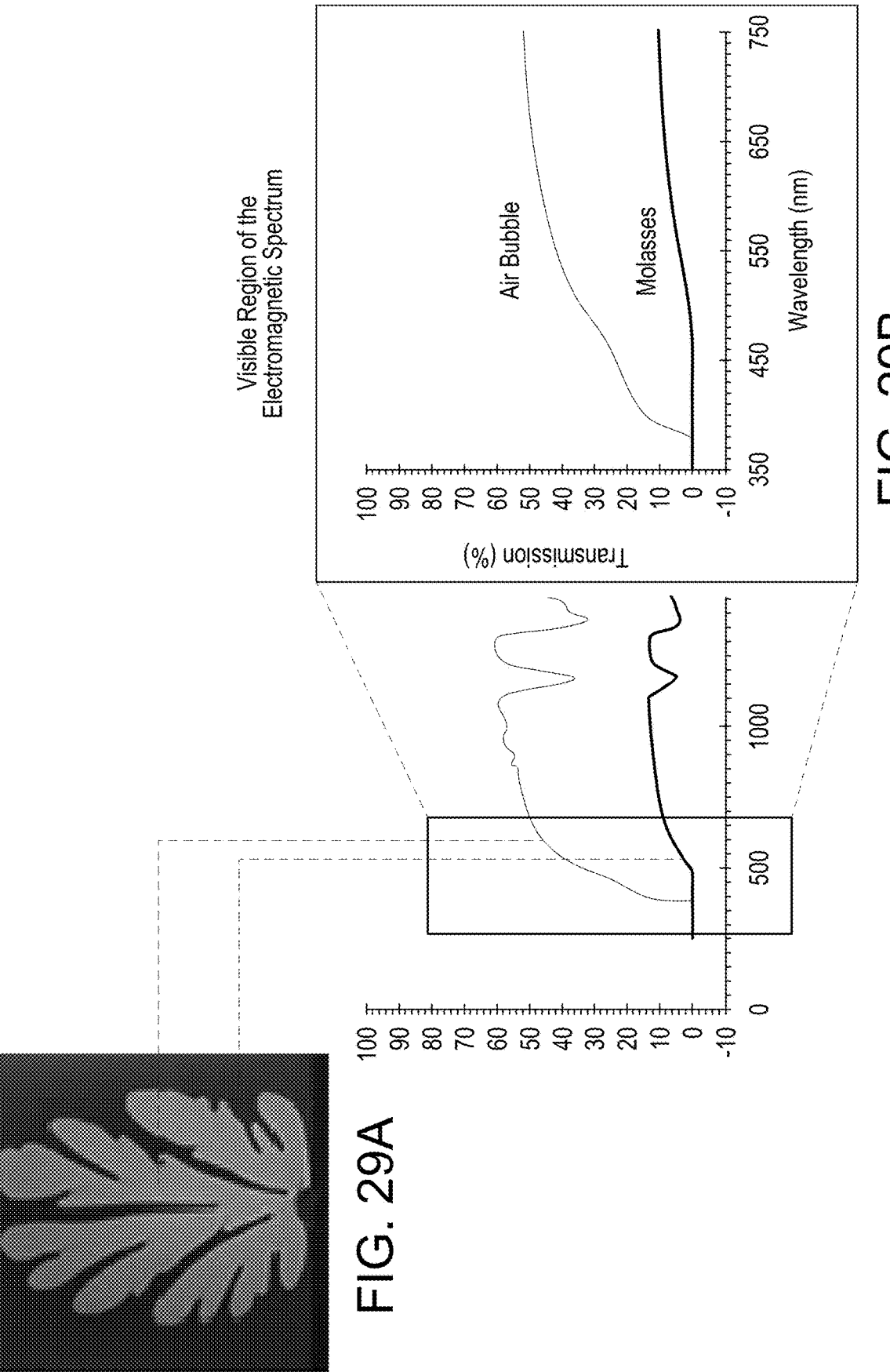
FIGS. 29A-29B depicts local visible light transmission changes with the injection of an air bubble.

An air bubble was injected and subsequently collapsed within the Hele-Shaw cell. Air bubbles displaced a significant volume of the molasses layer, greatly decreasing the cross-sectional path length of molasses through which light was required to travel. The local change in visible light transmission through the cell was characterized, as a function of wavelength, for a fluidic region with and without an air bubble. For cross-sectional regions within the Hele-Shaw cell occupied by an air bubble, the average transmissivity across the visible region of the electromagnetic spectrum was measured using a spectrophotometer to be roughly 35.3% (FIG. 29B). Alternatively, for cross-sectional regions within the Hele-Shaw cell unoccupied by an air bubble (i.e., occupied completely by molasses), the average transmissivity across the visible region of the electromagnetic spectrum was measured using a spectrophotometer to be roughly 4.3% (FIG. 29B).

Figure 30E:
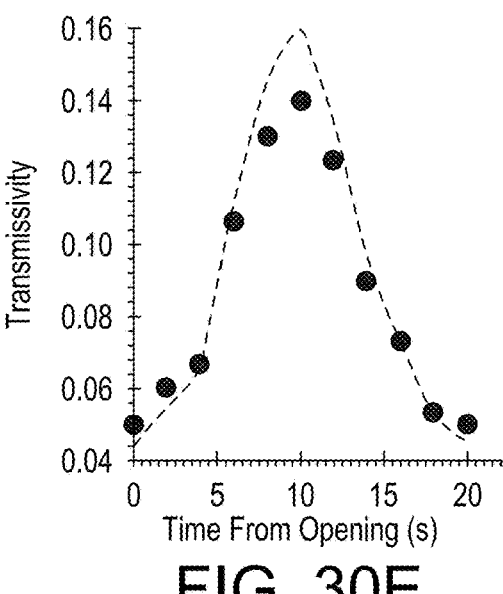

The global change in visible light transmission through the entire cell was then characterized, as a function of cell size across its emergence and collapse (FIG. 30A). A simple 'shoebox' model ($30\times30\times30$ cm3) was developed to control for, and within which to measure, interior light intensity. A portion of one of the six exterior facades of the model was replaced with our fluidic cell, and illuminated the model room from the exterior using a LED light bulb (providing 300 Lux into the space with the panel removed) (FIG. 30B). Interior light intensity from the back of this room was measured, registering a baseline value of 15 Lux prior to bubble injection (FIG. 30C), corresponding to a baseline transmissivity value of 4.5% (15/300 Lux) within the visible spectrum. Air was injected at a constant rate of 25 mL/min and measured both interior light intensity (FIG. 30C) and air bubble area fraction (FIG. 30D) over time. By dividing measured interior light intensity by measured incident light intensity (300 Lux), it was able to characterize transmissivity through the entire cell over time (FIG. 30E)—an important property for assessing the optical performance of adaptive glazing. A good agreeance is reported between measured transmissivity (data points in FIG. 30E) and a

US 12,638,673 B2

Figure 30F:
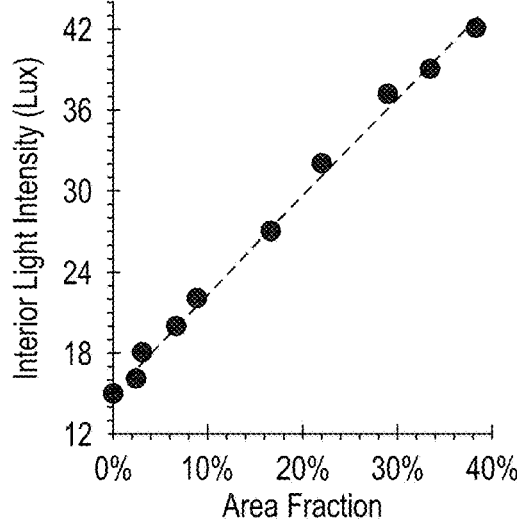
Figure 30G:
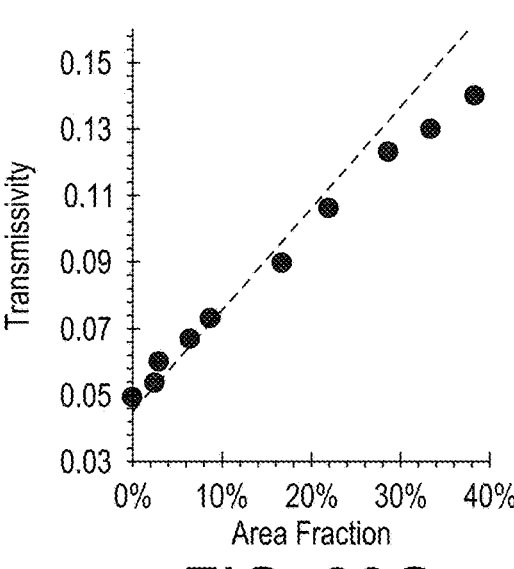

33 theoretical prediction of transmissivity (dotted black line in FIG. 30E), calculated by taking the light transmission of the air bubble and molasses layer averaged across all visible wavelengths (350-750 nm, measured using spectrophotometry as 35.3% and 4.3%, respectively), weighted by their measured area fractions across injection. In simpler terms, this prediction entailed multiplying the measured area fraction of the air bubble by the transmissivity of the air bubble (0.353) and the measured area fraction of the molasses by the transmissivity of the molasses (0.043), and summing these products. As predicted, light transmission and transmissivity both increased as the size/area fraction of the bubble increased, and it was shown that light intensity and transmissivity moved approximately linearly with bubble area fraction (FIG. 30F-30G), to a maximum value of roughly 14%. In FIG. 30G, measured transmissivity values was compared (interior light intensity divided by incident light intensity) to our theoretical prediction, showing broad agreement.

Adaptive and Reversible Modulation of Near-Infrared Light Transmission, Solar Heat Gain, and Heat Flow Beyond describing changes to visible light transmission, the local change in near-infrared light transmission through the cell was characterized, as a function of wavelength, for a temporary air bubble injection (FIG. 31). Similar to the effect demonstrated in the visible region of the electromagnetic spectrum, air injection caused an increase in near-infrared light transmission (FIG. 31B). Both this increase in near-infrared light transmission, and the previously demonstrated increase in visible light transmission, cause an increase in radiative heat flow across the Hele-Shaw cell. This change in radiative heat flow can be captured using a solar heat gain coefficient (SHGC), $$SHGC = T_{sol} + \frac{q_{in(I_s=0)} - q_{in}}{I_s} \qquad (3)$$

Where $T_{sol}$ is the total solar transmittance of the glazing system, $q_{(in(I\_s=0))}$ is the heat flux into the indoor environment without incident solar radiation, $q_{in}$ is the heat flux into the indoor environment with incident solar radiation, and $I_s$ is incident solar radiation. Here, $T_{sol}$ of a material can be computed as the sum of the solar irradiance on earth (FIG. 31C) at each wavelength multiplied by the material transmissivity at each wavelength, all divided by the total solar irradiance on earth. If it is presumed that the Hele-Shaw cell is located on the exterior of a well-insulated window unit, it can be assumed that the solar heat gain through absorption and reemission, the second term of Equation (3), to be negligible. Accordingly, Equation 3 can be simplified such that the SHGC of a material is equal to the total solar transmittance of that material.

Figure 31A:
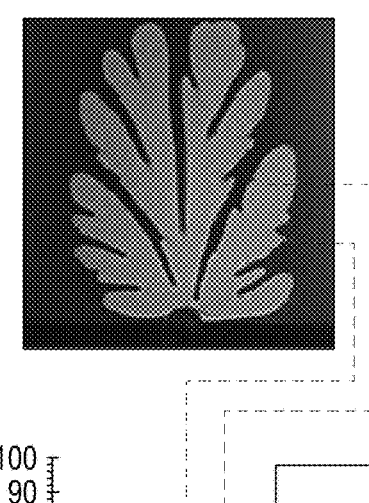
FIGS. 31A-31E depicts local near-infrared light transmission and solar heat gain changes with the injection of an air bubble.
Figure 31B:
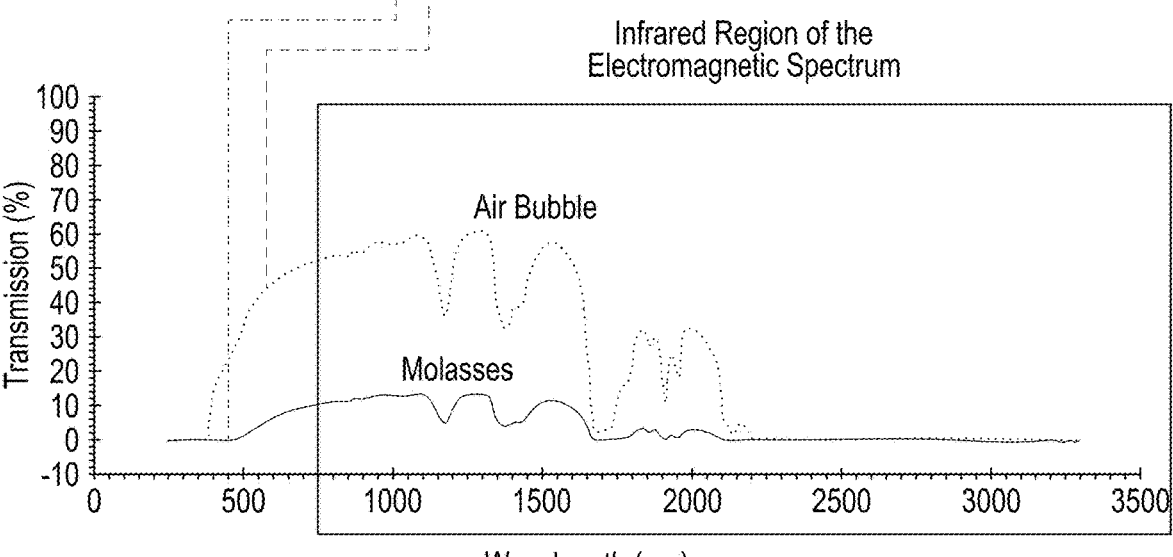
Figure 31C:
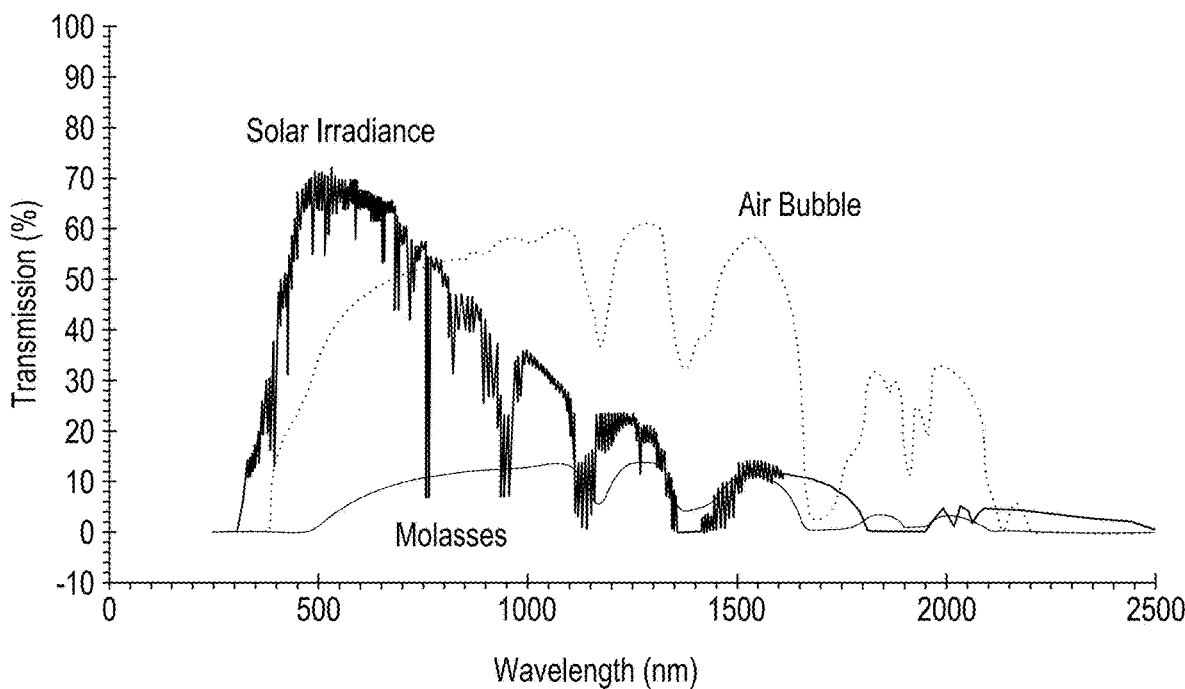

Using the transmissivity data in FIG. 31B, the SHGC of the Hele-Shaw cell cross-section with both an air bubble present and without was calculated, finding a SHGC of 0.43 and 0.07, respectively. These SHGCs represent functional bounds to the performance of our system, where the cell prior to an air injection can transmit 7% of solar radiation and a cell after a maximum air injection covering 100% of the total area can transmit 43% of solar radiation. Using data on the area fraction of an air bubble over a complete injection and retraction sequence (demonstrated in FIG. 30A), the effective SHGC of the cell at each time step by multiplying the air bubble area fraction by 0.43 and the molasses area fraction by 0.07 was calculated, and summing

Figure 31D:
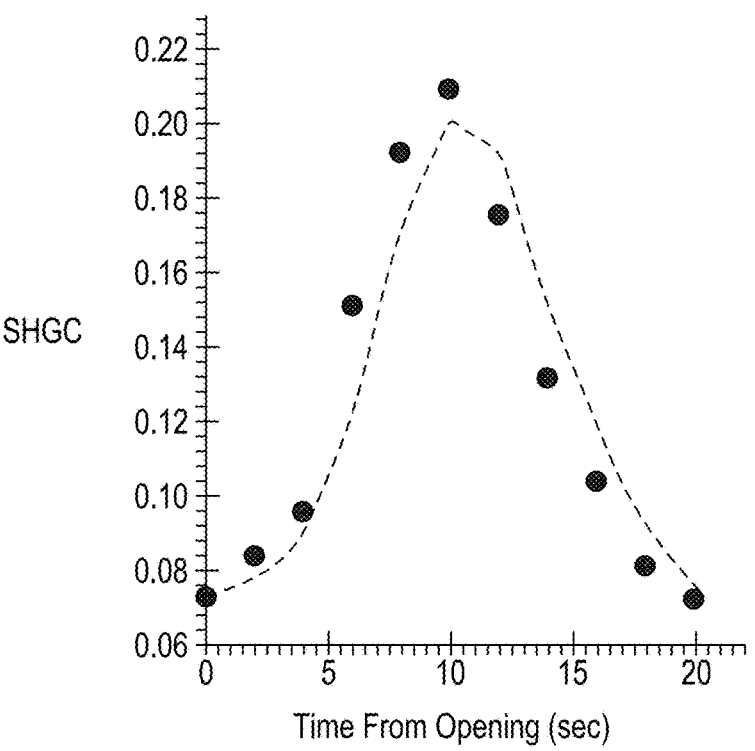
Figure 31E:
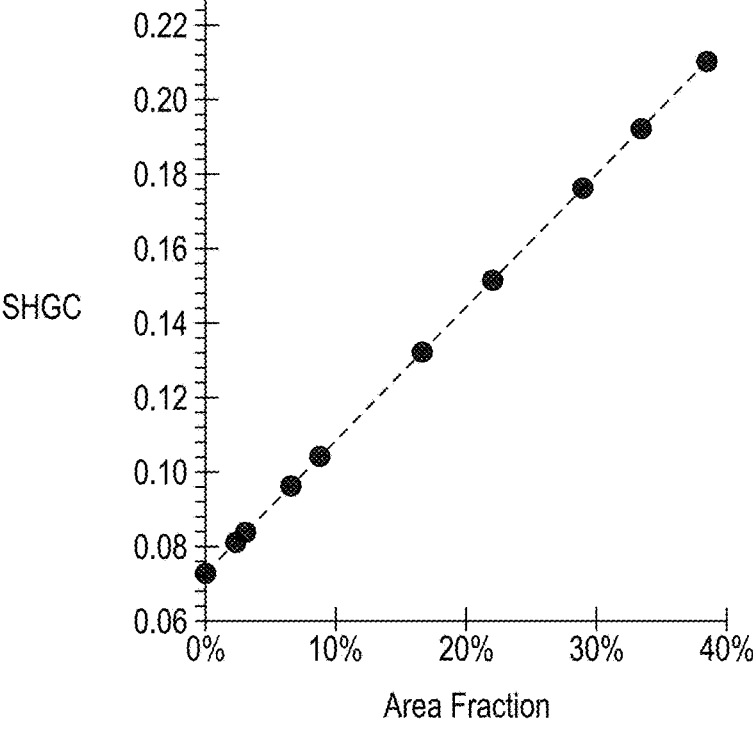

34 these components (FIG. 31D). Effective SHGC accordingly moved linearly with air bubble area fraction, as the effective SHGC of the cell increased from 0.07 to 0.21 for a change in area fraction from 0-39% (FIG. 31E).

Figure 32A:
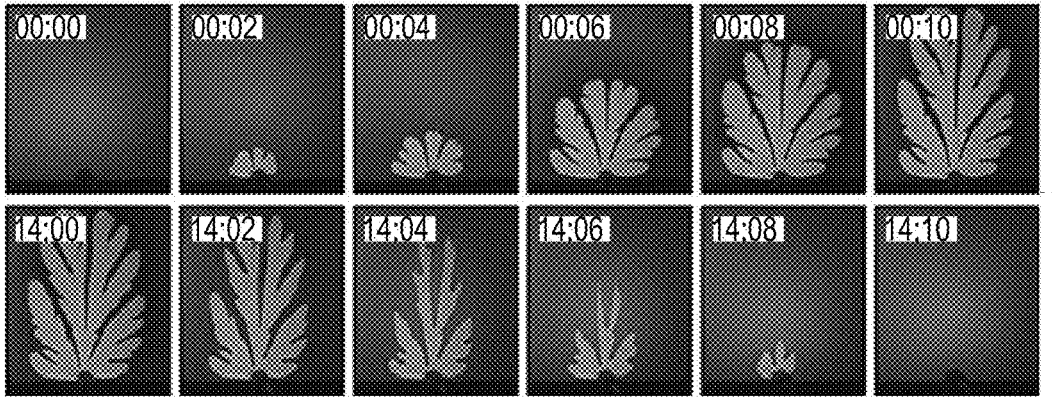
FIGS. 32A-32C depicts modulation of near-infrared light transmission in a Hele-Shaw cell.
Figure 32B:
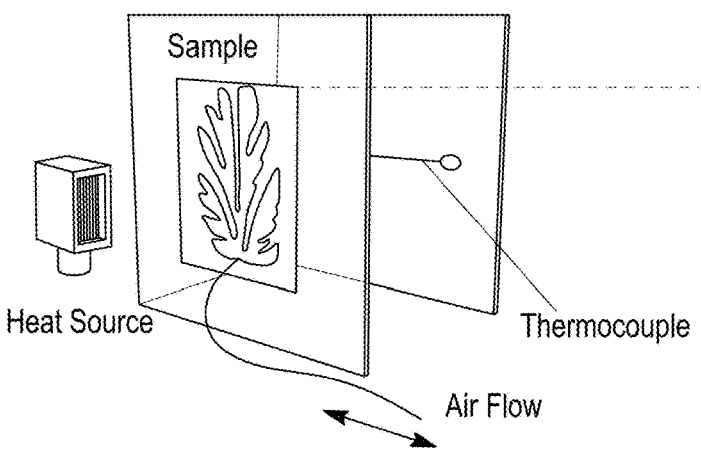
Figure 32C:
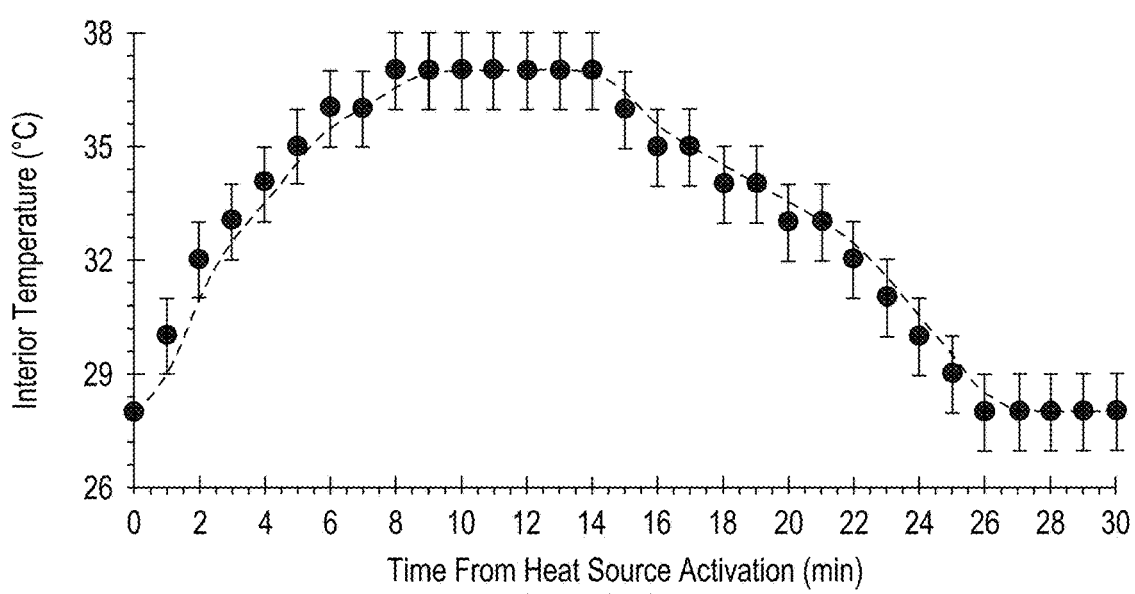

To experimentally validate this result, a similar 'shoebox' model as described in the proceeding section (30×30×30 cm3) was developed, but removed four of the six walls to assess the effect of radiative heat transfer in a well-ventilated space (i.e., isolating radiative heat transfer) (FIG. 32B). To provide radiative energy, the cell was illuminated with a 50-W incandescent light bulb (FIG. 32B), and allowed a thermocouple measuring the temperature of a PMMA sheet within the space to reach a thermal equilibrium (after 30 minutes) of 30° C. prior to bubble injection (FIG. 32C, t=1 min). Air was then injected at a constant rate of 25 mL/min for 10 seconds, injecting approximately 4 mL. As predicted, the temperature of the interior PMMA sheet began to increase after the air bubble was injected, reaching a new thermal equilibrium of 37° C. after nine minutes (FIG. 32C). Six minutes later, the bubble was collapsed, and observed a reversible radiative thermal effect, where the temperature of the interior sheet decreased back to below 30° C. (FIG. 32C, t=27 min).

Motion-Induced Digital Bubble Response

Figure 33A:
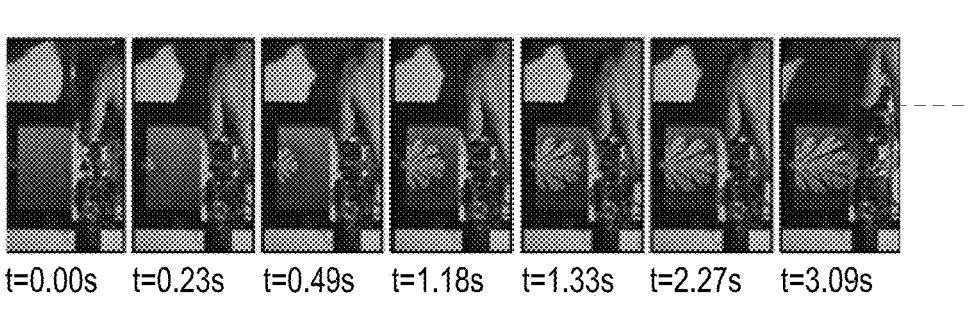
FIGS. 33A-33B depicts tuneable ultrasonic detection can drive a proportional fluidic response.
Figure 33B:
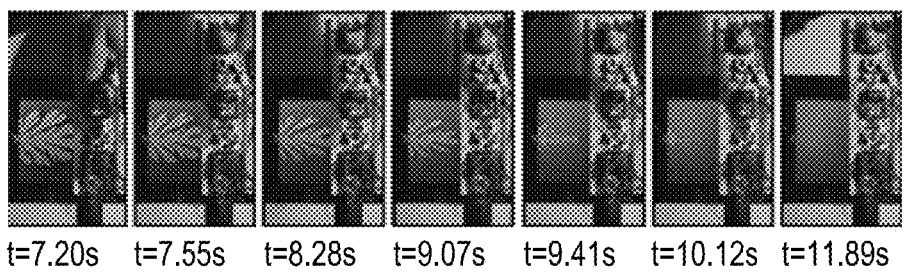

To demonstrate the potential of this material system within a responsive building facade, a digital feedback system was developed to couple the electrical input of an ultrasonic distance sensor (Parallax 28015) to the electric output of a peristaltic pump (INTLLAB 12V). Two distance thresholds were programmed, such that a hand wave within 10 cm of the cell-integrated sensor would drive the injection of an air bubble, and a hand wave between 10.1 cm and 30 cm from the cell would drive the collapse of that air bubble. This ultrasonic-fluidic feedback was demonstrated over several cycles—one of which is demonstrated over a 12 second time-scale in FIG. 33.

Modelled Building Energy Consumption

Simulation Setup and Control Algorithm

Figure 34A:
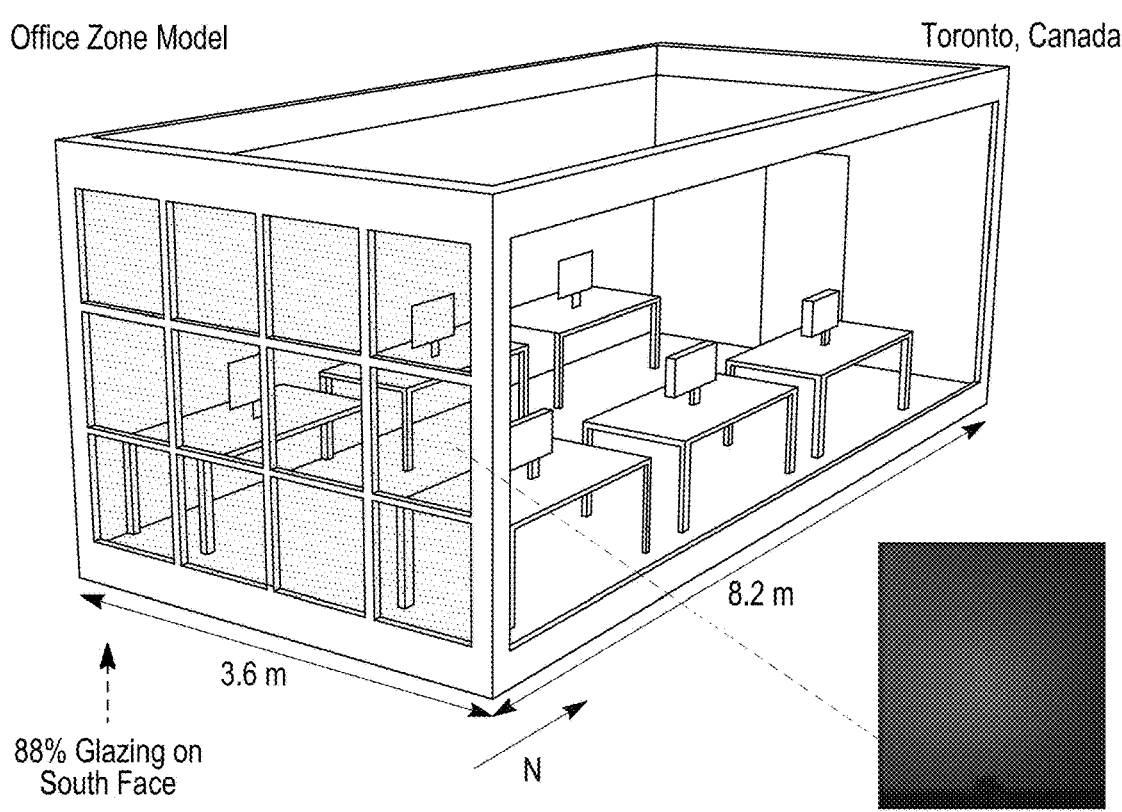

To demonstrate the energy performance of the active fluid layer, a building energy modelling tool is used (EnergyPlus) to estimate the annual energy required for heating, cooling, and lighting a conventional office space locating in Toronto, Canada. In particular, energy costs were calculated for conditioning the space when clad along its south face with (i) the switchable Hele-Shaw cell, (ii) a state-of-the-art electrochromic (EC) window, (iii) a dynamic roller shade, and (iv) a static low-emissivity control window. The one-zone reference office, illustrated in FIG. 34A and described in detail in 27, is 3.6 m wide (E-W direction) and 8.2 m deep (N-S direction), with a south-facing window (window-to-wall ratio of 88%). For consistency, the operation of each of these three dynamic systems (i-iii) was simulated using a standard control algorithm, designed as a naïve energy minimizer, restricted to maintain a set illuminance of 300 lux across 50% of the model floor area during each occupied hour. Additionally, the algorithm restricted the over-lit area (defined as 3000 lux) to less than 10% of the model floor area.

Figure 34B:
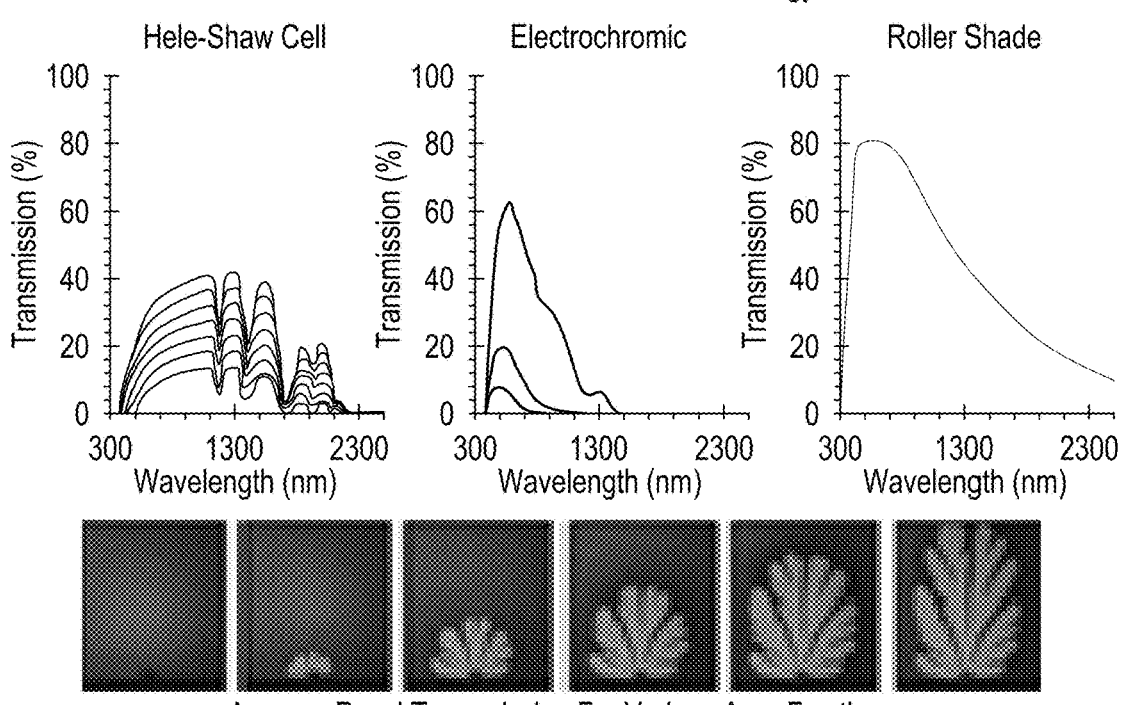

Hele-Shaw cell was modelled to switch between seven possible states, derived from the effective transmission spectra for a Hele-Shaw cell with air bubble area fractions between 0% and 60% (at 10% steps) (transmission spectra shown in FIG. 34B, left). It was noted that an air bubble area fraction of 60% represents an upper functional limit that was observed in the physical experiments. The EC window was modelled to switch between four standard states (transmission spectra taken from a real market product, and shown in FIG. 34B, centre). And, finally, the RS was modelled to switch between its two standard states (up and down), where the 'up' state corresponded to the transmission spectra of a double-pane control window by itself (FIG. 34B, right). To account for building integration, the EC window and Hele-Shaw cell were modelled on the exterior, and the RS was modelled on the interior, of a standard double-pane window. This standard control window had a visible transmittance value of 0.81, a SHGC of 0.71, and a U-value of 1.81 W/m$^2$K. The seven Hele-Shaw cell states (FIG. 34B, left), when combined with the standard control window, had visible transmittance values of 0.22, 0.19, 0.16, 0.13, 0.09, 0.07, and 0.04, and SHGC values of 0.23, 0.20, 0.17, 0.14, 0.11, 0.09, and 0.06, respectively.

A standard hourly occupancy schedule was assumed for the office of 0, 0, 0, 0, 0, 0, 0.1, 0.2, 0.95, 0.95, 0.95, 0.95, 0.5, 0.95, 0.95, 0.95, 0.95, 0.7, 0.4, 0.4, 0.1, 0.1, 0.05, 0.05 Monday to Saturday, and 0, 0, 0, 0, 0, 0, 0.1, 0.1, 0.5, 0.5, 0.5, 0.5, 0.5, 0.5, 0.1, 0.1, 0.1, 0, 0, 0, 0, 0, 0, 0 on Sunday. Here, each hourly value represents a multiplier of a conventional occupancy rate of 0.053821313 persons/m$^2$. For every hour in which the space was occupied, each available control state (defined in FIG. 34B for each dynamic system) was tested to satisfy the required illuminance and overlighting constraints. For each material state meeting these constraints, solar heat gain and electric lighting utilization were calculated. Once the acceptable daylight-driven requirements were met, a heat balance was calculated at each hour based on thermal model outputs for internal heating loads (occupants, lights, equipment) and external heating loads (ventilation, solar heat gains, conduction). Of all calculated material states, the state that minimized total energy (combined heating, cooling, and lighting) was selected. Because the underlying thermal models are transient in nature (i.e., each timestep influences the next), the control algorithm was iterated many times until annual energy results stabilized. This allowed a near-optimal control system to be achieved.

Within the reference office, all non-exterior walls, floors, and ceilings were defined to be adiabatic. All opaque walls were modelled with a U-value of 0.472 W/m$^2$K, and all other indoor materials were modelled with conventional IES LM-83 material properties. A fresh air supply of 0.0125 m3/s/person was used, and assumed that 70% of sensible heat and 65% of latent heat was recovered by the heat-recovery system. Each person generated heat at a rate of 125 W, and all equipment was modelled with a peak power density of 5 W/m$^2$, with an hourly multiplier of 0.4, 0.4, 0.4, 0.4, 0.4, 0.4, 0.4, 0.4, 0.9, 0.9, 0.9, 0.9, 0.8, 0.9, 0.9, 0.9, 0.9, 0.8, 0.6, 0.6, 0.5, 0.5, 0.4, 0.4 from Monday to Saturday, and of 0.3 at each hour on Sunday. While the building was occupied, temperature setpoints were defined at 21 and 24° C., and at 15.6 and 26.7° C. otherwise. An electric power was used across the space of 99 W, (3.4 W/m$^2$), where lights were activated daily between 7:00-19:00, as needed (i.e., to meet the target illuminance).

Simulation Results

In simulation, it was found that the dynamic operation of our Hele-Shaw cell could reduce total annual operation energy usage in our office space by 16%, 7%, and 4% over EC, RS, and static glazing systems, respectively (FIG. 34F). The roller shade and static control window followed similar temporal consumption trends (FIG. 34F), requiring, in comparative terms, much more energy to achieve cooling than heating (FIG. 34C-34D). Conversely, the EC window and Hele-Shaw cell followed similar temporal consumption trends (FIG. 34F), requiring, in comparative terms, much more energy to achieve heating than cooling (FIG. 34C-

34D). Despite this consumption trend similarity, our Hele-Shaw cell required much less energy than did the EC window to heat the indoor space (FIG. 34C), resulting in reduced energy consumption compared with the EC system. This performance difference was likely achieved by the fact that the Hele-Shaw system can admit much more near-infrared light for each unit of admitted visible light (compare spectral distributions in FIG. 34B), enabling higher solar heat gains within a given limit of overlighting. It was found that electric lighting consumption played a smaller role in total energy consumption, and that all systems performed comparatively across the year (FIG. 34E).

Relative energy performance by adjusting the control algorithm to allow for spatial overlighting (>3000 Lux) above 10% within the space. With this overlighting constraint removed, it was found that the dynamic operation of our Hele-Shaw cell could now reduce total operational energy usage in our office space by 36%, 10%, and 7% over EC, RS, and static glazing systems, respectively (FIG. 34F). While this change in operational control likely increases glare and optical discomfort, it reduces electric lighting costs, unwanted lighting-induced cooling costs, and enables more solar heat gain when required to reduce mechanical heating costs.

Operational Energy Cost Calculation

Finally, to assess the feasibility of building integration, the energy required to optimally operate the fluidic Hele-Shaw cell across the year was estimated. The annual operational energy was calculated as the energy required for a typical peristaltic pump to inject or retract an air bubble within a 0.25 m$^2$ panel in our experiments (5 W*4 s), multiplied by the number of times an injection or retraction occurred in our annual energy simulation (1630), multiplied by the number of 0.25 m$^2$ panels needed to cover the south-face glazing (9.5 m$^2$) of our one-zone simulation space (38). An estimated energy operational energy cost of 0.344 kWh was obtained, or about 0.12% of the energy that our dynamic Hele-Shaw system could save over an EC window in our simulation (303.5 kWh). This result importantly suggests that the Hele-Shaw cell might have only a negligible operational energy cost, validating building integration feasibility.

Discussion

A methodology was developed to translate well-established nonlinear fluid dynamics to responsive building facades in architecture. A shape- and size-tuneable bubble injections to modulate both visible light transmission and near-infrared heat gain within a mock-building interface was demonstrated, and achieved reversibility over multiple cycles. The energetic performance of the system was then simulated within a prototypical office model, and found that the dynamic operation of the Hele-Shaw system (switching between air injection states that cover 0-60% of the model's south-facing facade) could reduce annual energy consumption by up to 36% over a state-of-the-art electrochromic window. Our experimental and modelled results suggest building integration feasibility, with the potential for substantial improvements to architectural energy efficiency.

Future Considerations

Because the interface between air and the opaque host phase (in this case, molasses) is highly unstable, the branched pattern morphology of the injected bubble represents only a meta-stable state, where the resistance to flow of the molasses phase enables longer-term (minutes-hours) pattern stability. In thermodynamic terms, decay of the branching state is inevitable over time, but the time-scale of branch-decay for these specific fluids must be better understood in order to assess the limitations in long-term patterning and light transmission within a Hele-Shaw cell.

Similarly, while buoyant forces had a negligible impact on bubble morphology for injections within vertically-oriented cells (t=40 min), the decay of bubble morphology may be amplified by gravitationally-induced forces arising from the difference in density between host-molasses and guest-air phases. Future work might explore multiphase systems with fluids (liquids in particular) of the same density.

In an architectural context, the system described here can only partially control visible light transmission (visible light transmissivity ranges between 4-35%, with low specular transmission). This property is unattractive in modern building facades, where views to the outdoors are universally expected, achieved through high specular transmissivity in the visible region of the electromagnetic spectrum. From a design point of view, it was speculated that, by decreasing the flow rate of the injected air bubble and increasing the hydrophobicity of the inner Hele-Shaw cell surface, increased displacement of the host phase might be achieved (i.e., increased surface wetting by the air phase). This effect, explained by Bretheten, would result in a decreased molasses path length through which light would be required to travel, increasing the maximum light transmissivity, and specular light transmissivity, through the cell.

Alternatively, rather than as a replacement for traditional glazing, the demonstrated fluidic control might be desirable along both traditionally-opaque vertical (e.g., walls) and horizontal (e.g., rooves) elements within buildings—where visual clarity is not a necessity, but tuneable control over visible and near-infrared light transmission remains critical for energy efficiency. In broad terms, buildings might be entirely encapsulated by fluidic layers, enabling an improved spatial resolution of optical properties, rather than the stubborn paradigm of fixed transmission elements (windows) and fixed insulating elements (walls).

Finally, it is suspected that the scope of this work can far exceed energy-efficient building design. Because the morphology of air bubbles can be tuned using digital control, large, independently-addressable, multicell arrays might be easily developed to provide visual feedback through dynamic patterning. Accordingly, such a system could be applied across both soft and hard material interfaces, with possible applications for active colour change and camouflage in wearables, sensors, communication technologies, and vehicles.

Figure 35B:
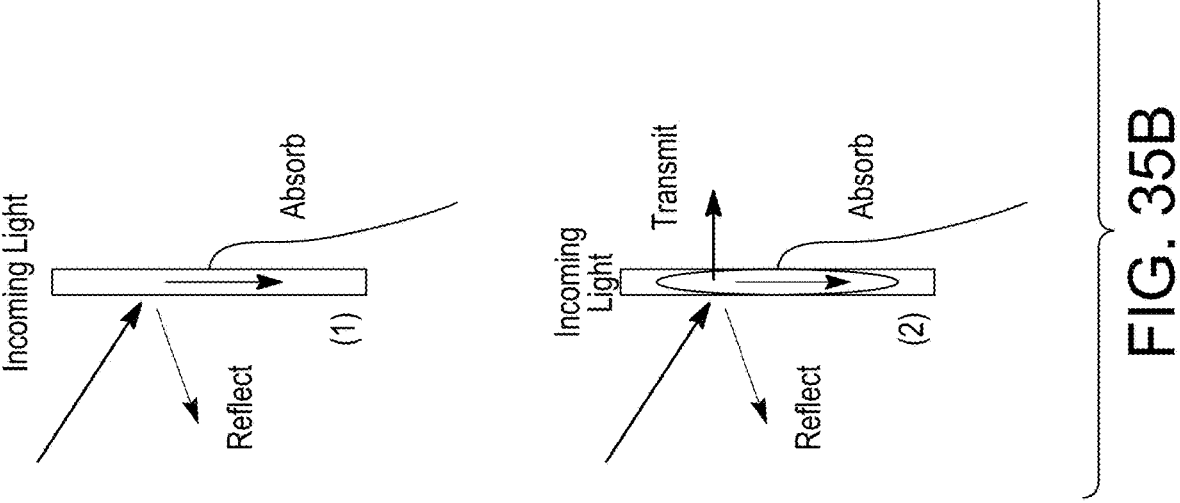
FIGS. 35A-35D depicts design and reversible operation of shape-programmable aperture.
Figure 35A:
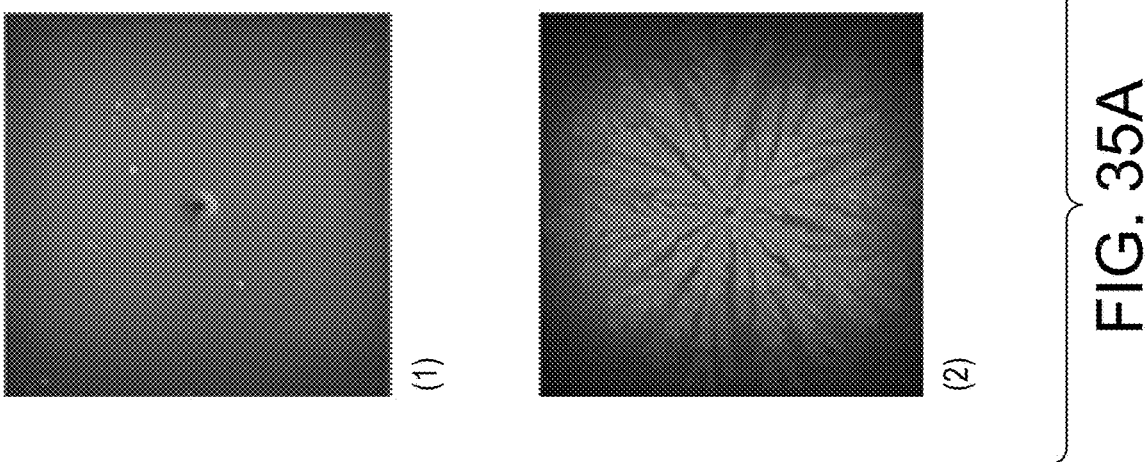
Figure 35D:
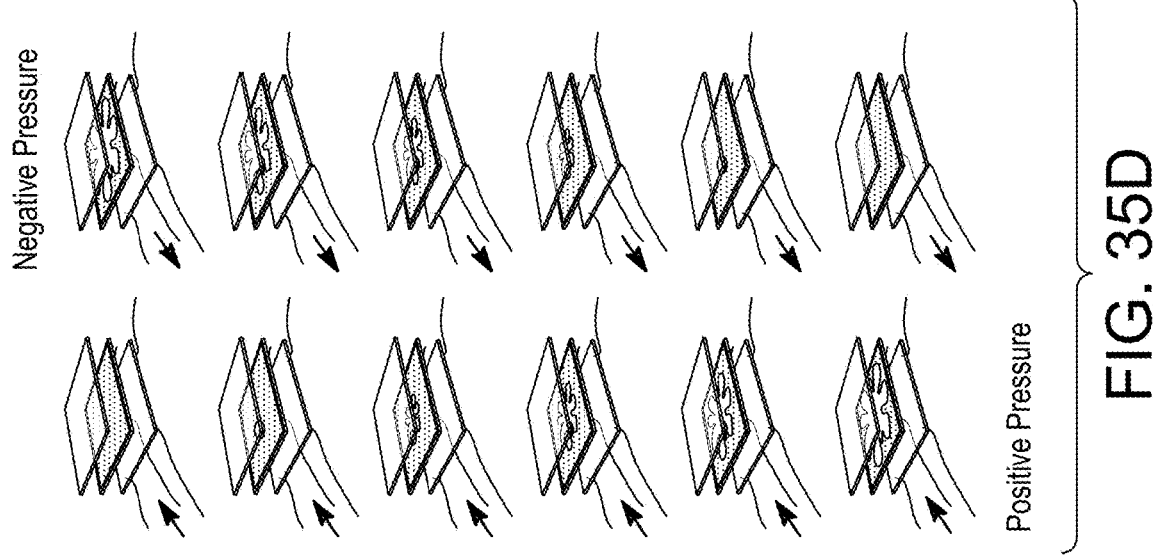
Figure 35C:
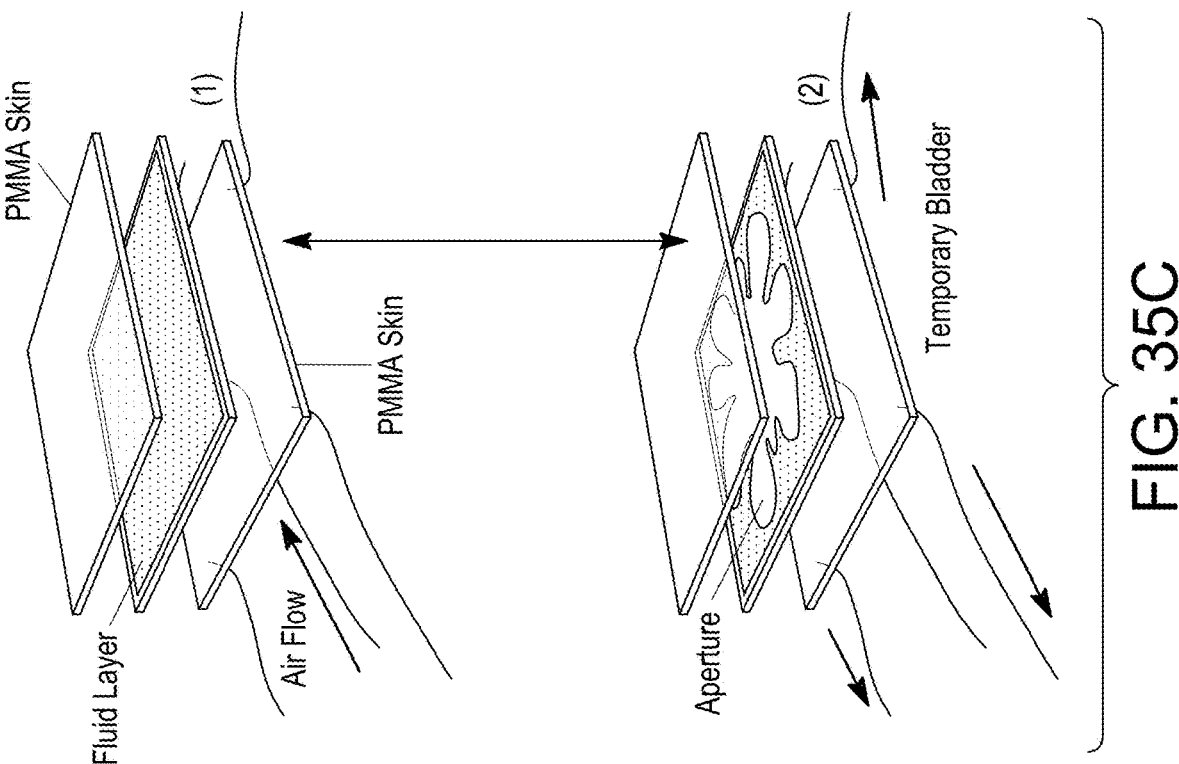

Referring to FIGS. 35A-35D, design and reversible operation of a shape-programmable aperture is disclosed, in accordance with an embodiment. FIG. 35A (1) illustrates a stable fluid layer prior to air injection and FIG. 35A (2) illustrates a superimposed aperture opening sequence with positive air pressure. FIG. 35B illustrates a schematic showing ability of system to control light transmittance with aperture activation, where (1) represents closed state and (2) represents open state. FIG. 35C illustrates a design of fluidic device in which aperture is activated. (1) represents closed state and (2) represents open state. FIG. 35D illustrates a from top-left to bottom-right, showing aperture opening and closing sequence, where positive pressure is applied for opening and negative pressure is applied for closing.

Figures 36A, 36B, 36C:
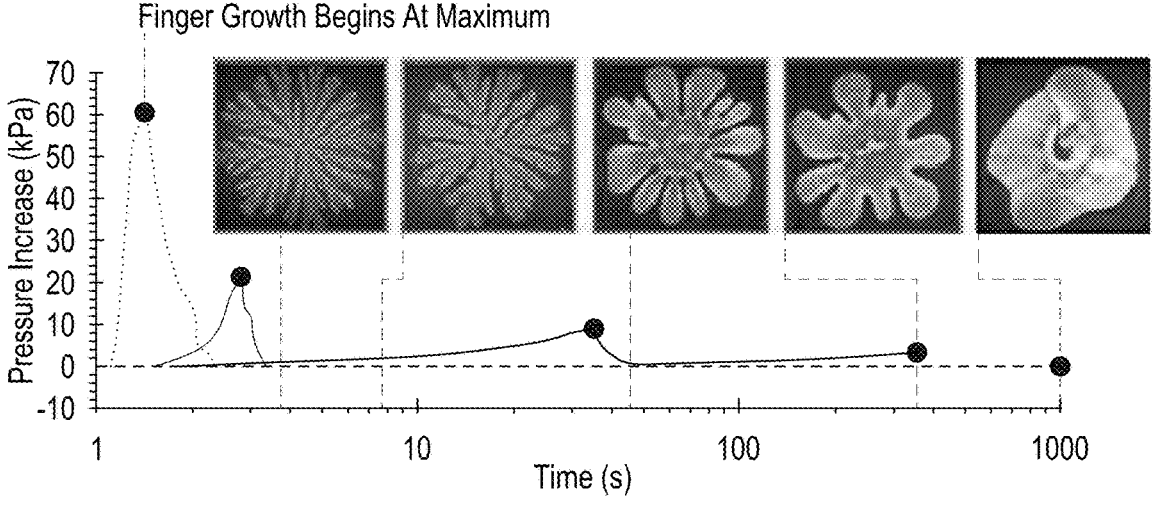

Referring to FIGS. 36A-36F depicts that an aperture morphology can be programmed with flow rate, in accordance with an embodiment. FIG. 36A depicts that an aperture morphology can be programmed with flow rate (0.05-15 mL/min). FIG. 36B depicts air pressure within aperture during expansion sequence, wherein maximum pressure occurs directly before branching begins, after which air pressure returns to $P_{atm}$. Images in FIG. 36B correspond to final morphology for each aperture. FIG. 36C depicts that the maximum air pressure increases linearly with flow rate. The maximum air pressure occurs at point in growth directly before branching begins, illustrated by black line in photo. FIG. 36D depicts that the number of branches increases as the apertures grows in radius, but to a greater degree for apertures assembled at higher flow rates. FIG. 36E depicts that the aperture area increases as the apertures grows in radius, but to a greater degree for apertures assembled at lower flow rates, due to less branched morphologies. FIG. 36F depicts that the maximum aperture size, within a cell with a fixed radius, can therefore be programmed with flow rate. Higher flow rates produce apertures with more branched morphologies, and less area coverage.

Figure 37C:
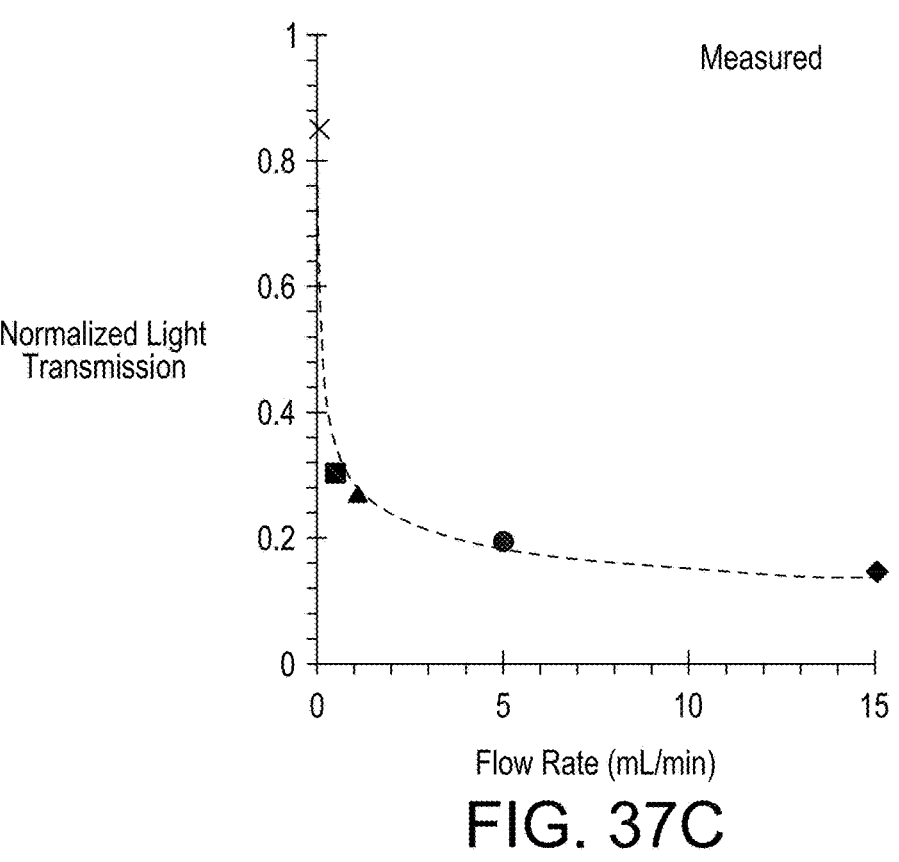
Figure 37D:
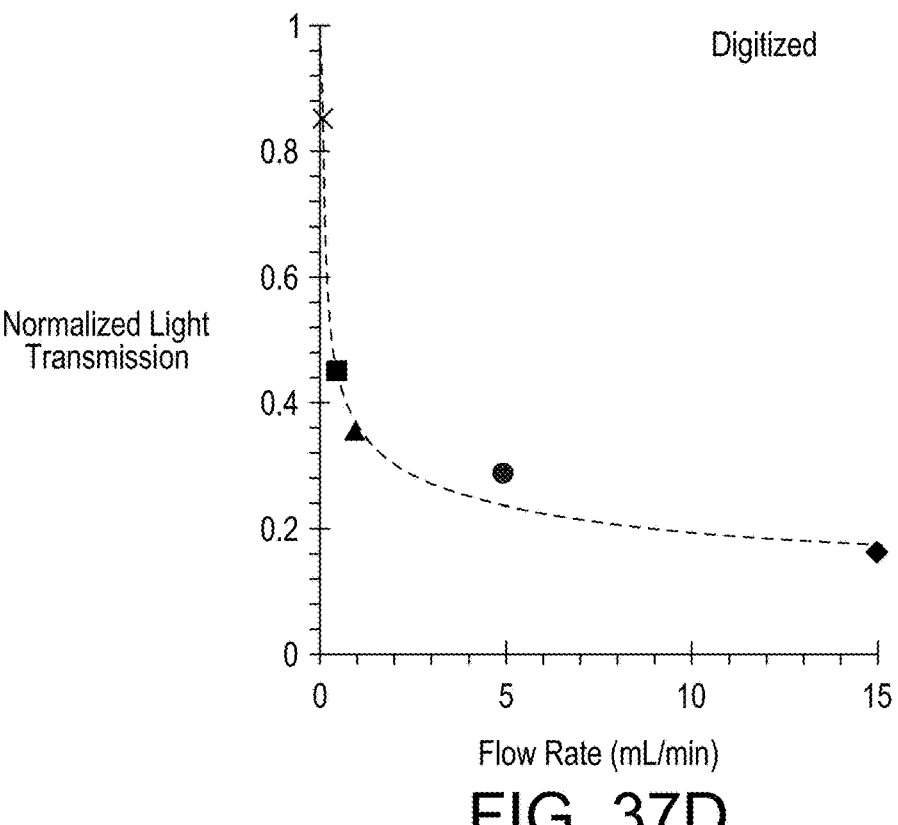

Referring to FIGS. 37A-37D depicts that an aperture wetting and transmissivity can be programmed with flow rate, in accordance with an embodiment. FIG. 37A depicts the aperture expansion sequence at five constant flow rates (0.05-15 mL/min) within cell. FIG. 37B depicts pixel sampling from finger region of each aperture, indicative of differences in light transmissivity with consistent backlighting source. Average greyscale value (between 0-255) taken from aperture region, quantifying differences in transmissivity. FIG. 37C depicts average area-normalized light transmission intensity versus flow rate of injection. FIG. 37D depicts extrapolated light transmission intensity from digitized images and grey scale values from FIG. 37B, remapped between measured light transmission values from FIG. 37C. FIG. 37C-FIG. 37D represent two different methods of validating wetting trend, demonstrating variation in film thickness within cell during aperture growth.

Figure 38A:
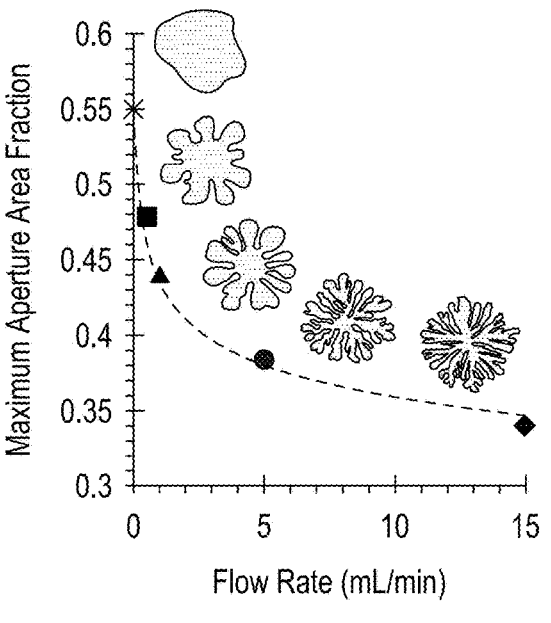
FIGS. 38A-38E depicts that cell transmissivity can be programmed with flow rate and injection volume.
Figure 38B:
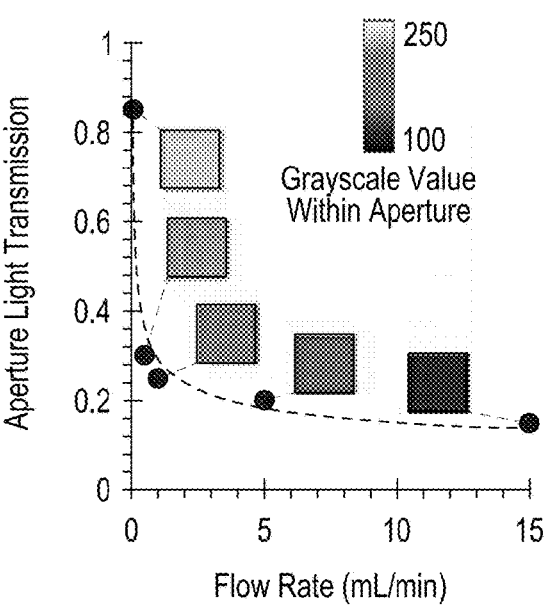
Figure 38C:
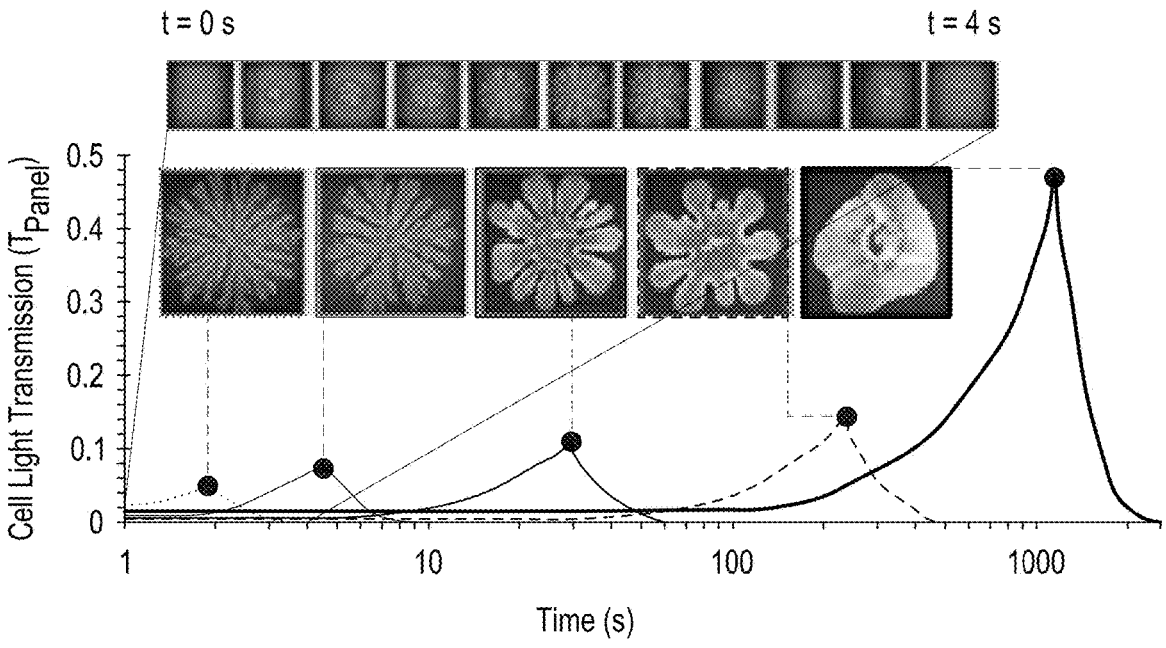
Figure 38D:
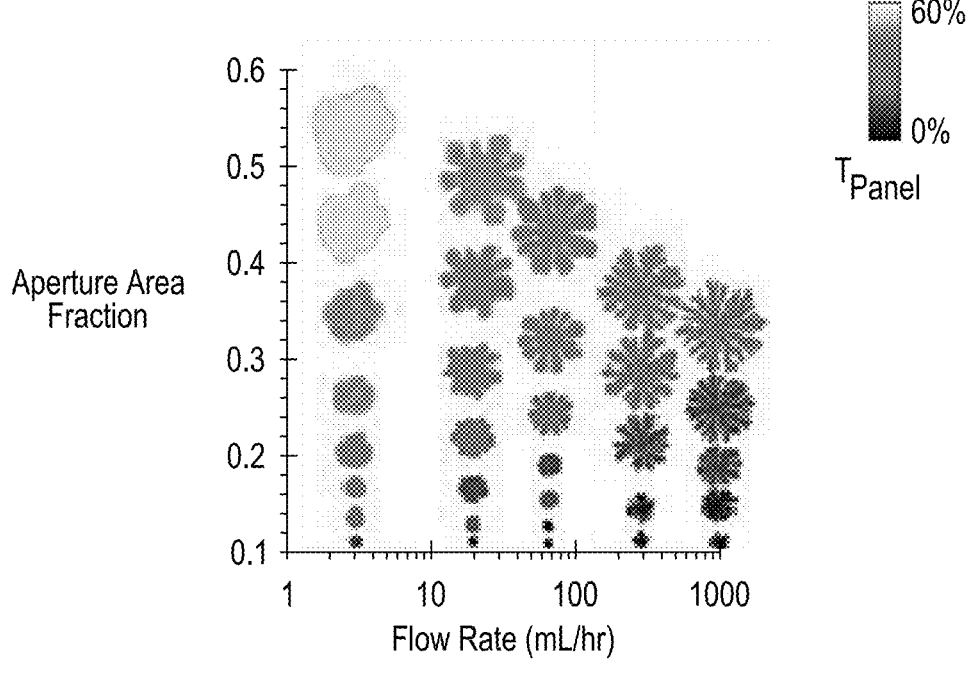
Figure 38E:
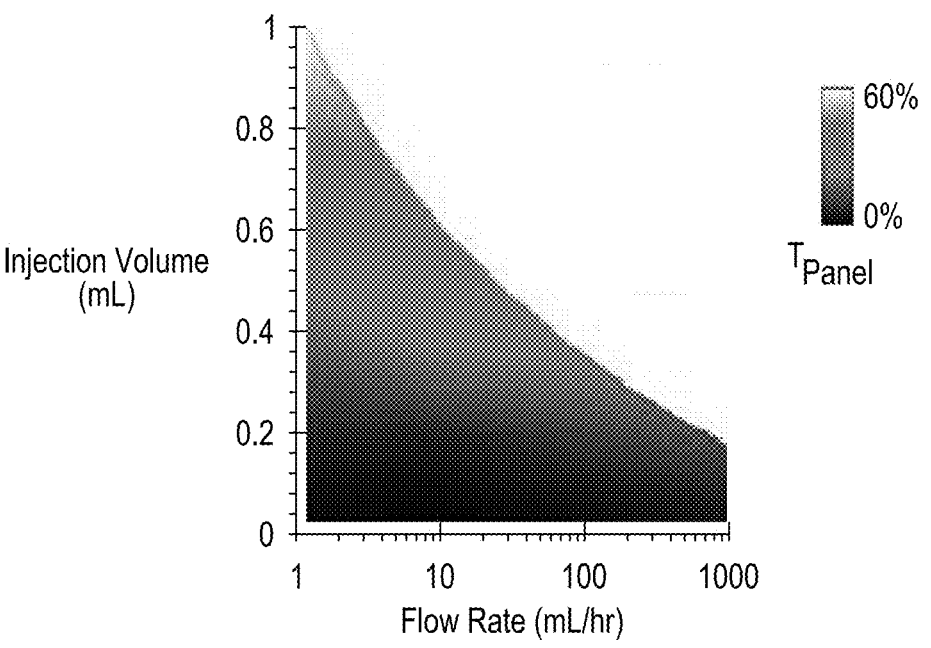

Referring to FIGS. 38A-38E depicts that cell transmissivity can be programmed with flow rate and injection volume, in accordance with an embodiment. FIGS. 38A-38B depict two mechanisms for modulating light transmission through a cell, each of which dependent on flow rate. FIG. 38A depicts that the Aperture morphology and aperture area fraction can be programmed with flow rate. FIG. 38B depicts that the aperture wetting and light transmission intensity (area normalized) can be programmed with flow rate. Light transmission here is the measured light transmission through the aperture divided by the area of the aperture. This effect is confirmed by measuring average greyscale values within the aperture area, when backlit and photographed. Colour corresponds to average greyscale value, where higher values correspond to greater light transmission from the back light through the aperture. FIG. 38C depicts that the measured light transmission through the cell over time for five different aperture expansion and retraction sequences at five different flow rates (0.05-15 mL/min). FIG. 38D depicts that the functional range of aperture: Measured light transmission through the cell as a function of both aperture size (represented as a fraction of the cell) and flow rate. FIG. 38E depicts that the digital control space over aperture: Measured light transmission through the cell as a function of both air injection volume and air injection flow rate.

One possible model is shown below:

Consider an expanding 'two-dimensional' air bubble with a radius $R_i$ that increases as a function of flow rate q, time $t_i$, and the depth of a cell it expands within b−2h, $$R_i = \sqrt{\frac{qt_i}{\pi(b-2h)}}$$

The maximum radius of the air bubble $R_n$ depends on the total time of the air injection $t_n$, and determines when the model needs to be turned off, $$R_n = \sqrt{\frac{qt_n}{\pi(b-2h)}}$$

The total time of the air injection $t_n$ is a function of the square-shaped radius of the container within which it grows $R_{cell}$ and the velocity of the air bubble $V_{max}$ (how quickly it reaches the edge of its container). For the entire growth period, $$t_i < \frac{R_{cell}}{V_{max}}$$

But once the following expression becomes true, then $t_n$ has been reached, $$t_i = \frac{R_{cell}}{V_{max}}$$

We therefore can rewrite the above as, $$t_n = \frac{R_{cell}}{V_{max}}$$

We extrapolated from our physical experiments the maximum velocity of the air bubble $V_{max}$ as a function of the flow rate of the air injection q, $$V_{max} = \frac{R_{cell}}{0.0000003 \cdot q^{(-1.222)}}$$

This is not to be confused by the average velocity $v_{i+1}$ between time $t_i$ and time $t_{i+1}$, which is given by, $$v_{i+1} = \frac{q}{\pi b} \cdot \frac{R_{i+1} - R_i}{R_{i+1}^2 - R_i^2}$$

The capillary number $Ca_i$ is a function of the average velocity $v_i$, $$Ca_i = \frac{v_i \Delta n}{\sigma}$$

The thickness of the leftover fluid $h_i$ (not displaced by a moving air bubble) is a function of the capillary number $Ca_i$, $$h_i = \frac{0.5b \cdot \varphi \cdot Ca_i^{2/3}}{1 + \left([\varphi \cdot \omega] \cdot Ca_i^{\frac{2}{3}}\right)}$$

Absorbance $A_i$ is related to the thickness of the fluid film $h_i$ that light must travel through, $$A_i = 2h_i \cdot \varepsilon$$

Transmittance $T_i$ is related to absorbance $A_i$, $$T_i = 10^{[-1 \cdot A_i]}$$

The average transmittance across the fluid bubble $T_{avg}$ (q) is the average transmittance at every time stamp of the air bubble injection, $$T_{avg}(q) = \frac{1}{n} \sum_{i=1}^{n} T_i$$

The area fraction $af_i$(q) for the air bubble is proportional to the area of the bubble (numerator) divided by the area of the cell (denominator), where the area of the bubble is dependent on the radius of the air bubble $R_i$, $$af_i(q) = \frac{\pi \cdot R_i^2}{2R_{cell}^2}$$

We can multiple the average transmittance across the fluid bubble $T_{avg}$ (q) by the maximum area fraction $af_n$(q) for the air bubble to get the total maximum transmission through the panel $t_{panel}$(q), $$t_{panel}(q) = T_{avg}(q) \cdot af_n(q)$$

CONCLUSIONS

A multifluidic interface for achieving reversible injections of self-organizing air bubbles is thereby described. Through digitally-controlled fluidic actuation, tunability over both measured visible and near-infrared light transmission is demonstrated, with architectural implications for both interior daylighting and solar heat gain. This work represents an early exploration into multifluidic chromogenic building facades, and it is speculated that its future incarnations might enable more advanced material responses in architecture, and elsewhere.

What is claimed is:

1. A system for control of optical properties of light, the system comprising:

a cell comprising a first optically transparent member and a second optically transparent member disposed in a vertical direction, wherein at least one of the first optically transparent member and the second optically transparent member is elastic, wherein the optically transparent members are disposed at a distance from each other with closed edges thereby defining a space between the optically transparent members; and at least two fluids, a first fluid and a second fluid, each fluid having at least one optical property different from the other, wherein, the first fluid is configured to be received within the space;

the second fluid is configured to be received into the space, while at least a portion of the first fluid is disposed in the space;

the injection of the second fluid into the space displaces the first fluid;

the first fluid and the second fluid interface with each other in the space, while remaining separate; and the second fluid is configured to be withdrawn from the space leaving the first fluid in the space, wherein prior to reception of the second fluid within the space, the optically transparent members are parallel to each other, reception of the second fluid causes the elastic first optically transparent member and/or the elastic second optically transparent member to expand, and withdrawal of the second fluid from the space causes the elastic first optically transparent member and/or the elastic second optically transparent member to regain a shape that existed before expansion.

2. The system of claim 1, further comprising a first fluid port, wherein the first fluid is received into the space through the first fluid port, and the first fluid exits the space through the first fluid port.

3. The system of claim 2, further comprising a second fluid port, wherein the second fluid is received into the space through the second fluid port, and the second fluid is withdrawn out of the space through the second fluid port.

4. The system of claim 1, further comprising a first fluid port exposed to the space and a second fluid port exposed to the space, wherein the first fluid exits the space through the first fluid port, and the second fluid exits the space through the second fluid port, wherein:

first fluid port and the second fluid port are spaced apart; and the system is configured to limit injection of the second fluid into the space such that the second fluid fails to reach the first fluid port.

5. The system of claim 1, wherein, the first fluid is configured to be received within the space by gravity; and the second fluid is configured to be received within the space by external pressure.

6. The system of claim 1, further comprising a backflow area interfacing with the first fluid, the backflow area defining a volume greater than a volume of the second fluid receivable into the space, wherein, the second fluid causes the first fluid to be displaced into the backflow area when the second fluid is received into the space; and the first fluid flows from the backflow area and into the space when the second fluid is withdrawn from the space.

7. The system of claim 6, wherein the first fluid flows from the backflow area and into the space by gravity.

8. The system as claimed in claim 1, wherein density of the first fluid matches the density of the second fluid.

9. The system as claimed in claim 8, wherein the second fluid branches into the first fluid when the second fluid is received into the space, wherein the branching of the second fluid is controlled with viscosity and injection flow rate of the second fluid within the space.

10. The system as claimed in claim 1 wherein the first fluid is a liquid, and the second fluid is a gas.

11. A facade for a building, the facade comprising a plurality of the cell of claim 1 arranged adjacent to each other.

12. The facade of claim 11, wherein the facade is configured to receive the second fluid in the space of selected some among the plurality of the cells.

13. The facade of claim 11, wherein the cells are configured into a first group of the cells and a second group of the cells, wherein the introduction and withdrawal of the second fluid into and from the space of the first group of the cells is independent of the introduction and withdrawal of the second fluid into and from the space of the second group of the cells.

\* \* \* \* \*